(12) United States Patent
Suino

(10) Patent No.: US 7,609,899 B2
(45) Date of Patent: Oct. 27, 2009

(54) IMAGE PROCESSING APPARATUS, IMAGE PROCESSING METHOD, AND RECORDING MEDIUM THEREOF TO SMOOTH TILE BOUNDARIES

(75) Inventor: Tooru Suino, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 721 days.

(21) Appl. No.: 11/140,679

(22) Filed: May 26, 2005

(65) Prior Publication Data

US 2005/0265608 A1  Dec. 1, 2005

(30) Foreign Application Priority Data

May 28, 2004 (JP) ............................. 2004-159631
May 28, 2004 (JP) ............................. 2004-159632

(51) Int. Cl.
*G06K 9/36* (2006.01)
(52) U.S. Cl. ...................................... 382/233; 382/268
(58) Field of Classification Search ................. 382/232, 382/233, 268
See application file for complete search history.

(56) References Cited

U.S. PATENT DOCUMENTS

| 6,813,387 | B1 | 11/2004 | Berkner | |
|---|---|---|---|---|
| 7,330,596 | B2 * | 2/2008 | Suino et al. | 382/240 |
| 2002/0172429 | A1 * | 11/2002 | Boliek et al. | 382/240 |
| 2003/0002742 | A1 * | 1/2003 | Sano et al. | 382/239 |
| 2004/0013310 | A1 | 1/2004 | Suino et al. | |

FOREIGN PATENT DOCUMENTS

| JP | 05-316361 | 11/1993 |
|---|---|---|
| JP | 06-054311 | 2/1994 |
| JP | 09-307855 | 11/1997 |
| JP | 2001-257596 | 9/2001 |
| JP | 2004-056260 | 1/2004 |
| JP | 2004-056264 | 1/2004 |
| JP | 2004-112004 | 1/2004 |
| JP | 2004-040252 | 2/2004 |
| JP | 2004-040670 | 2/2004 |
| JP | 2004-046583 | 2/2004 |
| JP | 2004-064190 | 2/2004 |
| JP | 2004-134938 | 4/2004 |

OTHER PUBLICATIONS

U.S. Appl. No. 10/891,591, filed Jul. 14, 2004, Tooru Suino.
U.S. Appl. No. 10/837,446, filed Apr. 30, 2004, Hiroyuki Sakuyama, et al.
U.S. Appl. No. 10/944,098, filed Sep. 17, 2004, Tooru Suino, et al.

(Continued)

*Primary Examiner*—Vikkram Bali
*Assistant Examiner*—Eueng-Nan Yeh
(74) *Attorney, Agent, or Firm*—Blakely, Sokoloff, Taylor & Zafman LLP

(57) ABSTRACT

An image processing apparatus is disclosed. The image processing apparatus includes a coefficient correction unit for correcting only a high frequency coefficient situated adjacent to a tile boundary of an encoded image data divided into non-overlapping tiles. The high frequency coefficient is corrected during a process of decoding the encoded image data.

4 Claims, 28 Drawing Sheets

OTHER PUBLICATIONS

U.S. Appl. No. 10/726,876, filed Dec. 2, 2003, Yukio Kadowaki, et al.
U.S. Appl. No. 10/944,030, filed Sep. 17, 2004, Tooru Suino, et al.
U.S. Appl. No. 10/714,204, filed Nov. 14, 2003, Shogo Oneda, et al.
U.S. Appl. No. 10/658,870, filed Sep. 9, 2003, Shogo Oneda, et al.
U.S. Appl. No. 10/726,852, filed Dec. 2, 2003, Takanori Yano, et al.
U.S. Appl. No. 10/330,588, filed Dec. 27, 2002, Tooru Suino.
U.S. Appl. No. 10/409,123, filed Apr. 9, 2003, Tooru Suino.
U.S. Appl. No. 10/600,333, filed Jun. 23, 2003, Tooru Suino.
U.S. Appl. No. 10/678,696, filed Oct. 2, 2003, Hiroyuki Sakuyama, et al.
U.S. Appl. No. 10/877,225, filed Jun. 24, 2004, Tooru Suino, et al.
Japanese Office Action JP2004-159631 dated Feb. 20, 2008 (2 pages).

* cited by examiner

FIG.4 even odd even odd

| L | L | L | L | L | L | L | L | L | L | L | L | L | L | L | L |
|---|---|---|---|---|---|---|---|---|---|---|---|---|---|---|---|
| H | H | H | H | H | H | H | H | H | H | H | H | H | H | H | H |
| L | L | L | L | L | L | L | L | L | L | L | L | L | L | L | L |
| H | H | H | H | H | H | H | H | H | H | H | H | H | H | H | H |
| L | L | L | L | L | L | L | L | L | L | L | L | L | L | L | L |
| H | H | H | H | H | H | H | H | H | H | H | H | H | H | H | H |
| L | L | L | L | L | L | L | L | L | L | L | L | L | L | L | L |
| H | H | H | H | H | H | H | H | H | H | H | H | H | H | H | H |
| L | L | L | L | L | L | L | L | L | L | L | L | L | L | L | L |
| H | H | H | H | H | H | H | H | H | H | H | H | H | H | H | H |
| L | L | L | L | L | L | L | L | L | L | L | L | L | L | L | L |
| H | H | H | H | H | H | H | H | H | H | H | H | H | H | H | H |
| L | L | L | L | L | L | L | L | L | L | L | L | L | L | L | L |
| H | H | H | H | H | H | H | H | H | H | H | H | H | H | H | H |
| L | L | L | L | L | L | L | L | L | L | L | L | L | L | L | L |
| H | H | H | H | H | H | H | H | H | H | H | H | H | H | H | H |

FIG.5 even odd even odd

| LL | HL | LL | HL | LL | HL | LL | HL | LL | HL | LL | HL | LL | HL | LL | HL |
|----|----|----|----|----|----|----|----|----|----|----|----|----|----|----|----|
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |

FIG.6

| | |
|---|---|
| 1LL 1LL 1LL 1LL 1LL 1LL 1LL 1LL<br>1LL 1LL 1LL 1LL 1LL 1LL 1LL 1LL<br>1LL 1LL 1LL 1LL 1LL 1LL 1LL 1LL<br>1LL 1LL 1LL 1LL 1LL 1LL 1LL 1LL<br>1LL 1LL 1LL 1LL 1LL 1LL 1LL 1LL<br>1LL 1LL 1LL 1LL 1LL 1LL 1LL 1LL<br>1LL 1LL 1LL 1LL 1LL 1LL 1LL 1LL<br>1LL 1LL 1LL 1LL 1LL 1LL 1LL 1LL | 1HL 1HL 1HL 1HL 1HL 1HL 1HL 1HL<br>1HL 1HL 1HL 1HL 1HL 1HL 1HL 1HL<br>1HL 1HL 1HL 1HL 1HL 1HL 1HL 1HL<br>1HL 1HL 1HL 1HL 1HL 1HL 1HL 1HL<br>1HL 1HL 1HL 1HL 1HL 1HL 1HL 1HL<br>1HL 1HL 1HL 1HL 1HL 1HL 1HL 1HL<br>1HL 1HL 1HL 1HL 1HL 1HL 1HL 1HL<br>1HL 1HL 1HL 1HL 1HL 1HL 1HL 1HL |
| 1LH 1LH 1LH 1LH 1LH 1LH 1LH 1LH<br>1LH 1LH 1LH 1LH 1LH 1LH 1LH 1LH<br>1LH 1LH 1LH 1LH 1LH 1LH 1LH 1LH<br>1LH 1LH 1LH 1LH 1LH 1LH 1LH 1LH<br>1LH 1LH 1LH 1LH 1LH 1LH 1LH 1LH<br>1LH 1LH 1LH 1LH 1LH 1LH 1LH 1LH<br>1LH 1LH 1LH 1LH 1LH 1LH 1LH 1LH<br>1LH 1LH 1LH 1LH 1LH 1LH 1LH 1LH | 1HH 1HH 1HH 1HH 1HH 1HH 1HH 1HH<br>1HH 1HH 1HH 1HH 1HH 1HH 1HH 1HH<br>1HH 1HH 1HH 1HH 1HH 1HH 1HH 1HH<br>1HH 1HH 1HH 1HH 1HH 1HH 1HH 1HH<br>1HH 1HH 1HH 1HH 1HH 1HH 1HH 1HH<br>1HH 1HH 1HH 1HH 1HH 1HH 1HH 1HH<br>1HH 1HH 1HH 1HH 1HH 1HH 1HH 1HH<br>1HH 1HH 1HH 1HH 1HH 1HH 1HH 1HH |

FIG.7

| | | |
|---|---|---|
| 2LL 2LL 2LL 2LL<br>2LL 2LL 2LL 2LL<br>2LL 2LL 2LL 2LL<br>2LL 2LL 2LL 2LL | 2HL 2HL 2HL 2HL<br>2HL 2HL 2HL 2HL<br>2HL 2HL 2HL 2HL<br>2HL 2HL 2HL 2HL | 1HL 1HL 1HL 1HL 1HL 1HL 1HL 1HL<br>1HL 1HL 1HL 1HL 1HL 1HL 1HL 1HL<br>1HL 1HL 1HL 1HL 1HL 1HL 1HL 1HL<br>1HL 1HL 1HL 1HL 1HL 1HL 1HL 1HL |
| 2LH 2LH 2LH 2LH<br>2LH 2LH 2LH 2LH<br>2LH 2LH 2LH 2LH<br>2LH 2LH 2LH 2LH | 2HH 2HH 2HH 2HH<br>2HH 2HH 2HH 2HH<br>2HH 2HH 2HH 2HH<br>2HH 2HH 2HH 2HH | 1HL 1HL 1HL 1HL 1HL 1HL 1HL 1HL<br>1HL 1HL 1HL 1HL 1HL 1HL 1HL 1HL<br>1HL 1HL 1HL 1HL 1HL 1HL 1HL 1HL<br>1HL 1HL 1HL 1HL 1HL 1HL 1HL 1HL |
| 1LH 1LH 1LH 1LH 1LH 1LH 1LH 1LH<br>1LH 1LH 1LH 1LH 1LH 1LH 1LH 1LH<br>1LH 1LH 1LH 1LH 1LH 1LH 1LH 1LH<br>1LH 1LH 1LH 1LH 1LH 1LH 1LH 1LH<br>1LH 1LH 1LH 1LH 1LH 1LH 1LH 1LH<br>1LH 1LH 1LH 1LH 1LH 1LH 1LH 1LH<br>1LH 1LH 1LH 1LH 1LH 1LH 1LH 1LH<br>1LH 1LH 1LH 1LH 1LH 1LH 1LH 1LH | | 1HH 1HH 1HH 1HH 1HH 1HH 1HH 1HH<br>1HH 1HH 1HH 1HH 1HH 1HH 1HH 1HH<br>1HH 1HH 1HH 1HH 1HH 1HH 1HH 1HH<br>1HH 1HH 1HH 1HH 1HH 1HH 1HH 1HH<br>1HH 1HH 1HH 1HH 1HH 1HH 1HH 1HH<br>1HH 1HH 1HH 1HH 1HH 1HH 1HH 1HH<br>1HH 1HH 1HH 1HH 1HH 1HH 1HH 1HH<br>1HH 1HH 1HH 1HH 1HH 1HH 1HH 1HH |

L, H INDICATES VALUE OBTAINED BY
INVERSE WAVELET TRANSFORMATION IN
HORIZONTAL DIRECTION

FIG.16

| TILE 0 | | TILE 1 | |
|---|---|---|---|
| 2LL 2HL 2LL 2HL<br>2LH 2HH 2LH 2HH<br>2LL 2HL 2LL 2HL<br>2LH 2HH 2LH 2HH | 1HL | 2LL 2HL 2LL 2HL<br>2LH 2HH 2LH 2HH<br>2LL 2HL 2LL 2HL<br>2LH 2HH 2LH 2HH | |
| 1LH | 1HH | | |
| TILE 2 | | TILE 3 | |
| 2LL 2HL 2LL 2HL<br>2LH 2HH 2LH 2HH<br>2LL 2HL 2LL 2HL<br>2LH 2HH 2LH 2HH | 1HL | 2LL 2HL 2LL 2HL<br>2LH 2HH 2LH 2HH<br>2LL 2HL 2LL 2HL<br>2LH 2HH 2LH 2HH | |
| 1LH | 1HH | | |

FIG.17

| TILE 0 | ROW A | L3 ROW B L4 | TILE 1 |
|---|---|---|---|
| | 2HL<br>2HH<br>2HL<br>2HH | 2HL<br>2HH<br>2HL<br>2HH | |
| | | | |
| TILE 2 | ROW A | ROW B | TILE 3 |
| 2LL | 2HL<br>2HH<br>2HL<br>2HH | 2HL<br>2HH<br>2HL<br>2HH | |
| 2LH | | | |
| | | | |

FIG.30
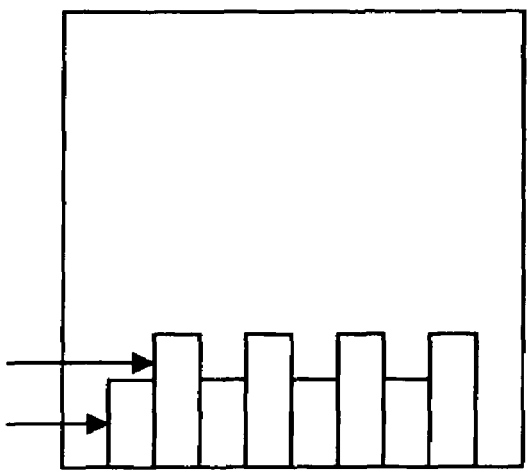
LOW SPEED
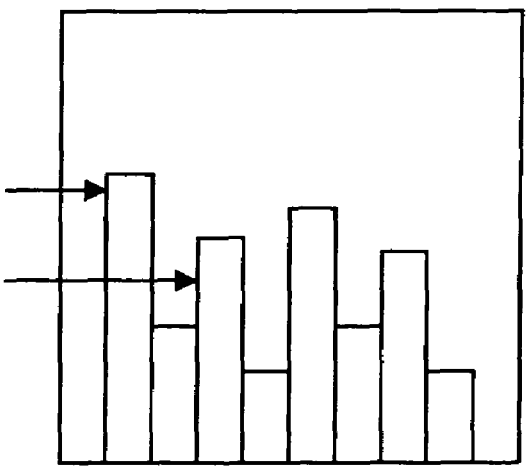
MIDDLE SPEED
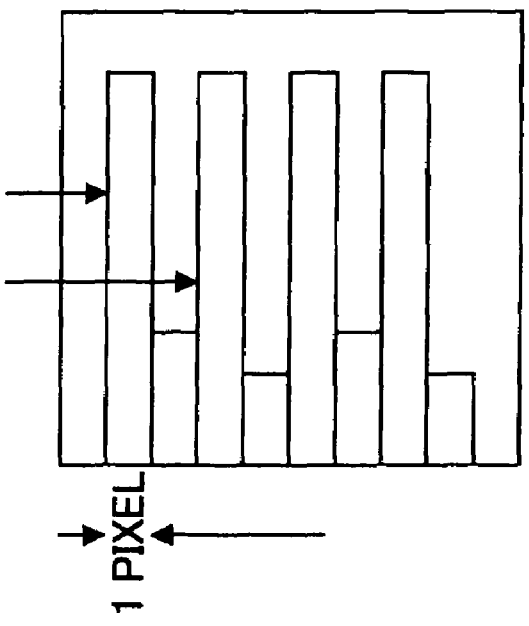
HIGH SPEED

IMAGE PROCESSING APPARATUS, IMAGE PROCESSING METHOD, AND RECORDING MEDIUM THEREOF TO SMOOTH TILE BOUNDARIES

The present application claims priority to and incorporates herein by reference the entire contents of Japanese priority application nos. 2004-159631 and 2004-159632, both filed in Japan on May 28, 2004.

BACKGROUND OF THE INVENTION

1. Field of the Invention

The present invention relates to an image processing apparatus, an image processing method, and a recording medium thereof.

2. Description of the Related Art

Owing to the advances in image input/output technology in recent years, more images are provided with higher definition and the demand for technology enabling compression/decompression (encoding/decoding) of high definition images is growing.

As an encoding method for satisfying such a demand, there is JPEG 2000 that processes a high definition image by dividing the image into small units, and decodes the image that is compressed in a high compression rate by using wavelet transformation as a frequency transformation method. In JPEG 2000, an image is divided into non-overlapping rectangular regions (tiles), in which a single tile is as a basic unit for performing a compression/decompression process. This method of dividing an image into non-overlapping tiles and performing a compression/decompression is effective for using less memory space and accelerating process speed. This method, however, has a problem of creating distortion (discontinuity) in the boundary of the tiles for a decompressed code data (code stream) that is compressed in a high compression rate.

The distortion in the boundary of the tiles may appear to be similar to block distortion in discrete cosine transformation (DCT). As a method for removing the block distortion of DCT, there is a method of adaptively applying a low pass filter to a pixel value(s) in accordance with the direction of the block boundary and edge degree (For example, Japanese Laid-Open Patent Application Nos. 5-316361 and 9-307855, or Japanese Registered Patent No. 2839987). As a method for reducing tile boundary distortion for JPEG 2000, there is a method of applying a low pass filter to a pixel value(s) in the vicinity of the tile boundary of a target decompression image (For example, Japanese Laid-Open Patent Application Nos. 2004-40252, 2004-40670, 2004-46583). Furthermore, as a method for reducing the tile boundary distortion for a dynamic picture image(s) having each frame compressed with JPEG 2000, there is a method of controlling the strength for applying a low pass filter to a pixel value(s) in the vicinity of the tile boundary in accordance with, for example, frame rate.

Regardless of how adaptively the low pass filters are applied, these methods using the low pass filter face a tradeoff problem between smoothing of distortion itself (anticipated effect) and smoothing of real edges (unanticipated effect). For example, with respect to the methods disclosed in Japanese Laid-Open Patent Application Nos. 5-316361 and 9-307855, or Japanese Registered Patent No. 2839987, although the distortion at the block boundary is smoothed by adaptively applying a low pass filter to the pixel value in accordance with the direction of the block boundary and the edge degree, these methods are, at the same time, designed to avoid smoothing of real edges situated at the block boundary.

Meanwhile, there is another method of reducing tile boundary distortion on a wavelet coefficient space with an image compression/decompression system using a wavelet transformation (See Japanese Laid-Open Patent Application No. 2001-257596).

This method of reducing tile boundary distortion on a wavelet coefficient space (in a broader term, frequency coefficient space) shown in Japanese Laid-Open Patent Application No. 2001-257596 is expected to obtain better results compared to applying a low pass filter on an image space. However, this method tends to require a relatively long process time. That is, in a case of processing encoded data subject to hierarchical frequency transformation, such as data encoded with JPEG 2000, the process time tends to increase by repetitively applying a prescribed process to plural hierarchies (levels) for reducing tile boundary distortion. In a case of processing moving images, shortening the time for reducing tile boundary distortion is one important aspect since a decoding process of a frame(s) is to be completed within a limited frame period.

SUMMARY OF THE INVENTION

An image processing apparatus, image processing method, and recording medium thereof are described. In one embodiment, an image processing apparatus comprises a coefficient correction unit to correct only high frequency coefficient situated adjacent to a tile boundary of an encoded image data divided into non-overlapping tiles.

BRIEF DESCRIPTION OF THE DRAWINGS

FIG. 4 is a diagram showing a coefficient arrangement after performing wavelet transformation on the original image of FIG. 3 in a vertical direction;

FIG. 5 is a diagram showing a coefficient arrangement after performing wavelet transformation on the original image of FIG. 4 in a horizontal direction;

FIG. 6 is a diagram showing a coefficient arrangement of deinterleaving the coefficients of FIG. 5;

FIG. 7 is a diagram showing a coefficient arrangement of deinterleaving after performing two-dimensional wavelet transformation for a second time;

FIG. 16 is a diagram showing an arrangement of coefficients in an interleave state in decomposition level 2;

FIG. 17 is a diagram showing an arrangement of coefficients for coefficient correction in a horizontal direction in decomposition level 2;

FIG. 30 is a diagram showing a relation between movement and edge amount of a comb shape in a horizontal direction;

DETAILED DESCRIPTION

Figure 1:
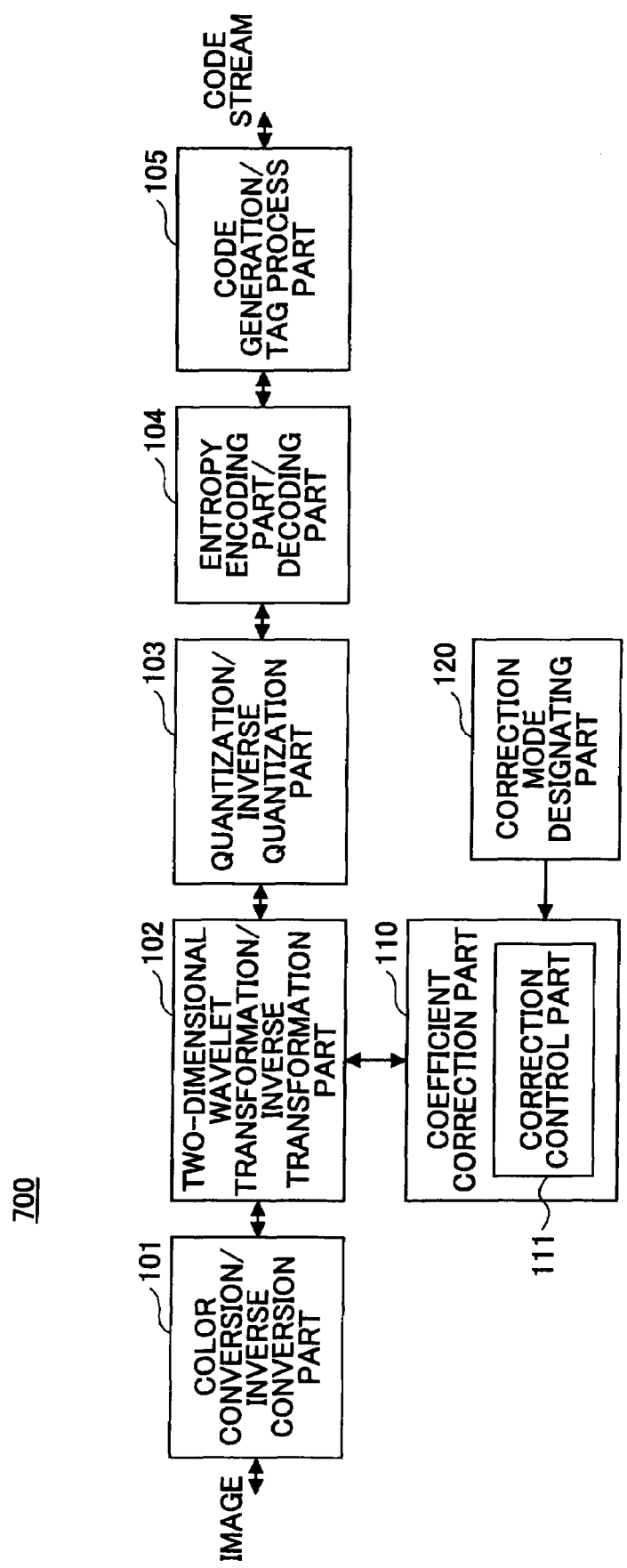
FIG. 1 is a block diagram for illustrating an embodiment of the present invention.

Embodiments of the present invention provide an image processing apparatus, an image processing method, and a recording medium thereof that substantially obviates one or more of the problems caused by the limitations and disadvantages of the related art.

Features and advantages of embodiments of the present invention will be set forth in the description which follows, and in unit will become apparent from the description and the accompanying drawings, or may be learned by practice of the invention according to the teachings provided in the description. Features and advantages of embodiments of the present invention will be realized and attained by an image processing apparatus, an image processing method, and a recording medium thereof particularly pointed out in the specification in such full, clear, concise, and exact terms as to enable a person having ordinary skill in the art to practice the invention.

To achieve these and other advantages as embodied and broadly described herein, embodiments of the invention include an image processing apparatus including: a coefficient correction unit for correcting only a high frequency coefficient situated adjacent to a tile boundary of an encoded image data divided into non-overlapping tiles; wherein the high frequency coefficient is corrected during a process of decoding the encoded image data.

Furthermore, one embodiment of the present invention includes an image processing apparatus including: a coefficient correction unit for correcting a first high frequency coefficient situated adjacent to a tile boundary of an encoded image data divided into non-overlapping tiles, and a second high frequency coefficient situated in the vicinity of but not adjacent to the tile boundary; wherein the first and second high frequency coefficients are corrected during a process of decoding the encoded image data; wherein the coefficient correction unit is operated to adaptively exclude the second high frequency coefficient from the correction according to the number of quantization steps of the second high frequency coefficient.

In the image processing apparatus according to one embodiment of the present invention, the coefficient correction unit may adaptively exclude the second high frequency coefficient from the correction when the number of the quantization steps of the second high frequency coefficient is no greater than a predetermined value.

Furthermore, one embodiment of the present invention includes an image processing apparatus including: a coefficient correction unit for correcting a first high frequency coefficient situated adjacent to a tile boundary of an encoded image data divided into non-overlapping tiles, and a second high frequency coefficient situated in the vicinity of but not adjacent to the tile boundary; wherein the first and second high frequency coefficients are corrected during a process of decoding the encoded image data; wherein the coefficient correction unit adaptively excludes the second high frequency coefficient from the correction according to the value of the second high frequency coefficient.

In the image processing apparatus according to one embodiment of the present invention, the coefficient correction unit adaptively excludes the second high frequency coefficient from the correction when the value of the second high frequency coefficient is 0.

Furthermore, one embodiment of the present invention includes an image processing apparatus including: a coefficient correction unit for correcting a first high frequency coefficient situated adjacent to a tile boundary of an encoded image data divided into non-overlapping tiles, and a second high frequency coefficient situated in the vicinity of but not adjacent to the tile boundary; wherein the first and second high frequency coefficients are corrected during a process of decoding the encoded image data; wherein the coefficient correction unit adaptively excludes the second high frequency coefficient from the correction according to the value of the second high frequency coefficient and the number of quantization steps of the second high frequency coefficient.

In the image processing apparatus according to one embodiment of the present invention, the coefficient correction unit adaptively excludes the second high frequency coefficient from the correction when the number of quantization steps of the second high frequency coefficient is no greater than a predetermine value and when the value of the second high frequency coefficient is 0.

Furthermore, one embodiment of the present invention includes an image processing apparatus including: a coefficient correction unit for correcting high frequency coefficients, the coefficient correction unit being operable in a first correction mode for correcting only a first high frequency coefficient situated adjacent to a tile boundary of an encoded image data divided into non-overlapping tiles, and in a second correction mode for correcting a second high frequency coefficient situated in the vicinity of but not adjacent to the tile boundary; and a correction mode designating unit for designating the correction mode of the coefficient correction unit; wherein the firsthand second high frequency coefficients are corrected during a process of decoding the encoded image data; wherein the coefficient correction unit selectively executes the correction mode designated by the correction mode designating unit.

In the image processing apparatus according to one embodiment of the present invention, the coefficient correction unit adaptively excludes the second high frequency coefficient from the correction in the second correction mode according to the number of quantization steps of the second high frequency coefficient.

In the image processing apparatus according to one embodiment of the present invention, the coefficient correction unit adaptively excludes the second high frequency coefficient from the correction in the second correction mode according to the value of the second high frequency coefficient.

In the image processing apparatus according to one embodiment of the present invention, the coefficient correction unit adaptively excludes the second high frequency coefficient from the correction in the second correction mode according to the value of the second high frequency coefficient and the number of quantization steps of the second high frequency coefficient.

In the image processing apparatus according to one embodiment of the present invention, the encoded image data may be encoded by hierarchically conducting frequency transformation on each tile, wherein the coefficient correction unit corrects the high frequency coefficient belonging to a predetermined hierarchy level.

In the image processing apparatus according to one embodiment of the present invention, the encoded image data may be encoded by conducting wavelet transformation on each tile.

In the image processing apparatus according to one embodiment of the present invention, the encoded image data may be encoded with JPEG 2000.

Furthermore, one embodiment of the present invention includes an image processing method including a step of: correcting only a high frequency coefficient situated adjacent to a tile boundary of an encoded image data divided into non-overlapping tiles; wherein the high frequency coefficient is corrected during a process of decoding the encoded image data.

Furthermore, one embodiment of the present invention includes an image processing method including: correcting a first high frequency coefficient situated adjacent to a tile boundary of an encoded image data divided into non-overlapping tiles, and a second high frequency coefficient situated in the vicinity of but not adjacent to the tile boundary; wherein the first and second high frequency coefficients are corrected during a process of decoding the encoded image data; wherein the second high frequency coefficient is adaptively excluded from the correcting operation according to at least one of the number of quantization steps of the second high frequency coefficient and the value of the second high frequency coefficient.

Furthermore, one embodiment of the present invention includes a recording medium on which a program for causing a computer to execute an image processing method is recorded, the image processing method including: correcting only a high frequency coefficient situated adjacent to a tile boundary of an encoded image data divided into non-overlapping tiles; wherein the high frequency coefficient is corrected during a process of decoding the encoded image data.

Furthermore, one embodiment of the present invention includes a recording medium on which a program for causing a computer to execute an image processing method is recorded, the image processing method including: correcting a first high frequency coefficient situated adjacent to a tile boundary of an encoded image data divided into non-overlapping tiles, and a second high frequency coefficient situated in the vicinity of but not adjacent to the tile boundary; wherein the first and second high frequency coefficients are corrected during a process of decoding the encoded image data wherein the second high frequency coefficient is adaptively excluded from the correcting operation according to at least one of the number of quantization steps of the second high frequency coefficient and the value of the second high frequency coefficient.

Furthermore, one embodiment of the present invention includes an image processing apparatus including: a coefficient correction unit for correcting a first high frequency coefficient situated adjacent to a tile boundary of an encoded frame data of a moving image divided into non-overlapping tiles, and a second high frequency coefficient situated in the vicinity of but not adjacent to the tile boundary, the first and second high frequency coefficients being corrected during a process of decoding the encoded frame data; a movement amount estimation unit for estimating a movement amount of each frame; and a correction control unit for controlling the correction of the coefficient control unit so that the second high frequency coefficient is excluded from the correction according to the estimated movement amount estimated by the movement estimation unit and the number of quantization steps of the second high frequency coefficient.

In the image processing apparatus according to one embodiment of the present invention, the correction control unit excludes the second high frequency coefficient from the correction when the number of quantization steps is no greater than a threshold th1, wherein the correction control unit changes the threshold th1 according to the estimated movement amount.

In the image processing apparatus according to one embodiment of the present invention, in a case where the estimated movement amount exceeds a predetermined value, the correction control unit excludes the second high frequency coefficient from the correction, wherein in a case where the estimated movement amount is no greater than the predetermined value, the correction control unit excludes the second high frequency coefficient from the correction when the number of quantization steps of the second high frequency coefficient is no greater than a predetermined value.

Furthermore, one embodiment of the present invention includes an image processing apparatus including: a coefficient correction unit for correcting a first high frequency coefficient situated adjacent to a tile boundary of an encoded frame data of a moving image divided into non-overlapping tiles, and a second high frequency coefficient situated in the vicinity of but not adjacent to the tile boundary, the first and second high frequency coefficients being corrected during a process of decoding the encoded frame data; a movement amount estimation unit for estimating a movement amount of each frame; and a correction control-unit for controlling the correction of the coefficient control unit so that the second high frequency coefficient is excluded from the correction according to the estimated movement amount estimated by the movement estimation unit and the value of the second high frequency coefficient.

In the image processing apparatus according to one embodiment of the present invention, in a case where the estimated movement amount exceeds a predetermined value, the correction control unit excludes the second high frequency coefficient from the correction, wherein in a case where the estimated movement amount is no greater than the predetermined value, the correction control unit excludes the second high frequency coefficient from the correction when the value of the second high frequency coefficient is 0.

Furthermore, one embodiment of the present invention includes an image processing apparatus including: a coefficient correction unit for correcting a first high frequency coefficient situated adjacent to a tile boundary of an encoded frame data of a moving image divided into non-overlapping tiles, and a second high frequency coefficient situated in the vicinity of but not adjacent to the tile boundary, the first and second high frequency coefficients being corrected during a process of decoding the encoded frame data; a movement amount estimation unit for estimating a movement amount of each frame; and a correction control unit for controlling the correction of the coefficient control unit so that the second high frequency coefficient is excluded from the correction according to the estimated movement amount estimated by the movement estimation unit, the number of quantization steps of the second high frequency coefficient and the value of the second high frequency coefficient.

In the image processing apparatus according to one embodiment of the present invention, the correction control unit excludes the second high frequency coefficient from the correction when the number of quantization steps is no greater than a threshold th1 and when the value of the second high frequency coefficient is 0, wherein the correction control unit changes the threshold th1 according to the estimated movement amount.

In the image processing apparatus according to one embodiment of the present invention, in a case where the estimated movement amount is no less than a predetermined value, the correction control unit excludes the second high frequency coefficient from the correction, wherein in a case where the estimated movement amount is less than the predetermined value, the correction control unit excludes the second high frequency coefficient from the correction when the number of quantization steps of the second high frequency coefficient is no greater than a predetermined value and when the value of the second high frequency coefficient is 0.

In the image processing apparatus according to one embodiment of the present invention, the encoded frame data may be encoded by hierarchically conducting frequency transformation on each tile, wherein the coefficient correction unit corrects the high frequency coefficient belonging to a predetermined hierarchy level.

In the image processing apparatus according to one embodiment of the present invention, the encoded frame data may be encoded by conducting wavelet transformation on each tile of each frame.

In the image processing apparatus according to one embodiment of the present invention, the encoded frame data may be encoded with JPEG 2000.

Furthermore, one embodiment of the present invention includes an image processing method including: a) correcting a first high frequency coefficient situated adjacent to a tile boundary of an encoded frame data of a moving image divided into non-overlapping tiles, and a second high frequency coefficient situated in the vicinity of but not adjacent to the tile boundary, the first and second high frequency coefficients being corrected during a process of decoding the encoded frame data; b) estimating a movement amount of each frame; and c) controlling the correction in operation a) so that the second high frequency coefficient is excluded from the correction according to the estimated movement amount estimated in operation b) and the number of quantization steps of the second high frequency coefficient.

Furthermore, one embodiment of the present invention includes an image processing method including: a) correcting a first high frequency coefficient situated adjacent to a tile boundary of an encoded frame data of a moving image divided into non-overlapping tiles, and a second high frequency coefficient situated in the vicinity of but not adjacent to the tile boundary; b) estimating a movement amount of each frame; and c) controlling the correction in operation a) so that the second high frequency coefficient is excluded from the correction according to the estimated movement amount estimated in operation b) and the value of the second high frequency coefficient.

Furthermore, one embodiment of the present invention includes an image processing method including: a) correcting a first high frequency coefficient situated adjacent to a tile boundary of an encoded frame data of a moving image divided into non-overlapping tiles, and a second high frequency coefficient situated in the vicinity of but not adjacent to the tile boundary; b) estimating a movement amount of each frame; and c) controlling the correction in operation a) so that the second high frequency coefficient is excluded from the correction according to the estimated movement amount estimated in operation b), the number of quantization steps of the second high frequency coefficient, and the value of the second high frequency coefficient.

Furthermore, one embodiment of the present invention includes a recording medium on which a program for causing a computer to execute an image processing method is recorded, the image processing method including: a) correcting a first high frequency coefficient situated adjacent to a tile boundary of an encoded frame data of a moving image divided into non-overlapping tiles, and a second high frequency coefficient situated in the vicinity of but not adjacent to the tile boundary; b) estimating a movement amount of each frame; and c) controlling the correction of operation a) so that the second high frequency coefficient is excluded from the correction according to the estimated movement amount estimated in operation b) and the number of quantization steps of the second high frequency coefficient.

Furthermore, one embodiment of the present invention includes a recording medium on which a program for causing a computer to execute an image processing method is recorded, the image processing method including: a) correcting a first high frequency coefficient situated adjacent to a tile boundary of an encoded frame data of a moving image divided into non-overlapping tiles, and a second high frequency coefficient situated in the vicinity of but not adjacent to the tile boundary; b) estimating a movement amount of each frame; and c) controlling the correction of operation a) so that the second high frequency coefficient is excluded from the correction according to the estimated movement amount estimated in operation b) and the value of the second high frequency coefficient.

Furthermore, one embodiment of the present invention includes a recording medium on which a program for causing a computer to execute an image processing method is recorded, the image processing method including: a) correcting a first high frequency coefficient situated adjacent to a tile boundary of an encoded frame data of a moving image divided into non-overlapping tiles, and a second high frequency coefficient situated in the vicinity of but not adjacent to the tile boundary; b) estimating a movement amount of each frame; and c) controlling the correction of operation a) so that the second high frequency coefficient is excluded from the correction according to the estimated movement amount estimated in operation b), the number of quantization steps of the second high frequency coefficient, and the value of the second high frequency coefficient.

Other objects and further features of one embodiment of the present invention will be apparent from the following detailed description when read in conjunction with the accompanying drawings.

In the following, embodiments of the present invention will be described with reference to the accompanying drawings.

FIG. 1 is a block diagram for explaining one embodiment of the present invention. Although the image processing apparatus 700 according to one embodiment of the present invention shown in FIG. 1 may include ① a decoding function of generating image data of a code stream (encoded data) encoded with JPEG 2000 and ② an encoding function of generating a code stream by encoding (non-encoded) image data by employing a JPEG 2000 algorithm, the image processing apparatus 700 may be provided without the encoding function. One characteristic of the image processing apparatus 700 is a function of correcting coefficients for reducing (controlling) distortion at a tile boundary in a decoding process of decoding encoded data.

In FIG. 1, a color conversion/inverse conversion unit 101, a two-dimensional wavelet transformation/inverse transformation unit 102, a quantization/inverse quantization unit 103, and an entropy encoding/decoding unit 104, and a code generation/tag processing unit 105 are basic components for performing the encoding function and the decoding function. That is, these components are included in an encoding process unit and a decoding process unit.

A coefficient correction unit 110, in cooperation with the two-dimensional wavelet transformation/inverse transformation unit 102 (wavelet transformation/inverse transformation unit) included in the decoding process unit, serve as a unit for executing a correction process in the decoding process for controlling tile boundary distortion on the wavelet coefficient space. The coefficient correction unit 110 may include a correction control unit 111 which adaptively executes control on whether to correct the high frequency (high pass) coefficients situated not adjacent to the tile boundary (not directly contacting the tile boundary) but situated in the vicinity of the tile boundary depending on, for example, coefficient value, number of quantization steps, or both the coefficient value and the number of quantization steps. The correction control unit 111 may be omitted in a case of not executing the adaptive control for correcting the high frequency coefficients.

The image processing apparatus 700 may include a correction mode designating unit 120. The correction mode designating unit 120 enables the user to designate a desired operation mode (correction mode) for executing a coefficient correction process with the coefficient correction unit 110. The correction mode designating unit 120 is provided in a case where the user is able to designate a desired correction mode, and may be excluded from one embodiment of the present invention.

Figure 28:
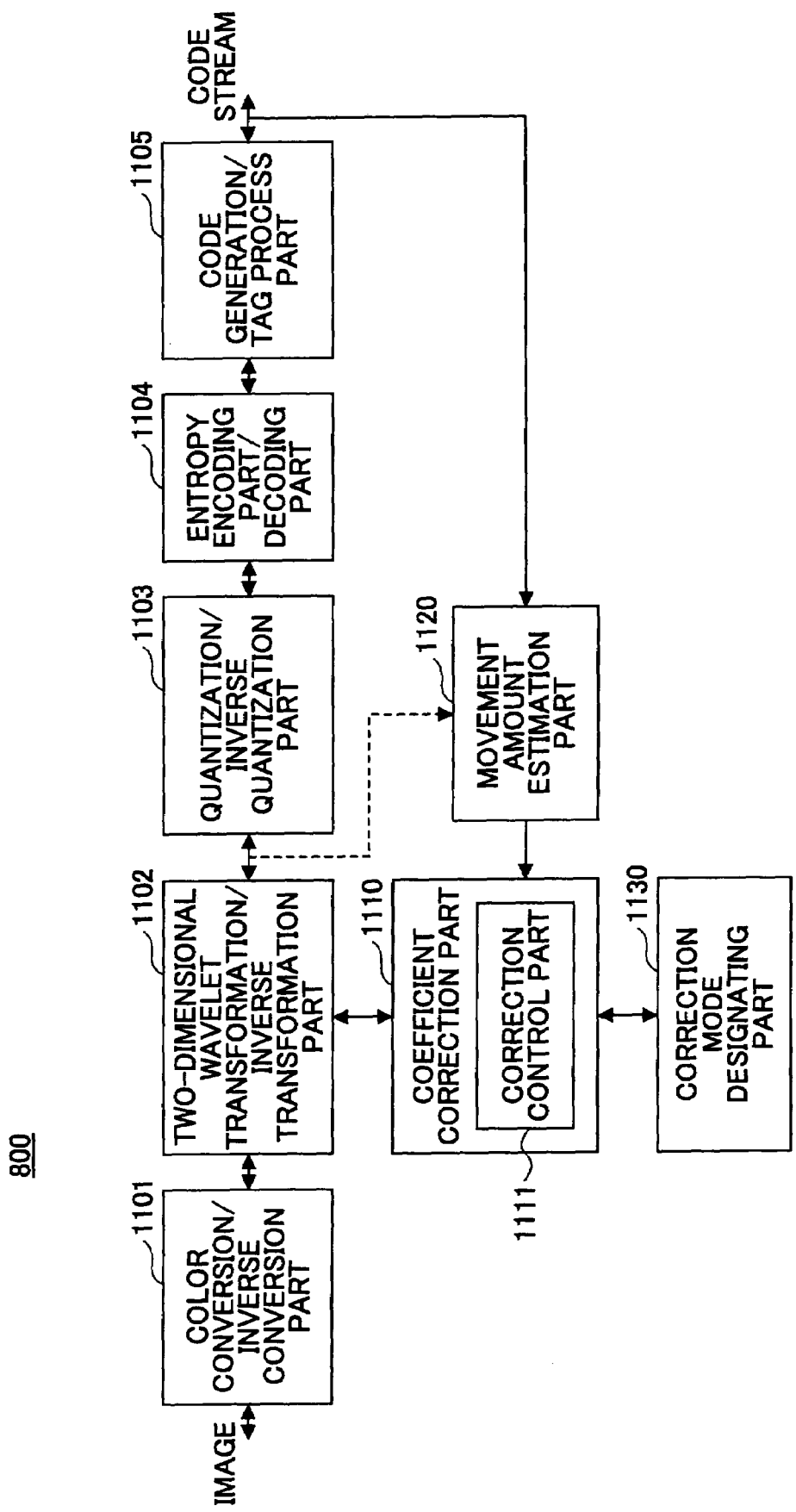
FIG. 28 is a block diagram for illustrating another embodiment of the present invention.

Meanwhile, according to another embodiment of the present invention, FIG. 28 is a block diagram for explaining another embodiment of the present invention. Although the image processing apparatus 800 according to the embodiment of the present invention shown in FIG. 28 may include ① a decoding function of generating image data of each frame by decoding encoded data of each frame in a moving image (dynamic image) encoded with Motion-JPEG 2000 by employing a JPEG 2000 algorithm and ② an encoding function of generating a code stream by encoding non-encoded data of each frame in a moving image by employing a JPEG 2000 algorithm, the image processing apparatus 800 may be provided without the encoding function. One characteristic of the image processing apparatus 800 is a function of reducing (controlling) distortion at a tile boundary on a wavelet coefficient space in a decoding process of decoding data of each frame of a moving image encoded with Motion-JPEG 2000.

The image processing apparatus 800 according to one embodiment of the present invention decodes moving images (dynamic images) that are encoded mainly with Motion-JPEG 2000. In Motion-JPEG 2000, multiple temporally consecutive still images are processed as frames of a moving image, in which each frame is separately encoded by a JPEG 2000 algorithm. In the moving images of Motion-JPEG 2000, the image of each frame includes an interlaced image and a non-interlaced image. In the following description, however, the image of each frame mainly refers to the interlaced image. The interlaced image includes odd number fields having only odd number lines scanned in an interlaced manner and even number fields having only even number lines scanned in an interlaced manner. In Motion-JPEG 2000, in a case where each frame is an interlaced image, there are two encoding types in which one is a field based encoding method for encoding field by field, and the other is a frame based encoding method for encoding frame by frame. However, Motion-JPEG 2000 in one embodiment of the present invention is described mainly as encoding with the frame based encoding method.

In FIG. 28, a color conversion/inverse conversion unit 1101, a two-dimensional wavelet transformation/inverse transformation unit 1102, a quantization/inverse quantization unit 1103, and an entropy encoding/decoding unit 1104, and a code generation/tag processing unit 1105 are basic components for performing the encoding function and the decoding function in accordance with the JPEG 2000 algorithm. That is, these components are included in an encoding process unit and a decoding process unit.

A coefficient correction unit 1110, in cooperation with the two-dimensional wavelet transformation/inverse transformation unit 1102 (wavelet transformation/inverse transformation unit) included in the decoding process unit, serve as a unit for executing a correction process in the decoding process for controlling tile boundary distortion on the wavelet coefficient space. The coefficient correction unit 1110 includes a correction control unit 1111 which adaptively executes control on whether to correct the high frequency coefficients situated not adjacent to the tile boundary (not directly contacting the tile boundary) but situated in the vicinity of the tile boundary depending on, for example, the amount of frame movement (frame movement amount), coefficient value, number of quantization steps, or both the coefficient value and the number of quantization steps.

The image processing apparatus 800 further includes a movement estimation unit (movement amount estimation unit) 1120 for estimating the amount of movement of each frame in a moving image (amount of movement of a target object or a scene). The movement estimation unit 1120 according to an embodiment of the present invention estimates the amount of movement of the frame by using a relation between the amount of movement of the target object in an interlaced image and the amount of edge of a "comb shape" with respect to a horizontal direction (described in detail below).

The image processing apparatus 800 may include a correction mode designating unit 1130. The correction mode designating unit enables the user to designate a desired operation mode (correction mode) for executing a coefficient correction process with the coefficient correction unit 1110. The correction mode designating unit 1130 is provided in a case where the user is able to designate a desired correction mode, and may be excluded from one embodiment of the present invention.

Next, an operation of an encoding process of the image processing apparatus 700 or 800 according to an embodiment of the present invention is described. For example, in a case where each frame of the moving image is a color image including R (Red), G (Green), and B (Blue) as its color components, the data of each component is divided into non-overlapping rectangular tiles (referred to as "tiling"). The encoding process is performed on a divided tile serving as a basic unit.

First, the color conversion/inverse conversion unit 101 or 1101 performs a color space conversion process on the data of each tile of each component for converting the data to components of Y, Cb, Cr, (or Y, U, V). Next, the two-dimensional wavelet transformation/inverse transformation unit 102 or 1102 performs a two-dimensional wavelet transformation on each component in a tile by tile basis and spatially divides the components into frequency bands (sub-bands).

The entropy encoding/decoding unit 104 or 1104 performs an entropy encoding process on the wavelet transformed coefficients after the wavelet transformed coefficients are linearly quantized (according to necessity) by the quantization/inverse quantization unit 103 or 1103 in each sub-band. Although it is possible to encode the wavelet transformed coefficients in an unprocessed state, the JPEG 2000, normally, encodes the coefficient values of the wavelet transformed coefficients by dividing the coefficients into "bit-plane" units in order to improve encoding efficiency (More specifically, the encoding is performed by dividing the bit planes into three sub-bit planes). In the encoding process, the bits, which are subject to the encoding process, are determined according to a predetermined order for performing encoding. Then, the quantization/inverse quantization unit 103 or 1103 generates context from bits surrounding the target bit(s). Then, the code is determined by probability estimation based on the generated context and the target bit (s). Then, the code generation/tag process unit 105 or 1105 generates and outputs a code stream (encoded data) of a predetermined format by generating a packet(s) by eliminating unnecessary codes/gathering necessary codes, aligning the packets in a predetermined order, and inserting a tag or tag information therein.

As described above, a code stream encoded with JPEG 2000 or each frame of a code stream encoded with JPEG 2000 is one type of encoded data obtained by performing frequency transformation (two-dimensional wavelet transformation) on an image in units of non-overlapping tiles.

Next, an operation of performing a decoding process on encoded data (including each frame in a moving image (code stream) encoded with Motion-JPEG 2000) is described. In the code-generation/tag process unit 105 or 1105, the code stream is divided into code streams of each tile of each component by interpreting the tag information attached to the code stream. Then, a decoding process is performed on the divided code streams of each tile of each component.

The position of the bit(s) subject to the decoding process is based on the order based on the tag information in the code stream. In the quantization/inverse quantization unit 103 or 1103, the context is generated based on the arrangement of the bits (already decoded bits) surrounding a target bit position. In the entropy encoding/decoding unit 104 or 1104, a target bit is generated by performing probability estimation according to the context and the code stream and is written to the position of the target bit.

Then, the quantization/inverse quantization unit 103 or 1103 performs a prescribed inverse quantization process on the decoded wavelet transformation coefficients. Then, the two-dimensional wavelet transformation/inverse transformation unit 102 or 1102 performs two-dimensional inverse wavelet transformation on the coefficients, to thereby reconstitute (reconstruct) the image data of each tile of each component. The coefficient correction unit 110 or 1110 executes a coefficient correction process in the step of performing two-dimensional inverse wavelet transformation for controlling distortion in the tile boundary (described in detail below). Then, the color conversion/inverse conversion unit 101 or 1101 converts the color of the reconstituted image data of each frame to that of its original calorimetric system.

The above-described image processing apparatus 700 and 800 according to embodiments of the present invention as shown in FIGS. 1 and 28 may be provided in the form of an independent apparatus. Alternatively, the above-described image processing apparatus 700 or 800 may be provided in the form of an apparatus assembled to a general purpose computer (e.g. personal computer), a digital camera, a mobile phone, a mobile information terminal, a medical purpose image processing apparatus, a network apparatus (e.g. a web server on the Internet, a file server in a LAN), or a device for handling image data and encoded data. Furthermore, the image processing apparatus 700 or 800 may be provided in the form of hardware, firmware, software, or as a combination thereof.

Figure 2:
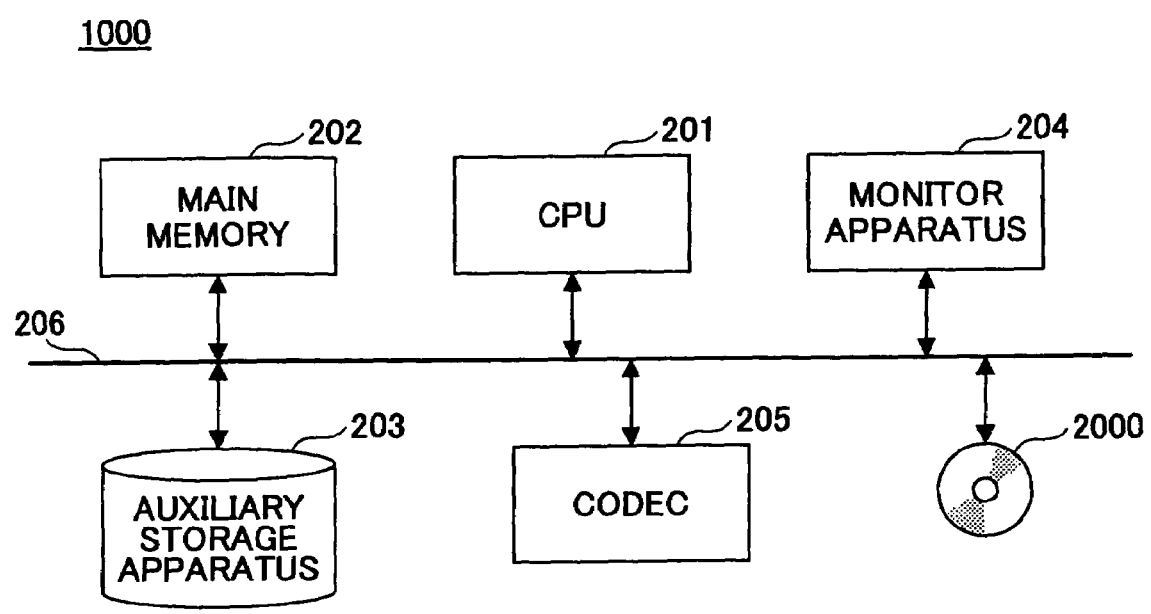
FIG. 2 is a block diagram for illustrating an example of implementing an image processing apparatus with a computer according to an embodiment of the present invention.

Next, reference is made to FIG. 2 for explaining a case of providing the above-described image processing apparatus 700 or 800 of the present invention in the form of a program executed with a computer 1000 (e.g. a general purpose computer or a microcomputer).

In FIG. 2, reference numeral 201 indicates a Central Processing Unit (CPU), reference numeral 202 indicates a main memory 202, reference numeral 203 indicates an auxiliary storage apparatus (e.g. a hard disk for storing programs and data), reference numeral 204 is a monitor apparatus for displaying, for example, an image, and reference numeral 205 indicates a CODEC (encoder/decoder) complying to PEG 2000. The foregoing units 201-205 in FIG. 2 are connected with a bus 206. It is to be noted, however, that the CODEC 205 may alternatively be omitted.

A program, which enables the computer 1000 to execute the functions of the units 101-110, 1101-1105, 1110, 1120, and 1130 of the image processing apparatuses 700 and 800 shown in FIGS. 1 and 28, may, for example, be loaded to the main memory 202 by the auxiliary storage apparatus 203. By interpreting/executing a command(s) from the CPU 201, the functions of the units 101-110, 120, 1101-1105, 1110, 1120 and 1130 can be achieved. It is to be noted that, in a case where the computer 1000 is provided with the CODEC 205, the CODEC 205 may be used for providing the functions of, for example, the units 101-105, 1101-1105 of the coefficient correction unit 110 and 1110, the movement amount estimation unit 1120, and the correction mode designating unit 120 or 1130, and/or allow a program to provide only the functions of controlling wavelet transformation/inverse transformation related to coefficient correction.

Next, an exemplary flow of processing image data or encoded data using the computer 1000 in the image processing apparatus 700 or 800 according to an embodiment of the present invention is described. First, the main memory reads the image data or encoded data sent from the auxiliary storage apparatus 203 for performing an encoding process or a decoding process on the image data or the encoded data. In a case of performing the decoding process, a coefficient correction process for controlling tile boundary distortion is performed in the decoding process and/or a movement amount estimation process, for example, are performed for the coefficient correction process. The image data reconstructed in the main memory 202 is, for example, displayed on the monitor apparatus 204. In a case of performing the encoding process, the encoded data is generated in the main memory 202, and is stored, for example, in the auxiliary storage apparatus 203.

Embodiments of the present invention includes a program (e.g. application program, device driver) for causing a computer to execute the units (including the coefficient correction unit 110 or 1110 and the movement amount estimation unit 1120) of the image processing apparatus 700 or 800 of the present invention as well as a recording medium 2000 (computer-readable information recording (storage) medium) (e.g. a magnetic disk, a optical disk, a magneto-optic disk, a semiconductor memory element) having the program recorded thereto.

Next, a wavelet transformation process (wavelet transformation method) is described for enabling a better understanding of a below-described principle of controlling tile boundary distortion on a wavelet coefficient space with the coefficient correction unit 110 or 1110.

FIGS. 3-8 are diagrams for explaining a process of performing two-dimensional (in the order of a perpendicular direction and a horizontal direction) wavelet transformation (referred to as 5×3 transformation) on a 16×16 pixel monochrome image.

Figure 3:
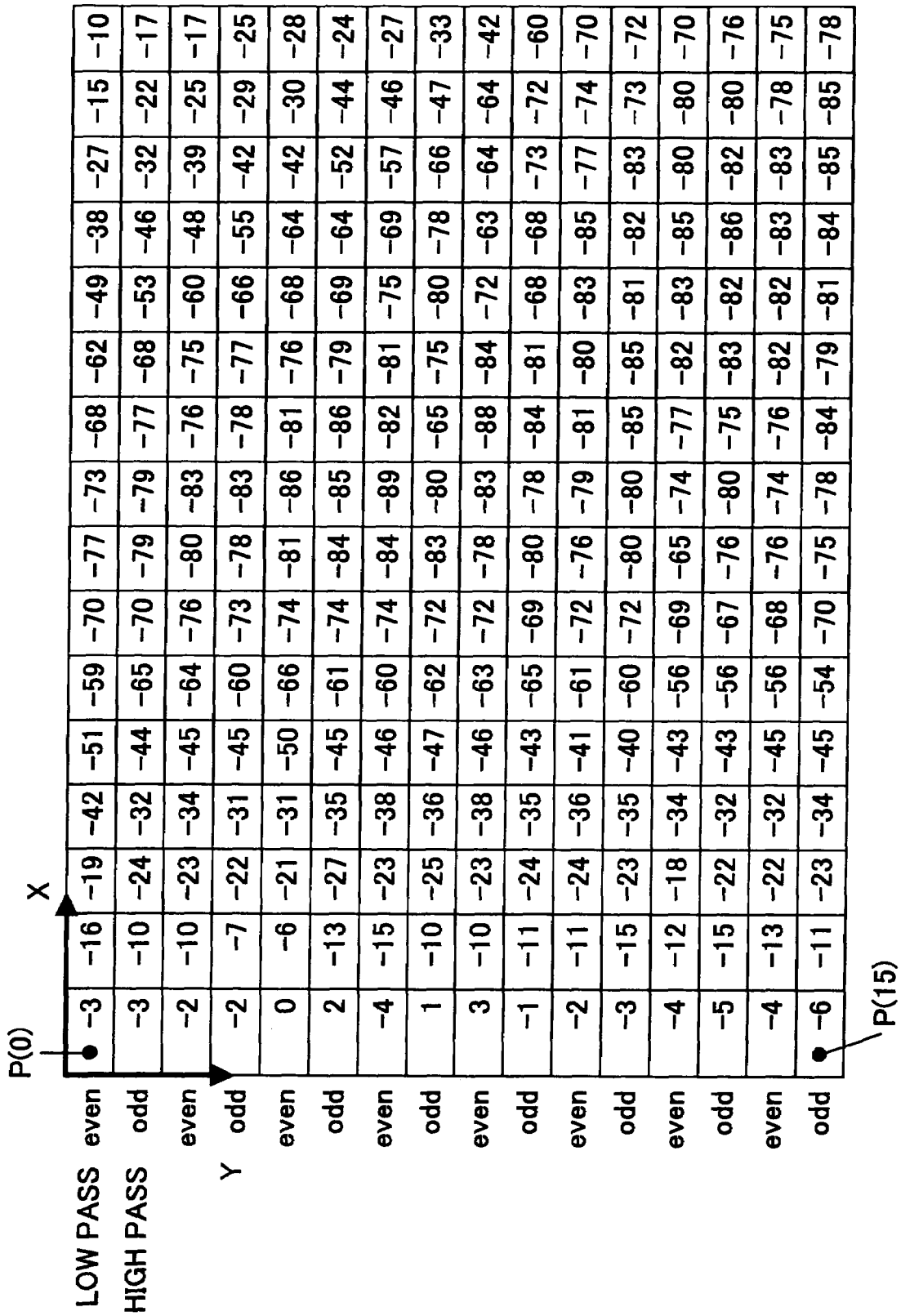
FIG. 3 is a diagram showing an original image and a coordinate system.

In assuming X and Y coordinates of an image as shown in FIG. 3, a pixel value of a pixel having x as an X coordinate with respect to y as a Y coordinate is expressed as P(y) ($0 \leq y \leq 15$). In JPEG 2000, a high pass filter is applied, in a vertical direction (Y axis direction), centrally to pixels having a Y coordinate of an odd number (y=2i+1), to thereby obtain a coefficient of C(2i+1). Then, a low pass filter is applied, in a vertical direction (Y axis direction), centrally to pixels having a Y coordinate of an even number (y=2i), to thereby obtain a coefficient of C(2i). This application of filters is performed on every x. The high pass filter is expressed as Formula (1) and the low pass filter is expressed as Formula (2), as shown below.

$$C(2i+1)=P(2i+1)-\lfloor (P(2i)+P(2i+2))/2 \rfloor \qquad \text{Formula (1)}$$

$$C(2i)=P(2i)+\lfloor (C(2i-1)+C(2i+1)+2)/4 \rfloor \qquad \text{Formula (2)}$$

Figure 8:
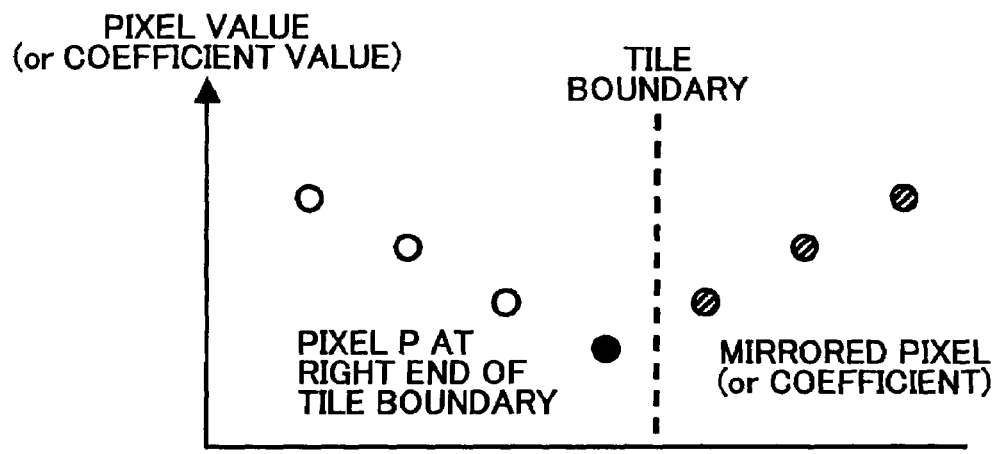
FIG. 8 is a diagram for illustrating a mirroring process.

In the above formulas, symbol $\lfloor \_x\_ \rfloor$ indicates a floor function (a function of replacing a real number x to an integer nearest to x but without exceeding x). For an edge part of an image (or a boundary part of an tile), there may be a case where there is no adjacent pixel group (or an adjacent coefficient group) situated adjacent to a main pixel. In such a case, the pixel value (coefficient value) is adaptively complemented (compensated) by using a method referred to as "mirroring" as shown in FIG. 8. The mirroring method is a method of returning a pixel value (or a coefficient value) in a linear symmetrical manner with respect to an edge of an image (tile boundary) situated at the center, and regarding the returned value as the value of the adjacent pixel (coefficient) group. This mirroring is one of the main causes for causing distortion in the tile boundary.

Here, in a case where the coefficient obtained by the high pass filter is expressed as H and the coefficient obtained by the low pass filter is expressed as L (for the sake of simplification), the image shown in FIG. 3 is transformed to an arrangement of L coefficients and H coefficients shown in FIG. 4 by executing the above-described transformation in the vertical direction.

Next, a high pass filter is applied, in a horizontal direction (X axis direction), centrally to a coefficient having an X coordinate of an odd number (x=2i+1), and a low pass filter is applied, in a horizontal direction (X axis direction), centrally to pixels having an X coordinate of an even number (x=2i). This application of filters is performed on every x. Here, in this case, the values, for example, P (2i) indicated in the above-described Formulas (1) and (2) express coefficient value.

In a case where the coefficient obtained by applying the low pass filter centrally to the above-described L coefficient is expressed as LL, the coefficient obtained by applying the high pass filter centrally to the above-described L coefficient is expressed as HL, the coefficient obtained by applying the low pass filter centrally to the above-described H coefficient is expressed as LH, and the coefficient obtained by applying the high pass filter centrally to the above-described H coefficient is expressed as HH (for the sake of simplification), the arrangement of the coefficients shown in FIG. 4 is transformed to an arrangement of coefficients shown in FIG. 5. Here, the coefficient groups having the same symbols are referred to as sub-bands. The coefficient arrangement shown in FIG. 5 is made up of coefficients of four sub-bands.

Thereby, the two-dimensional wavelet transformation (first decomposition) of the first time is completed. An "image" having substantially ½ of the resolution of the original image can be obtained when only the LL coefficients are gathered (classifying the coefficients to respective sub-bands in a manner shown in FIG. 6 and extracting only the LL sub-band). The classifying of coefficients to respective sub-bands is referred to as "deinterleaving", and the allocating of coefficients in a manner shown in FIG. 5 is referred to as "interleaving".

A wavelet transformation of the second time is executed in the same manner as described above but by assuming that the LL sub-band is the original image. By deinterleaving the obtained sub-band coefficients, the coefficients are allocated in the manner shown in FIG. 7 (the numbers 1 and 2 shown at the beginning of the coefficients in FIGS. 6 and 7 indicate the number of times of executing a wavelet transformation for obtaining the coefficient, and are referred as decomposition level).

The wavelet transformation is one type of hierarchical frequency transformation where the transformation is recursively repeated with respect to a low frequency coefficient. Thus, the LL sub-band coefficient is a low frequency coefficient, and the LH, HL, and HH sub-band coefficients are high frequency coefficients. Furthermore, the decomposition level corresponds to a hierarchy level.

The above-described two-dimensional wavelet transformation is a transformation process executed in a forward direction (forward transformation). Meanwhile, a two-dimensional inverse wavelet transformation is a transformation process executed in a backward direction (inverse transformation). That is, an inverse low pass filter is applied, in a horizontal direction (X axis direction), centrally to a coefficient having an X coordinate of an even number (x=2i), and an inverse high pass filter is applied, in a horizontal direction (X axis direction), centrally to a coefficient having an X coordinate of an odd number (x=2i+1). This application of filters is performed on every y. The inverse low pass filter is expressed as Formula (3) and the inverse high pass filter is expressed as Formula (4), as shown below. For an edge part of an image (or a boundary part of a tile), there also may be a case where there is no adjacent coefficient group situated adjacent to a main coefficient. Also in this case, coefficient values are adaptively complemented by using the mirroring method shown in FIG. 8.

$$P(2i)=C(2i)-\lfloor(C(2i-1)+C(2i+1)+2)/4\rfloor \quad \text{Formula (3)}$$

$$P(2i+1)=C(2i+1)+\lfloor(P(2i)+P(2i+2))/2\rfloor \quad \text{Formula (4)}$$

Accordingly, the arrangement of coefficients shown in FIG. 5 is transformed to a coefficient arrangement shown in FIG. 4. Next, an inverse low pass filter is applied in a vertical direction (Y axis direction), centrally to a coefficient having a Y coordinate of an even number (y=2i), and an inverse high pass filter is applied, in a vertical direction (X axis direction), centrally to a coefficient having a Y coordinate of an odd number (y=2i+1). This application of filters is performed on every x.

Thereby, by executing the two-dimensional inverse wavelet transformation once, the image can be reconstructed into the image shown in FIG. 3. In a case where the wavelet transformation is executed for numerous times, the image shown in FIG. 3 is assumed as an LL sub-band, and the inverse transformation is further executed for numerous times by using the other sub-bands such as HL.

Next, a principle of performing a tile boundary distortion control on encoded data (in this example, data encoded with JPEG 2000 using the 5×3 transformation) in a frequency coefficient space (wavelet coefficient space) during a process of decoding the encoded data.

In order to restore an image, a solution is calculated by employing predetermined conditions obtained from experience. In method disclosed in Japanese Laid-Open Patent Application No. 2001-257596, the conditions are that "tile boundaries are created when the compression rate is high, and all high pass coefficients are quantized to 0 regardless of execution of a tiling process" (Approximation 1), and "low pass coefficients that are applied with the tiling process are the equal to low pass coefficients that are not applied with the tiling process" (Approximation 2). Accordingly, by using a formula "a pixel value of a tile boundary in a case where the inverse wavelet transformation using a corrected high pass coefficient (although quantized to 0)=a pixel value of a same position in a case where the value of the high pass coefficient is 0 and where the inverse wavelet transformation is executed without a tiling process", the correction value of the high pass coefficient is calculated (image restoration is a process of calculating a correction value other than 0 with respect to a high pass coefficient quantized to 0).

Next, a correction formula, which is aimed to correct coefficients in a case of the 5×3 transformation, is described. As described with FIGS. 3-8, in a case of executing the inverse transformation of 5×3 transformation, an inverse low pass filter is applied centrally to even number positions and an inverse high pass filter is applied centrally to odd number positions with respect to a coefficient arrangement interleaved in the order of L, H, L, H.

In employing the above-described Formulas (1)-(4) without regard to the floor function, it becomes apparent that the tap count of the filter is reversed between the forward transformation and the inverse transformation, and that the filter coefficient is interleaved. Therefore, in a case where the filter coefficients of the forward transformation are:

HIGH . . . −0.5, 1, −0.5

LOW . . . −0.125, 0.25, 0.75, 0.25, −0.125, the filter coefficients of inverse transformation are:

LOW . . . −0.25, 1, −0.25

HIGH . . . −0.125, 0.5, 0.75, 0.5, −0.125.

Here, the above-given filter coefficients are expressed without regard of floor function.

In a case of an interleaved coefficient arrangement "L1 H1 L2 H2 L3 H3" where "no tiling process is executed and the value of all high pass coefficients is 0 (Approximation 1)", the value of applying an inverse high pass filter centrally to H2 position is expressed as:

$$-0.125H1+0.5L2+0.75H2+0.5L3-0.125H3=0.5L2+0.5L3 \quad \text{Formula (i).}$$

Meanwhile, it is assumed that the above-described coefficients are calculated after dividing them into two tiles, and the tile boundary is situated between H2 and L3. In this case, L1, H1, L2, and H2 are coefficients of the tiles of the left side (or the upper side), and L3 and H3 are coefficients of the tiles of the right side (or the lower side). Here, H2 is a coefficient affected by mirroring during execution of the forward transformation (high pass filter of 3 taps) and is, therefore, subject to correction. Since the tiling process is a process where the wavelet transformation is executed with use of only the pixels within each tile or a process where the inverse wavelet transformation is executed with use of only the coefficients within each tile, coefficients "L1 H1 L2 H2 L2 H1" are obtained by executing the above-described mirroring process where coefficients of the left side tile (or upper side tile) "L1 H1 L2 H2" are complemented with coefficients of the right side tile (or lower side tile).

Accordingly, the value of applying an inverse high pass filter centrally to H2 position is expressed as:

$$-0.125H1+0.5L2+0.75H2+0.5L2-0.125H1=0.25H1+L2+0.75H2 \quad \text{Formula (ii)}.$$

In order to obtain a relation of Formula (i)=Formula (ii) in the correction, the following Formula (iii) is obtained.

$$H2=1/3H1-2/3L2+2/3L3 \quad \text{Formula (iii)}$$

The Formula (iii) is a correction formula for correcting high pass coefficients situated adjacent to the tile boundary and affected by mirroring during the forward transformation. Since tiled coefficients are available during calculation of the correction value, the coefficient of the left side (upper side) tile is used as L2 and the coefficient of the right side (lower side) is used as L3 (Approximation 2).

Likewise, a formula can be obtained from the low pass coefficients (L3) situated adjacent to the tile boundary. As a result, the following Formula (iv) is obtained as a correction formula for correcting the high pass filter H3 situated not adjacent to the tile boundary but situated in the vicinity of the tile boundary.

$$H3=0 \quad \text{Formula (iv)}$$

However, in a case where the decomposition level is 1, no correction is necessary since H3 does not include error of the mirroring (In a case where the decomposition level is no less than 2, correction is required since L3 situated adjacent to H3 is affected by mirroring).

The foregoing example is a case of executing the 5×3 wavelet transformation. In JPEG 2000, a wavelet transformation referred to as the 9×7 transformation is also described. The correction formulas can be obtained for the 9×7 transformation with the same scheme. That is, in a case of an interleaved coefficient arrangement of "H0 L1 H1 L2 H2 L3 H3 L4 H4" where the tile boundary is situated between H2 and L3, the following Formulas (v) and (vi) are obtained.

$$H2=(-0.0535H0+0.15644H1+0.09127L1-0.59127L2+0.59127L3-0.09127L4)/0.60295H3=(0.05754L2 \quad \text{Formula (v)}$$

$$H3=(0.05754L4+0.03372H4)/0.53372 \quad \text{Formula (vi)}.$$

In the 9×7 transformation, coefficient H3 may be subject to correction even in decomposition level 1.

As described above, the high pass coefficient H2 situated adjacent to the tile border is corrected with Formula (iii) in a case of the 5×3 transformation, and with Formula (iv) in a case of the 9×7 transformation, to thereby control the distortion at the tile boundary. The object of correcting high pass coefficients situated adjacent to the tile boundary and high pass coefficients situated not adjacent to the tile boundary but in the vicinity of the tile boundary is to correct the coefficients so that the value of the coefficient obtained by performing the inverse wavelet transformation on coefficients situated adjacent to the tile boundary can be near to the value of the coefficient obtained by performing the inverse wavelet transformation on low pass coefficients without executing the tiling process.

Figure 9:
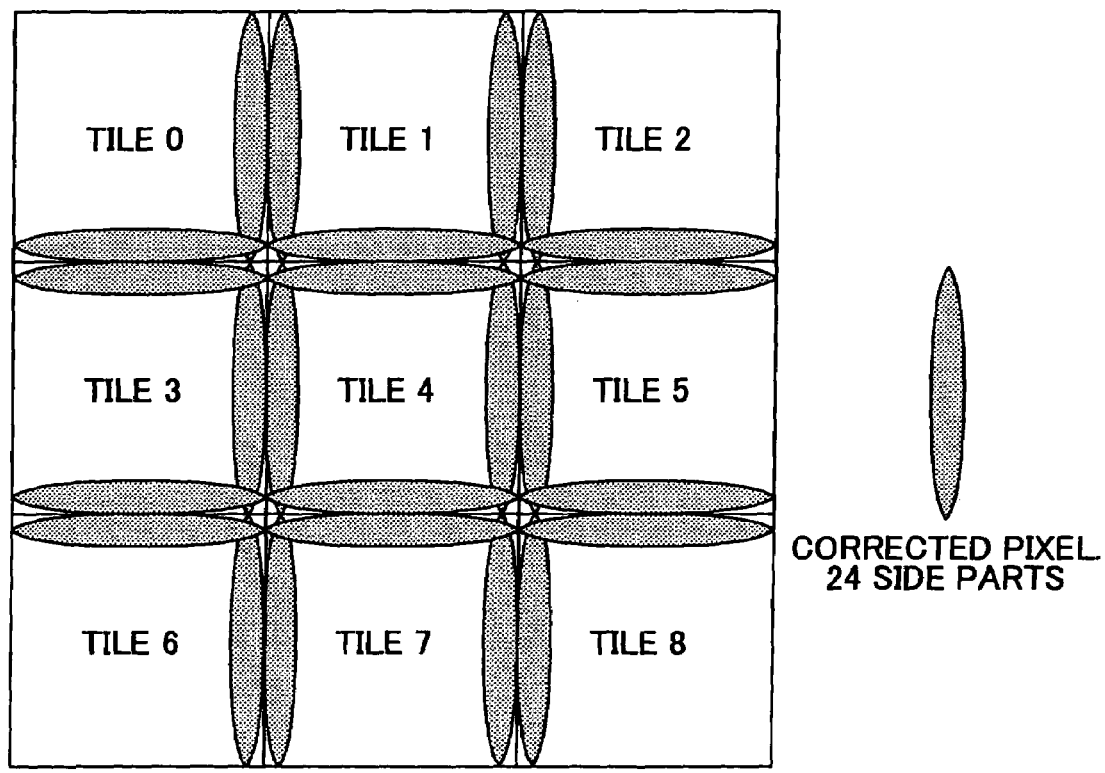
FIG. 9 is a schematic view showing a positional relation of coefficients that are corrected for reducing distortion in the tile boundary.
Figure 10:
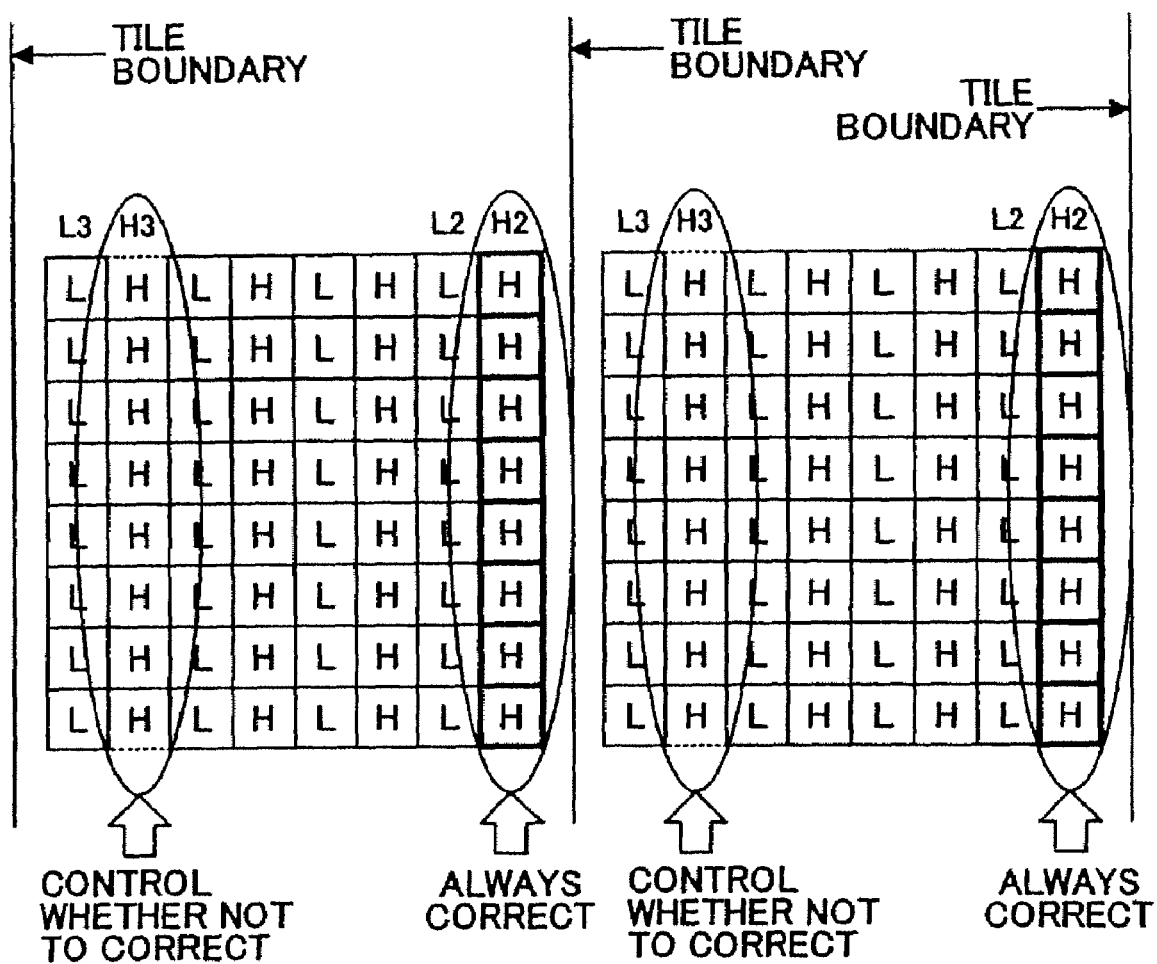
FIG. 10 is a diagram showing coefficients adjacent to the tile boundary and coefficients in the proximity of the tile boundary that are corrected for reducing distortion in the tile boundary with respect to a horizontal direction.
Figure 11:
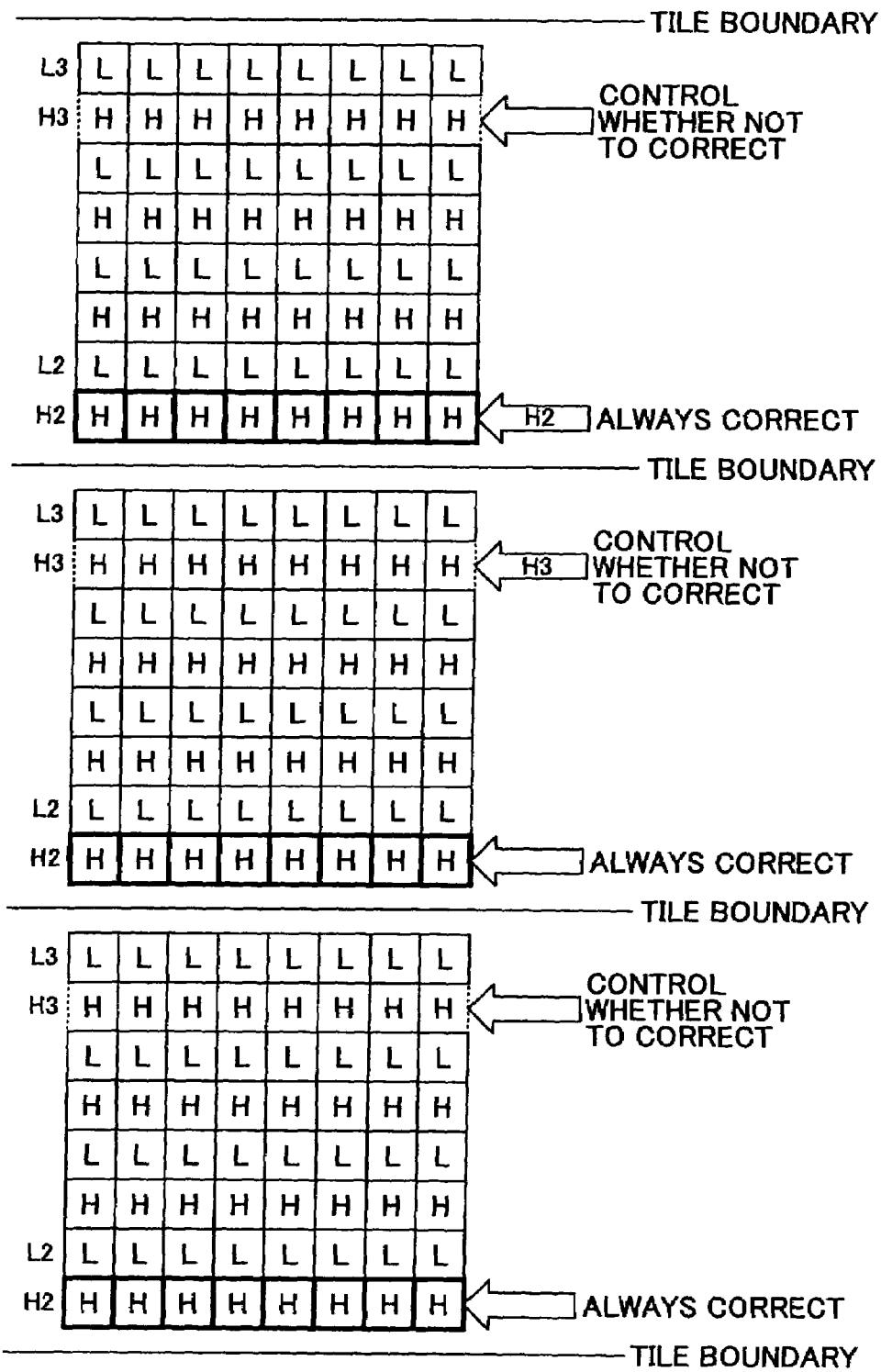
FIG. 11 is a diagram showing coefficients adjacent to the tile boundary and coefficients in the proximity of the tile boundary that are corrected for reducing distortion in the tile boundary with respect to a vertical direction.

FIG. 9 is a schematic view showing a positional relation of high pass coefficients (H2, H3), which are subject to correction, in a case where the image is tiled to the 3×3 image. The coefficient correction for reducing tile boundary distortion is first performed on the tile boundaries in the horizontal direction, then executing the inverse wavelet transformation in the horizontal direction, and then performing the coefficient correction in the vertical direction owing that the encoding process with JPEG 2000 is executed by performing the wavelet transformation (forward transformation) in the vertical direction and then performing the wavelet transformation (forward transformation) in the horizontal direction. The process of the coefficient correction is illustrated in FIGS. 10 and 11. In FIG. 10, L indicates a coefficient of sub-band LL or LH, and H indicates a coefficient of sub-band HL or HH. In FIG. 11, L indicates a coefficient of the sub-band LH after performing inverse wavelet transformation in the horizontal direction, and H indicates a coefficient of the sub-band HH after performing the wavelet inverse transformation in the horizontal direction.

In the image processing apparatus 800, from the aspect of process efficiency, it is not always necessary for the coefficient correction unit 1110 to follow the above-describe principle and perform coefficient correction in terms of the high pass coefficient (H3) which is not situated adjacent to the tile boundary but situated in the vicinity of the tile boundary. That is, as described with reference to FIGS. 10 and 11, since the high pass coefficient (H2) situated adjacent to the tile boundary is largely affected by generation of distortion in the tile boundary, the high pass coefficient (H2) is substantially always subject to correction by the coefficient correction unit 1110. Meanwhile, since generation of distortion in the tile boundary has little effect on the high pass coefficient (H3), which is not situated adjacent to the tile boundary but situated in the vicinity of the tile boundary, the high pass coefficient (H3) is adaptively excluded from the coefficients targeted for correction (i.e. not subject to correction). For example, the high pass coefficient (H3) may be adaptively excluded from the correction targets depending on, for example, "coefficient value", "number of quantization steps", "movement amount (frame movement amount)", combinations including "coefficient value and frame movement amount", "number of quantization steps and frame movement amount" or "coefficient value, number of quantization steps, and frame movement amount".

Figure 29:
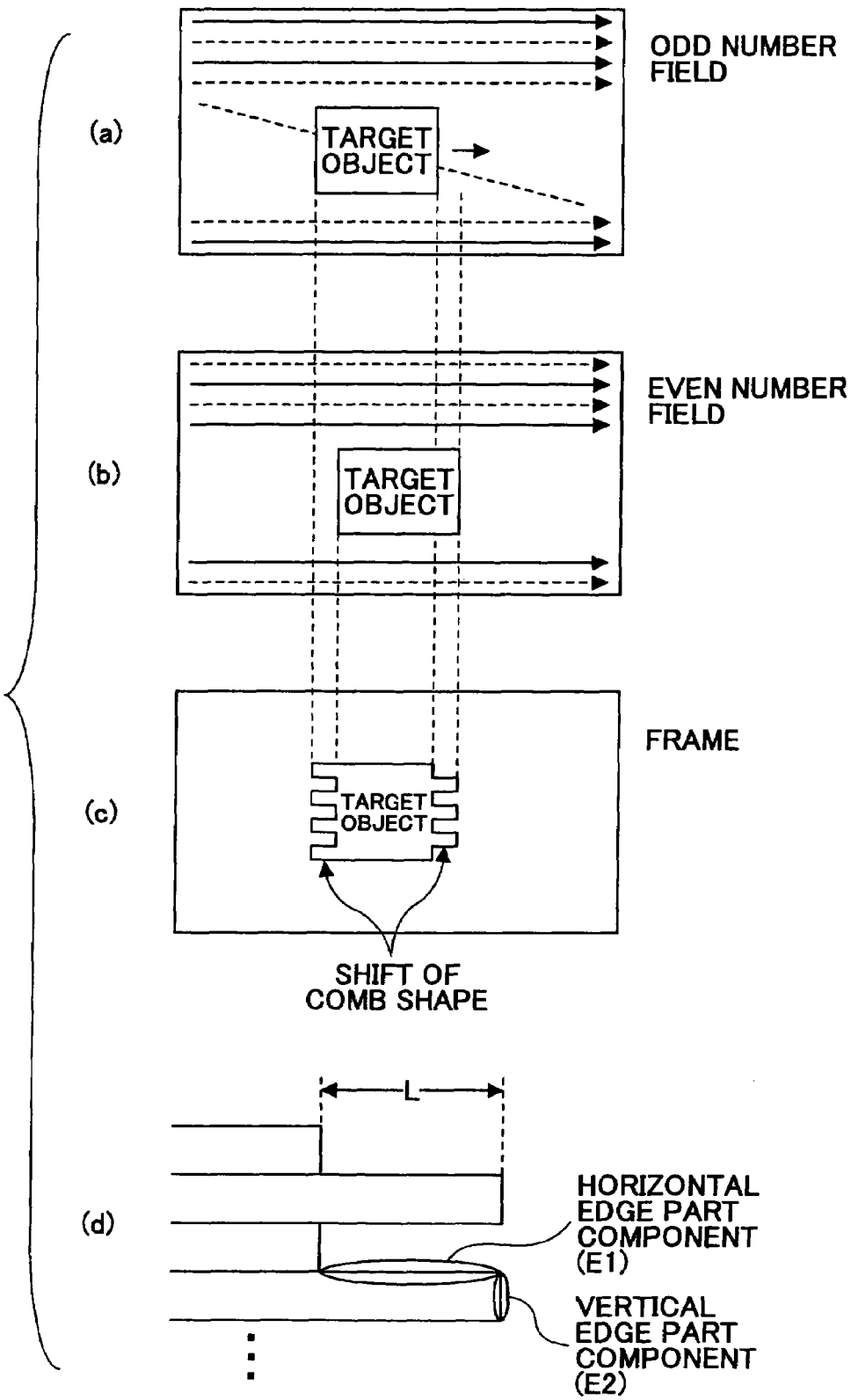
FIG. 29 is an explanatory diagram for showing the movement of a target object in an interlaced image(s) for a comb shape.

Next, in a case of processing moving images, the "comb shape" of an interlaced image, which is related to the estimation of frame movement amount, is described with reference to FIGS. 29 and 30. In a case of imaging each frame as an interlaced image by using, for example, a video camera, each frame is imaged, first, by imaging odd number fields in which only odd number lines are interlaced scanned (see (a) in FIG. 29), and then, 1/60 seconds later, imaging even number fields in which only even number lines are interlaced scanned (see (b) in FIG. 29). The image shown in (c) of FIG. 29 is an image (interlaced image) obtained by combining (compositing) the images of the two fields. In a case of encoding in a frame basis in the manner described above, the frame image ((c) of FIG. 29) including the combination of the two fields is encoded.

In a case of moving the target object between the two fields in a rightward direction, the movement of the target object causes a vertical edge part (edge part in the vertical direction) of the target object for each scan line to shift in a horizontal direction, so that the target object appears to have a comb shape, as shown in (c) of FIG. 29. An enlarged view of showing the edge parts of the comb shaped target object is shown in (d) of FIG. 29. The length of the horizontal edge (edge amount) L corresponds to the amount of movement (movement amount) of the target object between the odd number field and the even number field. FIG. 30 is a diagram showing a relation between movement amount (shift amount) and horizontal edge amount of the comb shape.

Accordingly, the horizontal edge amount of the comb shape in the frame image increases as the movement of the target object becomes greater. In a case of imaging with a video camera, for example, it is reasonable to use the horizontal edge amount of the edge part of the comb shape as an index of frame movement amount since a large portion of the movement of the target object is movement in the horizontal direction.

Meanwhile, the vertical edge amount of the edge part of the comb shape is relatively constant regardless of the movement of the target object. Therefore, it is reasonable to use the proportion between the horizontal edge amount and the vertical edge amount (=horizontal edge amount/vertical edge amount) as an index of frame movement amount.

Thus, the horizontal edge amount and the vertical edge amount are reflected to the total sum of absolute value of the coefficients of a predetermined sub-band in wavelet transformation, respectively. Accordingly, this reflects upon the code amount of a predetermined sub-band of a code stream. In one embodiment of the present invention, the movement amount estimation unit 1120 estimates the amount of movement of each frame based on this information of the comb shape.

It is, however, possible to estimate the amount of movement with other methods which compare between a previous frame and a subsequent frame in an image space or a wavelet coefficient space. Particularly, the other methods of comparing frames are used in a case where the frame image is a non-interlaced image since the comb shape cannot be used.

Figure 31:
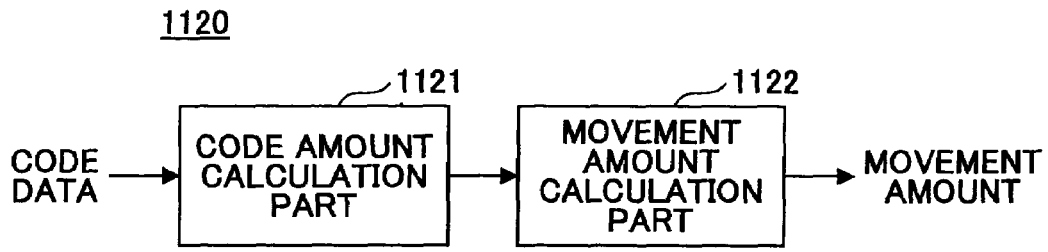
FIG. 31 is a block diagram showing an example of a movement amount estimation unit.

Next, an example of the movement estimation unit 1120 is described. FIG. 31 is a block diagram showing an exemplary internal configuration of the movement estimation unit 1120. In this example, the movement estimation unit 1120 includes a code amount calculation unit 1121 for calculating the amount of code of a predetermined sub-band from code data of the frames, and a movement amount calculation unit 1122 for calculating the amount of movement according to the code amount calculated by the calculation unit 1121. Next, exemplary algorithms of the movement amount estimations executed by the movement amount estimation unit 1120 are described with reference to the flowcharts shown in FIGS. 32-34.

Figure 32:
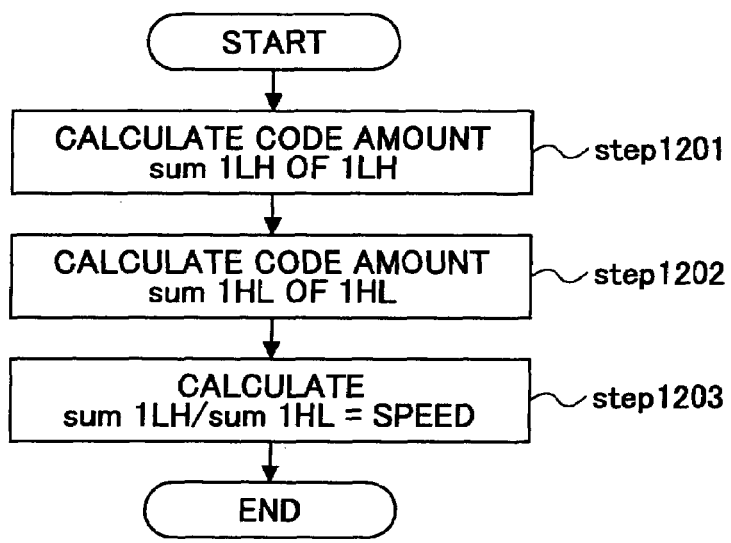
FIG. 32 is a flowchart showing an example of an algorithm of movement amount estimation.

According to the estimation algorithm shown in FIG. 32, the code amount calculation unit 1121 calculates the code amount "sum 1LH" of sub-band 1LH and the code amount "sum 1HL" of sub-band 1HL (Step 201, 202). The code amounts may be calculated, for example, by referring to the tag information in the code data of the frames. It is to be noted that the code amounts are code amounts of the Y component, and this applies to the other algorithms.

Then, the ratio between the calculated code amounts between sum 1LH and sum 1HL are calculated as, speed=sum 1LH/sum 1HL, by the movement calculation unit 1122 (Step 203). The code amount sum 1LH increases in proportion to the increase of the horizontal edge amount of the comb shape while the code amount 1HL hardly changes in relation to the horizontal movement of the target object owing that the coefficient of the sub-band 1HL is a vertical edge component. Accordingly, the value of SPEED can be used as an estimation value of the movement amount.

Figure 33:
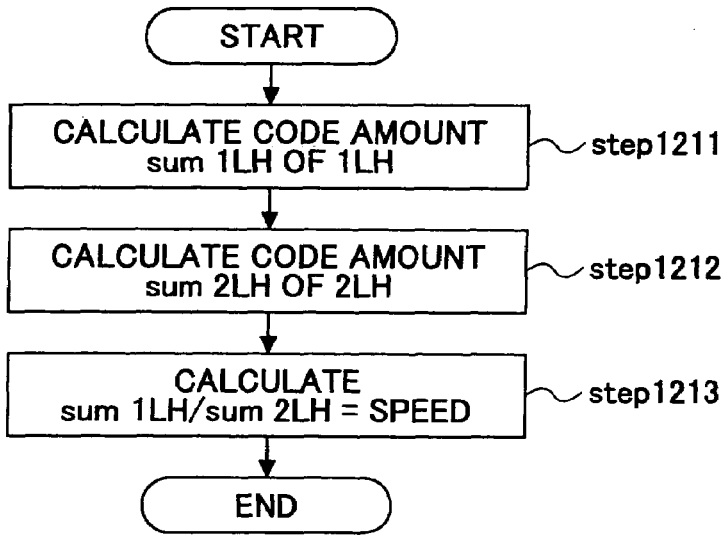
FIG. 33 is a flowchart showing another example of an algorithm of movement amount estimation.

According to the estimation algorithm shown in FIG. 33, the code amount calculation unit 1121 calculates the code amount "sum 1LH" of sub-band 1LH and the code amount "sum 2LH" of sub-band 2LH (Step 211, 212). The code amounts may be calculated, for example, by referring to the tag information in the code data of the frames. Then, the ratio between the calculated code amounts between sum 1LH and sum 2LH are calculated as, speed=sum 1LH/sum 2LH, by the movement calculation unit 1122 (Step 213). The code amount sum 1LH increases in proportion to the increase of the horizontal edge amount of the comb shape. Meanwhile, although the coefficient of the sub-band 2LH is a horizontal edge component, the resolution is one level lower than that of the 1LH sub-band. Therefore, in the comb shape where a basic unit is a single pixel, the code amount 2HL hardly changes regardless of the increase of the horizontal edge amount. Accordingly, the value of SPEED can be used as an estimation value of the movement amount.

Figure 34:
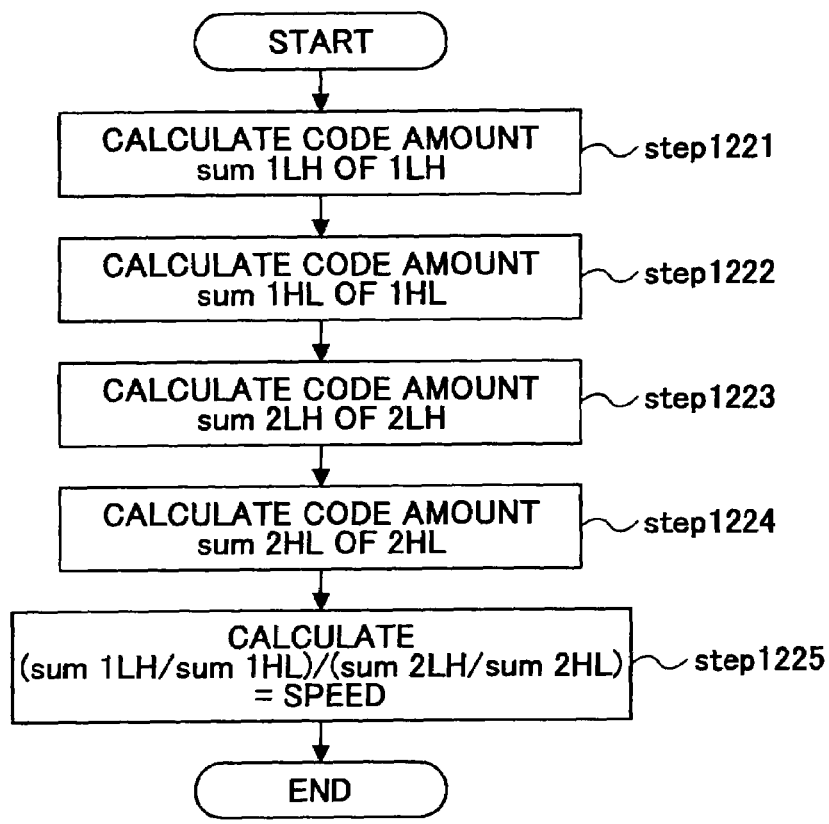
FIG. 34 is a flowchart showing another example of an algorithm of movement amount estimation.

According to the estimation algorithm shown in FIG. 34, the code amount calculation unit 1121 calculates the code amount "sum 1LH" of sub-band 1LH, the code amount "sum 1HL" of sub-band 1HL, the code amount "sum 2LH" of sub-band 2LH, and the code amount "sum 2HL" of the sub-band 2HL (Steps 221-224). The code amounts may be easily calculated, for example, by referring to the tag information in the code data of the frames. Then, the ratio of the calculated code amounts are calculated as, speed=(sum 1LH/sum 1HL)/(sum 2LH/sum 2HL) by the movement calculation unit 1122 (Step 225).

Although the code amounts of the sub-bands 1LH and 1HL reflects on the edge amount of the comb shape in the horizontal and vertical directions, the code amounts of the sub-bands 1LH and 1HL reflects on other edge amounts besides those of the comb shape in the horizontal and vertical directions. Therefore, in a case where there is a long horizontal edge in the image besides that of the comb shape, the value of the sum 1LH/sum 1HL becomes large even when the horizontal edge amount of the comb shape is small. Meanwhile, the code amounts of the sub-bands 2LH and 2HL, which have resolutions 1 level lower than those of the sub-bands 1LH and 1HL, are hardly affected such as the edges of the comb shape whose unit corresponds to a single pixel. However, since the sub-bands 2LH and 2HL reflect on other larger edges in the horizontal and vertical directions, the value of the sum 2LH/sum 2HL becomes large when there is a long horizontal edge other than that of the comb shape in the image. Therefore, the value of SPEED, being obtained by dividing the former code amount ratio (sum 1LH/sum 1HL) and the latter code amount ratio (sum 2LH/sum 2HL), is resistant to influence from a long horizontal edge other than that of the comb shape and can be used as an estimation value of the movement amount.

It is to be noted that it is possible for the code amount calculation for estimating movement amount to be performed only to a tile(s) in a portion of a frame (for example, a tile or multiple tiles situated at a center portion of a frame). By doing so, the process time for estimating the movement amount can be shortened in comparison to performing the process on an entire frame.

Figure 35:
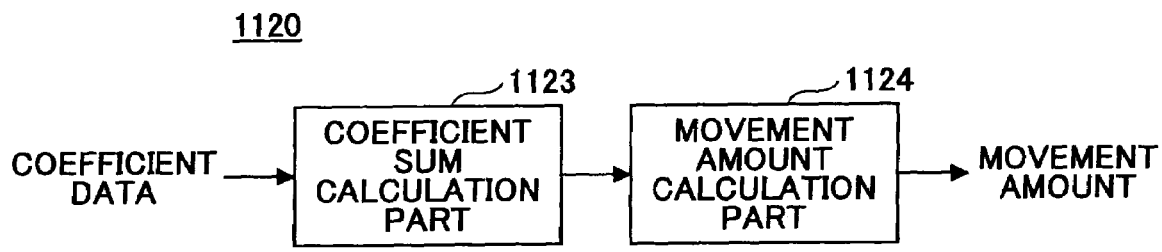
FIG. 35 is a block diagram showing another example of a movement amount estimation unit.

FIG. 35 is a block diagram showing another exemplary internal configuration of the movement estimation unit 1120. In this example, the movement estimation unit 1120 includes a coefficient sum calculation unit 1123 for obtaining wavelet coefficients from the quantization/inverse quantization unit 1103 and calculating the total sum of the absolute values of the coefficients for a predetermined sub-band, and a movement amount calculation unit 1124 for calculating the amount of movement by using the calculated value calculated by the coefficient sum calculation unit 1123.

Next, exemplary algorithms of the movement amount estimations executed by the movement amount estimation unit 1120 having the other exemplary internal configuration are described by referring again to FIGS. 32-34.

With reference to the estimation algorithm shown in FIG. 32, the coefficient sum calculation unit 1123 calculates the total sum "sum 1LH" of sub-band 1LH and the total sum "sum 1HL" of sub-band 1HL (Step 201, 202). It is to be noted that the total sum of the coefficients are total sums of the Y component, and this applies to the other algorithms.

Then, the ratio between the total sums of the coefficients between sum 1LH and sum 1HL are calculated as, speed=sum 1LH/sum 1HL, by the movement calculation unit 1124 (Step 203). The code amount sum 1LH increases in proportion to the increase of the horizontal edge amount of the comb shape while the code amount 1HL hardly changes in relation to the horizontal movement of the target object. Accordingly, the value of SPEED can be used as an estimation value of the movement amount.

With reference to the estimation algorithm shown in FIG. 33, the coefficient sum calculation unit 1123 calculates the total sum "sum 1LH" of sub-band 1LH and the total sum "sum 2LH" of sub-band 2LH (Step 211, 212). Then, the ratio between the total sums between sum 1LH and sum 2LH are calculated as, speed=sum 1LH/sum 2LH, by the movement calculation unit 1124 (Step 2-13). The code amount sum 1LH increases in proportion to the increase of the horizontal edge amount of the comb shape. Meanwhile, although the coefficient of the sub-band 2LH is a horizontal edge component, the resolution is one level lower than that of the 1LH sub-band. Therefore, in the comb shape where a basic unit is a single pixel, the code amount 2HL hardly changes regardless of the increase of the horizontal edge amount. Accordingly, the value of SPEED can be used as an estimation value of the movement amount.

With reference to the estimation algorithm shown in FIG. 34, the total sum calculation unit 1123 calculates the total sum "sum 1LH" of sub-band 1LH, the total sum "sum 1HL" of sub-band 1HL, the total sum "sum 2LH" of sub-band 2LH, and the total sum "sum 2HL" of the sub-band 2HL (Steps 221-224). Then, the ratio of the calculated total sums are calculated as, speed=(sum 1LH/sum 1HL)/(sum 2LH/sum 2HL) by the movement calculation unit 1124 (Step 225).

Although the total sums of the sub-bands 1LH and 1HL reflects on the edge amount of the comb shape in the horizontal and vertical directions, the total sums of the sub-bands 1LH and 1HL reflects on other edge amounts besides those of the comb shape in the horizontal and vertical directions. Therefore, in a case where there is a long horizontal edge in the image besides that of the comb shape, the value of the sum 1LH/sum 1HL becomes large even when the horizontal edge amount of the comb shape is small. Meanwhile, the total sums of the sub-bands 2LH and 2HL, which have resolutions 1 level lower than those of the sub-bands 1LH and 1HL, are hardly affected such as the edges of the comb shape whose unit corresponds to a single pixel. However, since the sub-bands 2LH and 2HL reflect on other larger edges in the horizontal and vertical directions, the value of the sum 2LH/sum 2HL becomes large when there is a long horizontal edge other than that of the comb shape in the image. Therefore, the value of SPEED, being obtained by dividing the former total sum ratio (sum 1LH/sum 1HL) and the latter total sum ratio (sum 2LH/sum 2HL), is resistant to influence from a long horizontal edge other than that of the comb shape and can be used as an estimation value of the movement amount.

It is to be noted that it is possible for the total sum calculation for estimating movement amount to be performed only to a tile(s) in a portion of a frame (for example, a tile or multiple tiles situated at a center portion of a frame). By doing so, the process time for estimating the movement amount can be shortened in comparison to performing the process on an entire frame.

Next, a coefficient correction process for reducing tile boundary distortion with the coefficient correction unit 110 or 1110 according to various embodiments of the present invention is described in detail.

In one embodiment described below, the coefficient correction unit 110 conducts a correction process on only the high pass coefficients (H2) that are adjacent to a tile boundary. In other words, the high pass coefficients (H3) in the vicinity of (but are not adjacent to) the tile boundary are excluded from the coefficients subject to the correction process. Accordingly, in the present embodiment the coefficient correction unit 110 does not necessarily have to include a correction control unit 111.

In a case where the 5×3 wavelet transform is applied, correction of the high pass coefficients (H3) merely involves unilaterally changing the coefficient values to 0. Thereby, the correction process itself may be conducted in a relatively short period of time. However, it is noted that a clipping process has to be conducted when a coefficient correction process is conducted. In other words, a coefficient correction process for a high pass coefficient (H3) includes a clipping process. Thus, upon taking the processing time for the clipping process into consideration, the processing time required for correcting a high pass coefficient (H3) does not differ greatly from the processing time required for correcting a high pass coefficient (H2). As can be appreciated from the above descriptions, by excluding the high pass coefficients (H3) from the coefficients subject to correction, the required processing time of the overall coefficient correction process may be substantially reduced by half compared to a case in which the high pass coefficients (H3) are subject to correction, such an arrangement making a large contribution to increasing the overall decoding process including the coefficient correction process for preventing tile boundary distortion.

It is noted that since the high pass coefficients (H3) are not corrected in the present embodiment, the preventive effects with respect to tile boundary distortion are generally weakened compared to a case in which the high pass coefficients (H3) are subject to correction. However, the high pass coefficients (H3) do not have as large an impact on tile distortion generation as the high pass coefficients (H2) that are adjacent to the tile boundary, and thereby, it may be presumed that there may be no significant difference from omitting the correction of the high pass coefficients (H3). Particularly, in the case of processing code data with a low compression rate, such a difference may likely be minimal.

Figure 12:
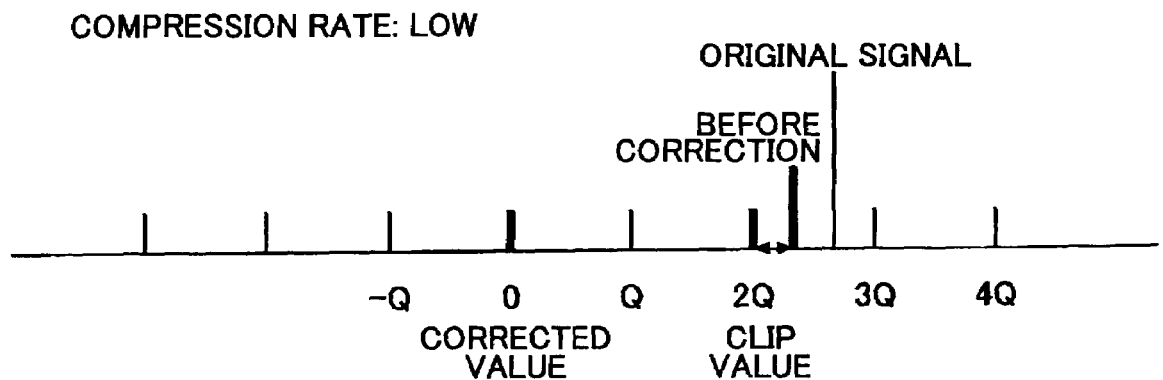
FIG. 12 is a diagram for illustrating the necessity of correcting the coefficients in the proximity of the tile boundary.

FIG. 12 is a diagram showing coefficient values of a high pass coefficient (H3) before correction and after correction, and a corresponding clip value of the high pass coefficient (H3) in a case where the number of quantization steps Q is small. It is noted that generally, when the compression rate is low, the number of quantization steps Q is small. In this regard, FIG. 12 may also be considered as a diagram illustrating an exemplary case in which the compression rate is low.

As is shown in the drawing, in the encoding stage, when the coefficient value before being quantized (original signal) of a high pass coefficient (H3) is in between 2Q and 3Q, a value obtained by inverse quantization of the coefficient value in the decoding stage is expressed as 2Q+(3/8)Q (coefficient value before correction). It is noted that the above equation applies to a case in which the reconstruction parameter defined in the JPEG 2000 standard is set to 3/8. In a case where the 5×3 wavelet transform is applied, if the coefficient is corrected, the corrected value is unilaterally set to 0. In a clipping process, the corrected value is restored to a clip value corresponding to one end of the quantization section [2Q~3Q] that is closer to the original coefficient value. It is noted that the above descriptions also apply to a case in which the 9×7 wavelet transform is applied, since a corrected value of a high pass coefficient (H3) is set to 0 or a value close to 0 in such a case.

In a case where the compression rate of code data is low, and the number of quantization steps Q is sufficiently small, the difference between the coefficient value before correction of a high pass coefficient (H3) and its corresponding clip value ((3/8)Q) may be sufficiently small. In other words, the difference may be small between a case in which correction of the high pass coefficients (H3) is conducted and a case in which such a correction is not conducted. Thus, the effects of not conducting correction on the high pass coefficients (H3) may be minimal.

Figure 15:
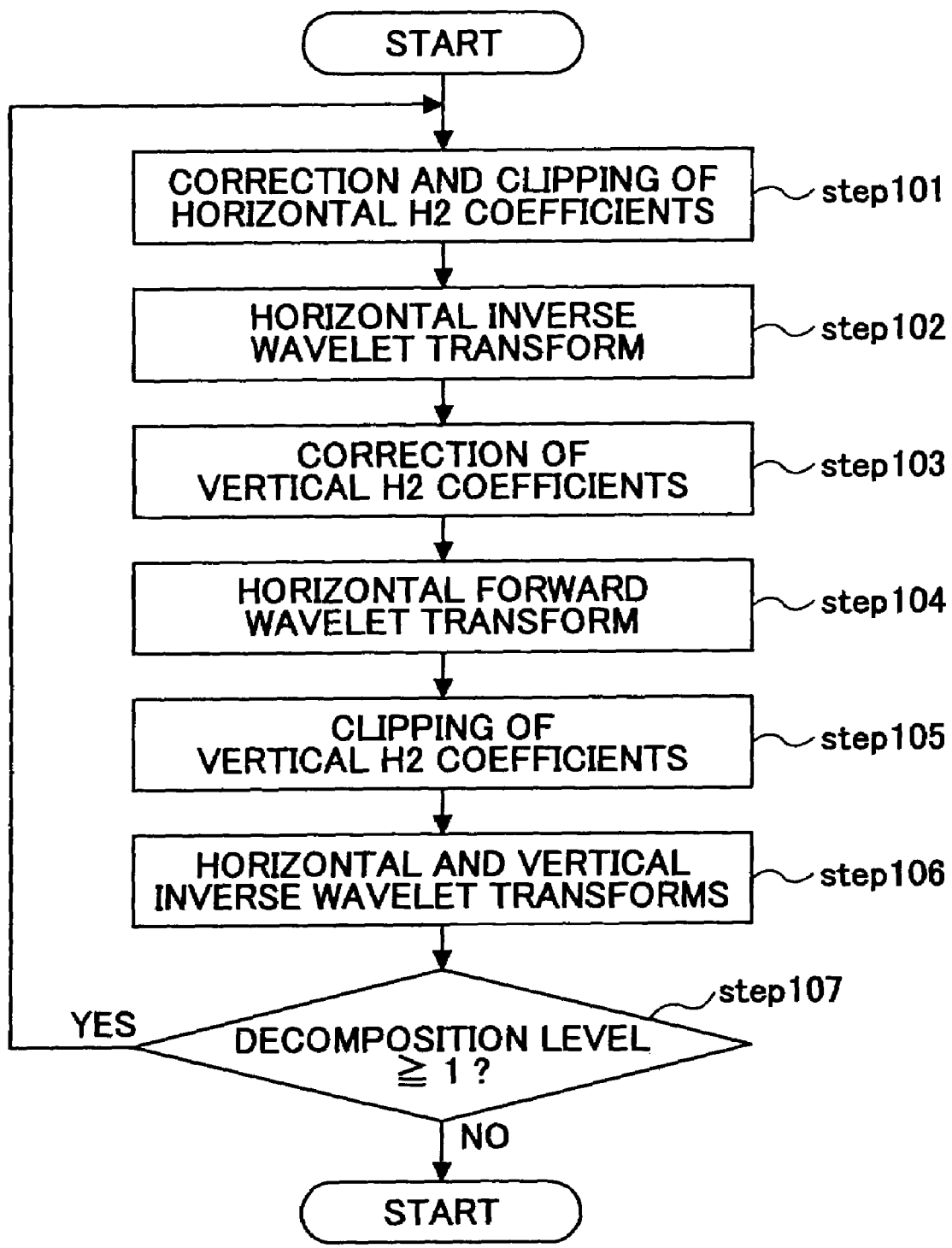
FIG. 15 is a flowchart for explaining a process related to a coefficient correction according to a first embodiment of the present invention.

FIG. 15 is a flowchart illustrating process steps conducted by the two-dimensional wavelet transform/inverse transform unit 102 and the coefficient correction unit 110. The process sequence of FIG. 15 is successively conducted on the decomposition levels starting from the uppermost decomposition level after a quantization process is conducted by the quantization/inverse quantization unit 103.

In the coefficient correction unit 110, first, with respect to a current decomposition level, a correction process (including a clipping process) is conducted on high pass coefficients (H2) that are adjacent to a horizontal tile boundary (step 101). As is described above, in a case where the 5×3 wavelet transform is applied, the formula (iii) is used as the correction formula, and in a case where the 9×7 wavelet transform is applied, the formula (v) is used as the correction formula.

Then, in the two-dimensional wavelet transform/inverse transform unit 102, a horizontal inverse wavelet transform process is conducted on the coefficients (step 102). Then, at the coefficient correction unit 110, a correction process is conducted on the high pass coefficients (H2) that are adjacent to a vertical tile boundary (step 103). Since the number of quantization steps Q cannot be determined for such intermediate coefficients, a clipping process cannot be conducted. Thereby, a horizontal forward wavelet transform process is conducted at the two-dimensional wavelet transform/inverse transform unit 102, after which the clipping process is conducted on the coefficients (H2) that are adjacent to the vertical tile boundary at the coefficient correction unit 110 (step 104 and step 105).

Then, horizontal and vertical inverse wavelet transform processes are iteratively conducted by the two-dimensional wavelet transform/inverse transform unit 102 (step 106), and LL sub band coefficients of a decomposition level that is one level lower than the current decomposition level is generated. The processes of steps 101~106 are repeated for the coefficients of this lower decomposition level.

It is noted that similar processes are iteratively conducted until reaching the decomposition level 1, after which the image data are reproduced and the present process sequence is ended (step 108, NO).

In the following, exemplary coefficient correction processes that are conducted on coefficients of decomposition levels 1 and 2 in the case of processing 2×2 tile code data are described.

FIG. 16 is a diagram illustrating an arrangement of interleaved coefficients of decomposition level 2. First, correction (including a clipping process) is conducted on the high pass coefficients (H2) that are adjacent to a horizontal tile boundary; namely, coefficients (2HL, 2HH) of row A shown in FIG. 17. In the present embodiment, the high pass coefficients (H3) in the vicinity of the tile boundary; namely, coefficients (2HL, 2HH) of row B shown in FIG. 17 are not subject to the correction process.

Figure 18:
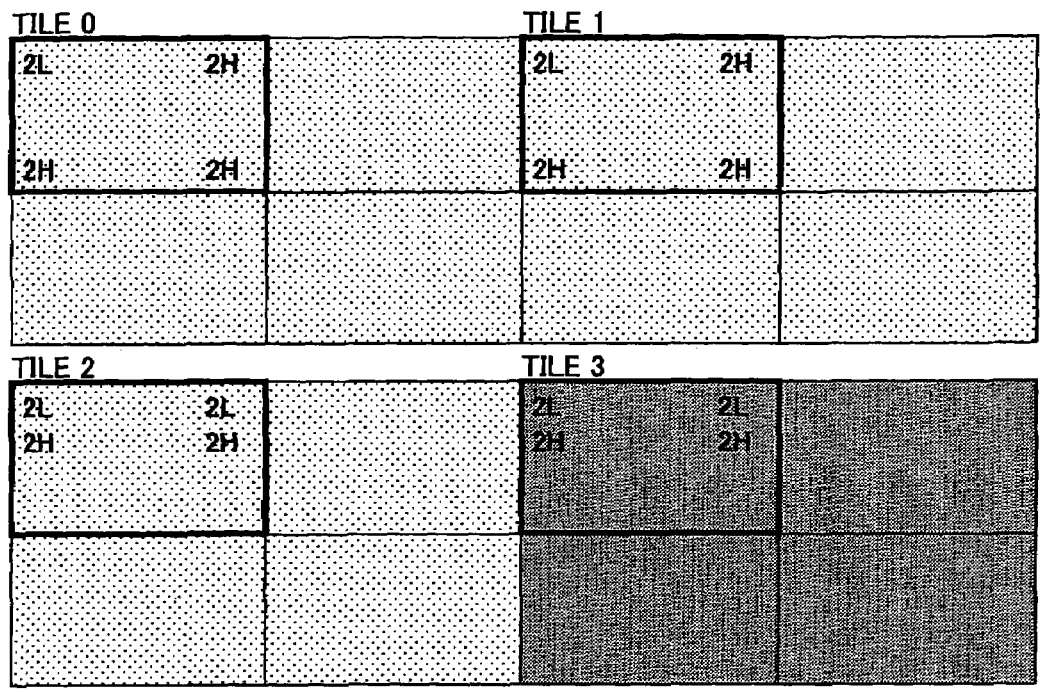
FIG. 18 is a diagram showing an arrangement of coefficients after performing inverse wavelet transformation in a horizontal direction on the coefficients corrected in FIG. 17.

Then, a horizontal inverse wavelet transform process is conducted on the wavelet coefficients of decomposition level 2. FIG. 18 shows an arrangement of the coefficients after the horizontal inverse transform process.

Figure 19:
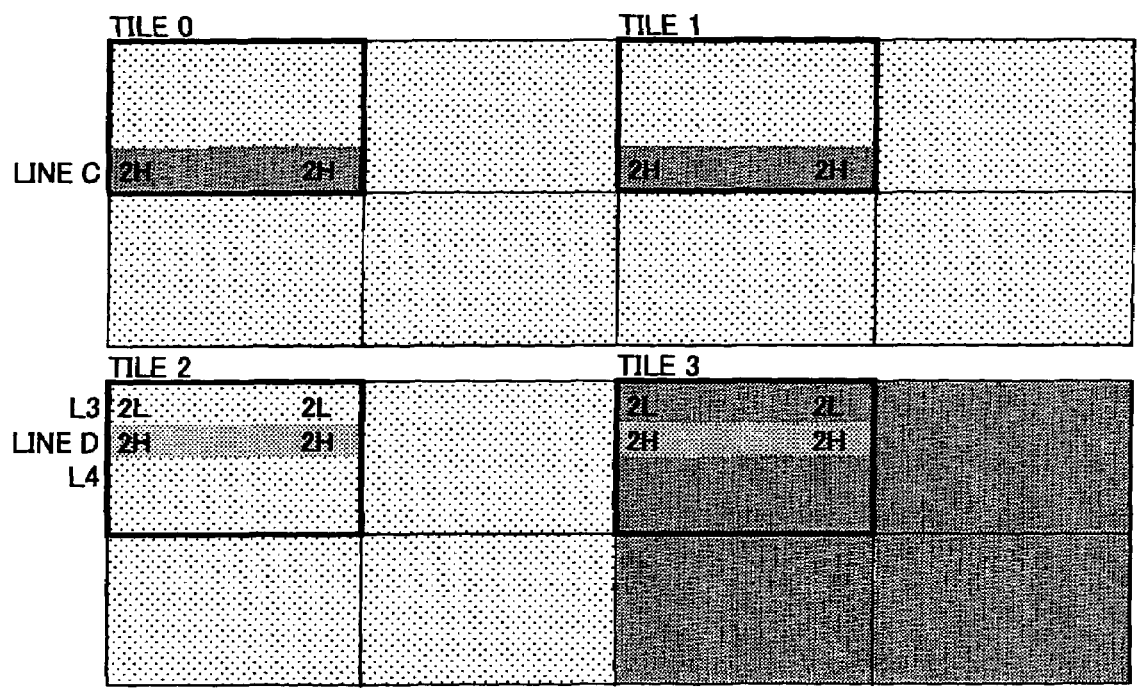
FIG. 19 is a diagram showing an arrangement of coefficients for coefficient correction in a perpendicular direction with respect to the coefficients of FIG. 18.

Then, correction is conducted on high pass coefficients (H2) that are adjacent to the vertical tile boundary; namely coefficients (2H) of line C shown in FIG. 19. It is noted that the coefficients (2H) of row D shown in FIG. 19 are not subject to the correction process in the present embodiment.

Then, a horizontal forward wavelet transform process is conducted in order to restore the state of the coefficients to that shown in FIG. 16, after which a clipping process is conducted on the coefficients (2LH, 2HH) of row C.

Figure 20:
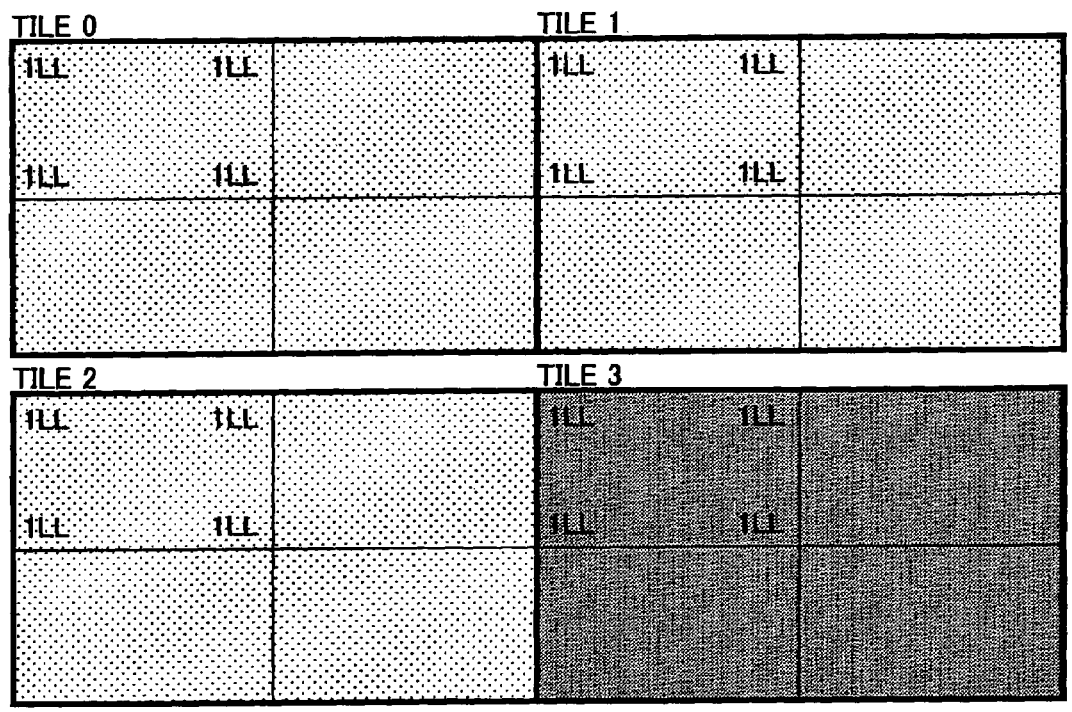
FIG. 20 is a diagram showing an arrangement of coefficients in a deinterleaved state in decomposition level 1.

Then, horizontal and vertical inverse wavelet transform processes are iteratively conducted to obtain the coefficients of decomposition level 1 as is shown in FIG. 20.

Figure 21:
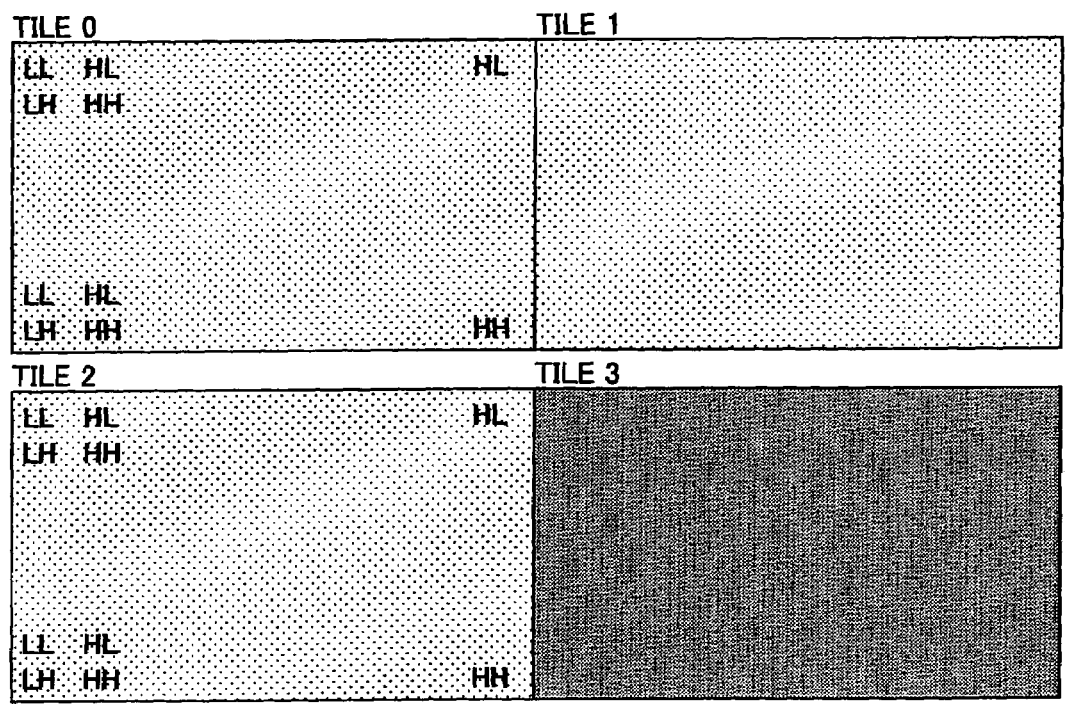
FIG. 21 is a diagram showing an arrangement of coefficients in an interleave state in decomposition level 1.

FIG. 21 shows an arrangement of interleaved coefficients of decomposition level 1. A correction process and a clipping process are conducted on coefficients (HL, HH) of row E shown in FIG. 22, and a horizontal inverse wavelet transform process is conducted on the coefficients. FIG. 23 shows an arrangement of coefficients after the inverse transform process. A correction process is conducted on the coefficients of row G shown in FIG. 23. Then, a horizontal inverse wavelet transform process is conducted, and the coefficients are restored to the state shown in FIG. 21 so that a clipping process may be conducted on the coefficients of row G shown in FIG. 23. Then, the horizontal and vertical inverse wavelet transform processes are iteratively conducted to generate image data.

As is described above in relation to FIG. 12, generally, when the compression rate of code data is low, the number of quantization steps Q is small, and the difference between the coefficient value before correction and the clip value of a high pass coefficient (H3) in the vicinity of (but not adjacent to) a tile boundary is small. Thereby, the image quality may not be greatly affected by the fact that the correction of the high pass coefficients (H3) is not conducted. However, the number of quantization steps Q normally differs depending on each sub band. Thereby, even when the overall compression rate of code data is low, a large number of quantization steps Q may be required for a particular sub band. When a larger number of quantization steps Q is required for a high pass coefficient (H3) than is expected, tile boundary distortion created by such a coefficient may stand out unless correction is conducted on the coefficient.

The present embodiment is directed to avoiding such a problem while improving the efficiency of the coefficient correction process. According to the present embodiment, a high pass coefficient (H3) in the vicinity of (but not adjacent to) a tile boundary is subject to a correction process in the case where the number of quantization steps Q for this coefficient exceeds a predetermined threshold value TH, and is not subject to the correction process when the number of quantization steps for this coefficient is less than or equal to the threshold value TH. In other words, adaptive control of a correction process with respect to a high pass coefficient (H3) in the vicinity of (but not adjacent to) a tile boundary (i.e., determination of whether to conduct the process) is realized according to the number of quantization steps Q for the corresponding coefficient (H3), such a control being realized by the correction control unit 111.

Figure 24:
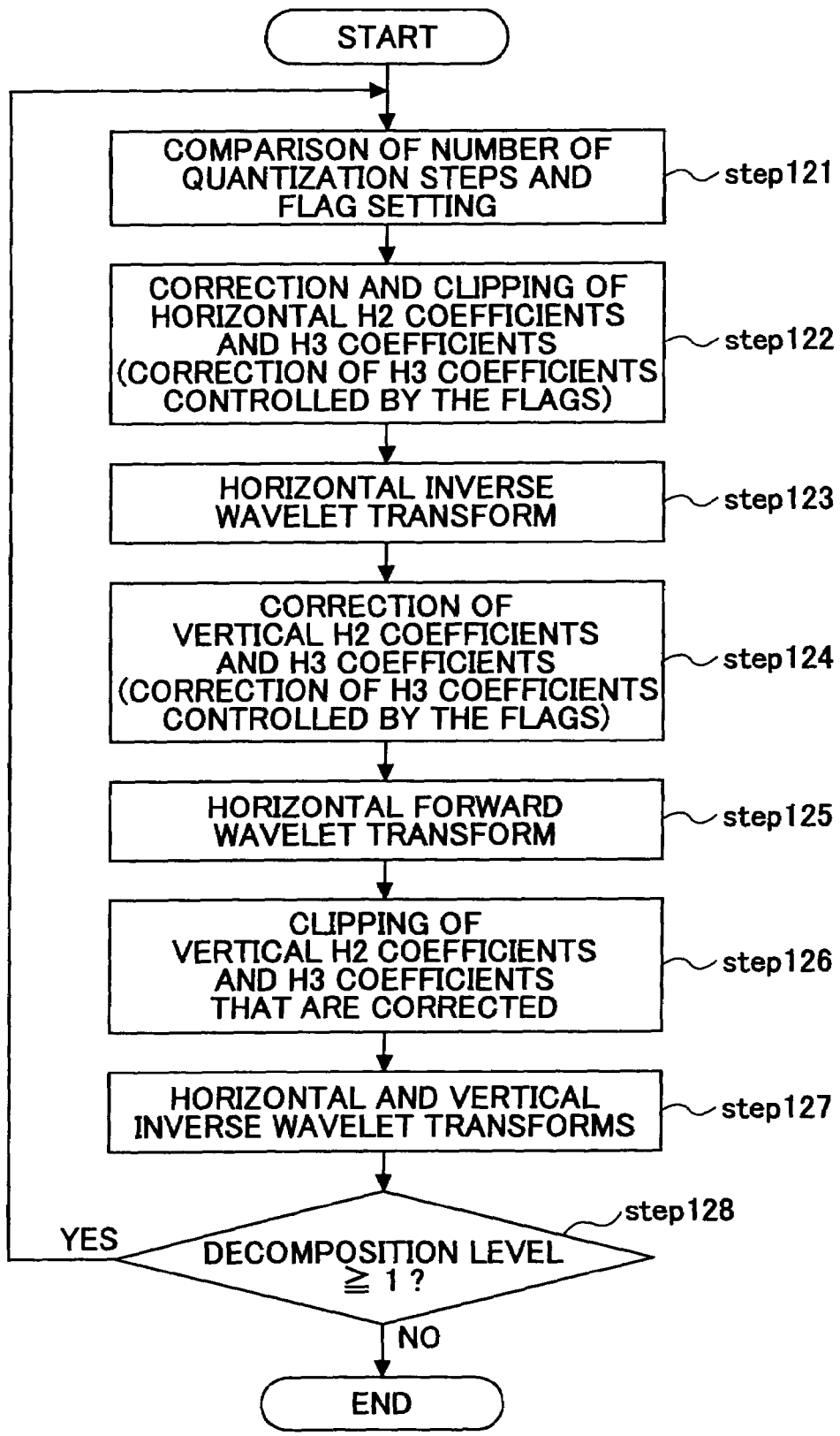
FIG. 24 is a flowchart for illustrating a process related to a coefficient correction according to a second embodiment of the present invention.

FIG. 24 is a flowchart illustrating process steps conducted by the two-dimensional wavelet transform/inverse transform unit 102 and the coefficient correction unit 110 according to the present embodiment. It is noted that the process sequence of FIG. 24 is iteratively conducted on the decomposition levels starting from the uppermost decomposition level after an inverse quantization process is conducted by the quantization/inverse quantization unit 103.

According to the present embodiment, first, the number of quantization steps Q for each of the sub bands HL, LH, and HH of a current decomposition level is compared with a pre-designated threshold value TH, and a flag is set for each of the sub bands according to its corresponding comparison result (step 121). In an example described below, flags of sub bands that require a number of quantization steps exceeding the threshold value TH are set to on mode.

Then, in the coefficient correction unit 110, a correction process (including a clipping process) is conducted on high pass coefficients (H2) that are adjacent to a horizontal tile boundary and high pass coefficients (H3) in the vicinity of (but are not adjacent to) the tile boundary (step 122). In this case, the correction control unit 111 refers to the flag set in step 121, and selects a high pass coefficient (H3) as a coefficient subject to correction if its corresponding flag is set on (i.e., the coefficient is corrected). If the corresponding flag of the coefficient is set off, this coefficient is not subject to correction. As is described above, in a case where the 5×3 wavelet transform is applied, the formula (iv) is used as the correction formula, and in a case where the 9×7 wavelet transform is applied, the formula (vi) is used as the correction formula.

Then, in the two-dimensional wavelet transform/inverse transform unit 102, a horizontal inverse wavelet transform process is conducted (step 123).

Then, at the coefficient correction unit 110, a correction process (not including the clipping process) is conducted on high pass coefficients (H2) that are adjacent to a vertical tile boundary and high pass coefficients (H3) in the vicinity of (but are not adjacent to) the tile boundary (step 124). In this case, the coefficient control unit 111 refers to the flags set for the respective sub bands in step 121, and selects a high pass coefficient (H3) as a coefficient subject to correction if its corresponding flag is set on, and excludes the coefficient from the coefficients subject to correction if its corresponding flag is set off.

Then, a horizontal forward wavelet transform process is conducted at the two-dimensional wavelet transform/inverse transform unit 102 (step 125), after which a clipping process is conducted on the corrected coefficients (H2, H3) at the coefficient correction unit 110 (step 126).

Then, horizontal and vertical inverse wavelet transform processes are iteratively conducted by the two-dimensional wavelet transform/inverse transform unit 102 (step 127), and LL sub band coefficients of a decomposition level that is one level lower than the current decomposition level is generated. The processes of steps 121~127 are repeated for the coefficients of this lower decomposition level. It is noted that similar processes are iteratively conducted until reaching the decomposition level 1, after which the image data are reconstructed and the present process sequence is ended (step 128, NO).

It is noted that in a case where the 5×3 wavelet transform is applied to the code data, when processing the decomposition level 1, the flags of all sub bands are set off in step 121. Thus, in steps 122 and 124, all the high pass coefficients (H3) are excluded from the coefficients subject to correction.

Figure 13:
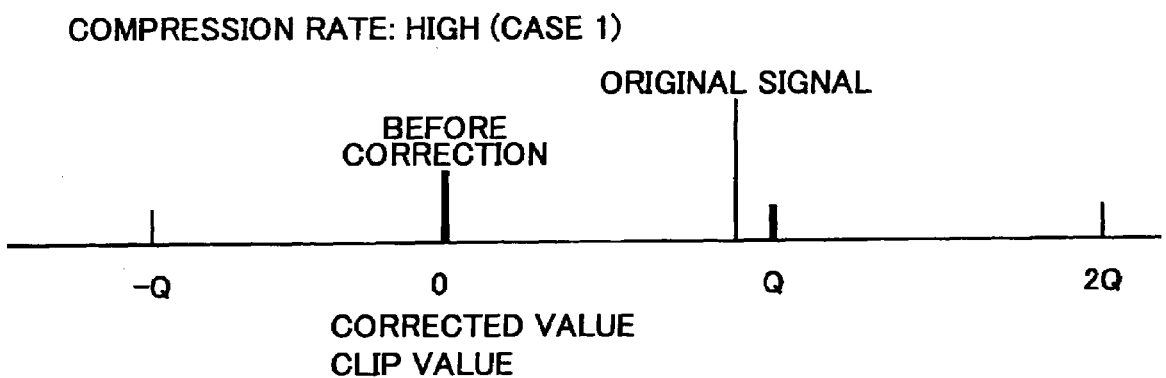
FIG. 13 is a diagram for illustrating the necessity of correcting the coefficients in the proximity of the tile boundary.

As is shown in FIG. 13, in the encoding stage, when a coefficient before being quantized (original signal) of a high pass coefficient (H3) is between 0 and Q (Q corresponding to the number of quantization steps), this coefficient is inverse-quantized to 0 in the decoding stage. In a case where the compression rate of code data is high and the number of quantization steps Q is large, a large portion of the coefficients are inverse-quantized to 0. In a case where the 5×3 wavelet transform is applied to the code data, if the inverse-quantized value (i.e., coefficient value before correction) of a high pass coefficient (H3) in the vicinity of a tile boundary corresponds to 0, the corresponding value after correction corresponds to 0, and the corresponding clip value corresponds to 0 as well. In other words, the processing result may be the same regardless of whether correction is conducted. This applies to a case in which the 9×7 wavelet transform is used on the code data as well, since a large portion of the coefficient values and the corrected values correspond to 0 or a value close to 0 and their corresponding clip values correspond to 0.

In a case where the coefficient value before correction of a high pass coefficient (H3) in the vicinity of the tile boundary corresponds to 0, the difference between the coefficient value before correction and its corresponding clip value corresponds to 0 or a value close to 0 so that correction may be unnecessary. In this regard, according to the present embodiment, the correction control unit 111 of the coefficient control unit 110 is arranged to determine whether the coefficient value of a high pass coefficient (H3) in the vicinity of a tile boundary corresponds to 0. If the coefficient value corresponds to 0, the correction control unit 111 excludes the coefficient from the coefficients subject to correction. In other words, by adaptively controlling the correction process (i.e., whether to conduct the process) for a high pass coefficient (H3) in the vicinity of a tile boundary according to its coefficient value, a more efficient coefficient correction process may be realized while avoiding the degradation of preventive measures with respect to the generation of tile boundary distortion.

Figure 25:
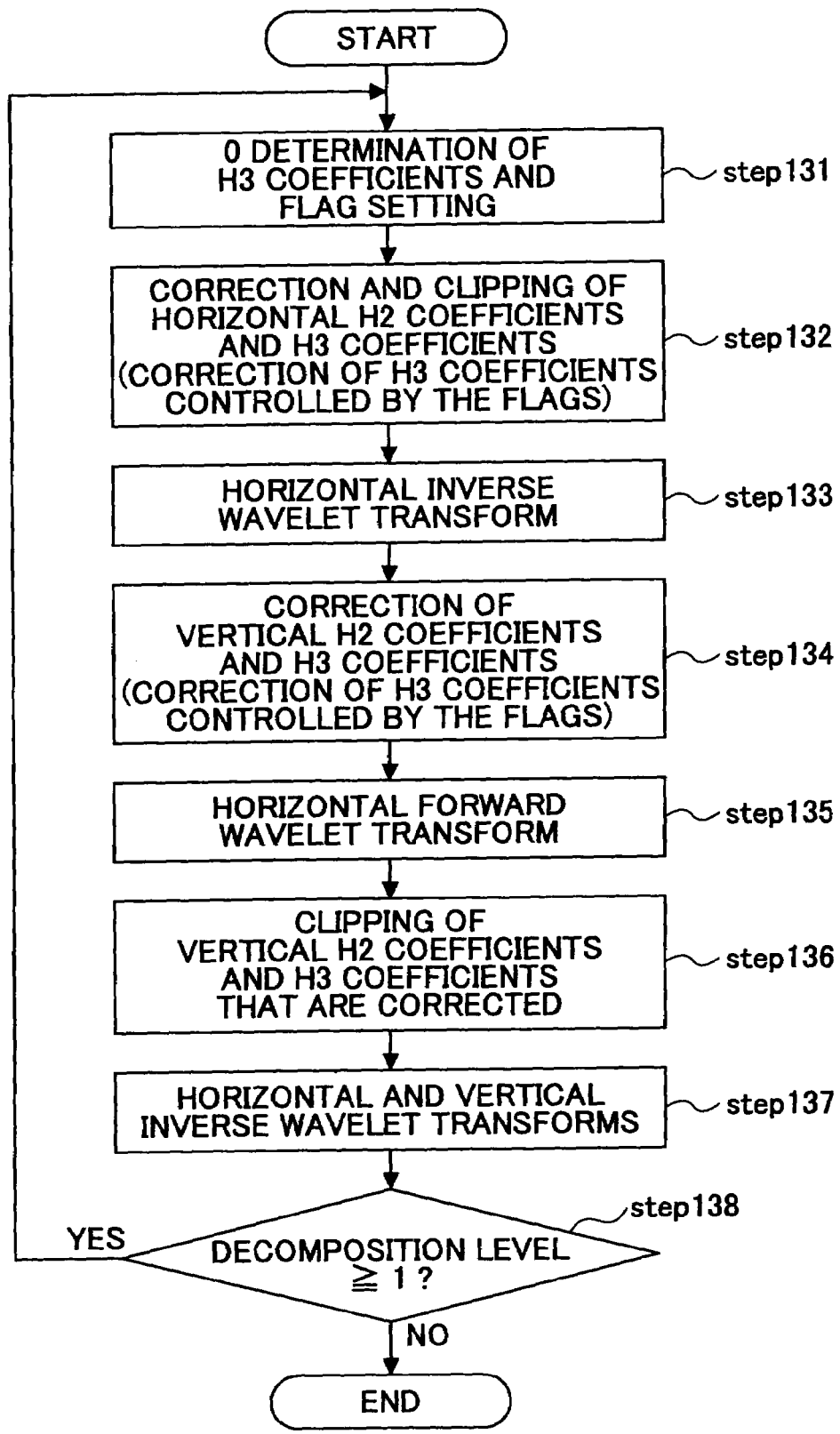
FIG. 25 is a flowchart for illustrating a process related to a coefficient correction according to a third embodiment of the present invention.

FIG. 25 is a flowchart illustrating process steps conducted by the two-dimensional wavelet transform/inverse transform unit 102 and the coefficient correction unit 110 according to the present embodiment. The process sequence of FIG. 25 is successively conducted on the decomposition levels starting from the uppermost decomposition level after an inverse quantization process is conducted by the quantization/inverse quantization unit 103.

First, in the correction control unit 111, a determination is made as to whether high pass coefficients (H3) in the vicinity of horizontal and vertical tile boundaries correspond to 0, and a corresponding flag is set to each of the high pass coefficients (H3) (step 131). In the example described below, a flag is set on for each of high pass coefficients with coefficient values (before correction) that do not correspond to 0.

Then, in the coefficient correction unit 110, a correction process (including a clipping process) is conducted on high pass coefficients (H2) that are adjacent to a horizontal tile boundary and high pass coefficients (H3) in the vicinity of the tile boundary (step 132). In this case, the correction control unit 111 refers to the flags set in step 131, and selects the high pass coefficients with corresponding flags that are set on as coefficients subject to correction while excluding the high pass coefficients (H3) with corresponding flags that are set off from the coefficients subject to correction.

Then, a horizontal inverse wavelet transform process is conducted by the two-dimensional wavelet transform/inverse transform unit 102 (step 133). After the horizontal inverse wavelet transform process, a correction process is conducted by the coefficient correction unit 110 on the high pass coefficients (H2) that are adjacent to a vertical boundary and high pass coefficients (H3) in the vicinity of the tile boundary (step 134). In this case, the correction control unit 111 controls the coefficient correction of the high pass coefficients (H3) in a manner similar to step 132 as is described above.

Then, a horizontal forward wavelet transform process is conducted by the two-dimensional wavelet transform/inverse transform unit 102 (step 135), and a clipping process is conducted on the corrected high pass coefficients (H2, H3) by the coefficient correction unit 110 (step 136).

Then, horizontal and vertical inverse wavelet transform processes are iteratively conducted by the two-dimensional wavelet transform/inverse transform unit 102 (step 137), and LL sub band coefficients of a decomposition level that is one level lower than the current decomposition level is generated. The processes of steps 131~137 are repeated for the coefficients of this lower decomposition level. It is noted that similar processes are iteratively conducted until reaching the decomposition level 1, after which the image data are reconstructed and the present process sequence is ended (step 138, NO).

It is noted that in a case where the 5×3 wavelet transform is applied to the code data, when processing the decomposition level 1, the flags of all sub bands are set off in step 131. Thus, in steps 132 and 134, all the high pass coefficients (H3) are excluded from the coefficients subject to correction.

Also, according to a modified form of the present embodiment, step 131 may be omitted, and the coefficients before correction may be stored in the correction control unit 111. In this case, the determination of whether the high pass coefficients (H3) correspond to 0 may be conducted in steps 132 and 134 based on the coefficient values stored in the correction control unit 111, and the correction process of a high pass coefficient (H3) may be controlled according to the determination results obtained therefrom.

As is described in relation to FIG. 12, in case where the number of quantization steps Q for a high pass coefficient (H3) in the vicinity of a tile boundary is small, a correction process for the corresponding coefficient may be omitted. Also, as is described in relation to FIG. 13, when a coefficient value before correction of a high pass coefficient (H3) corresponds to 0, correction for such a coefficient may be omitted.

Figure 14:
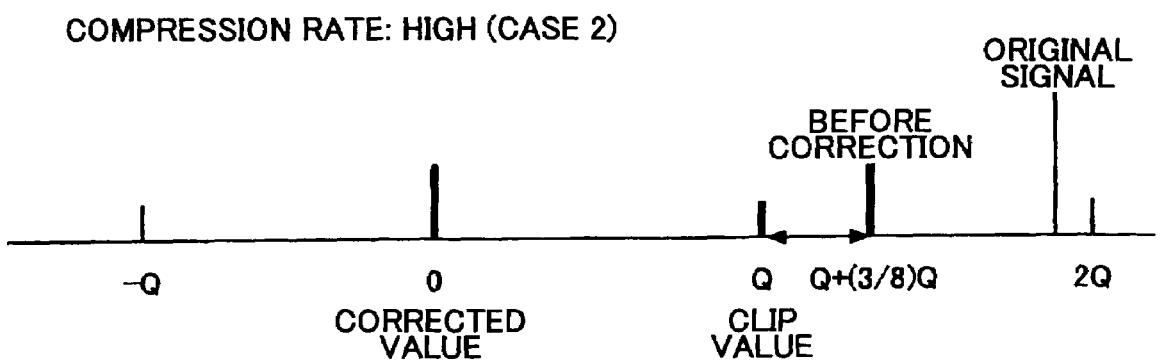
FIG. 14 is a diagram for illustrating the necessity of correcting the coefficients in the proximity of the tile boundary.

However, if the value before correction of a high pass coefficient (H3) does not correspond to 0 and the number of quantization steps Q for this high pass coefficient (H3) is large, it is highly likely that a correction process has to be conducted for this high pass coefficient (H3). For example, in the encoding stage, when the value before correction (original signal) of a high pass coefficient (H3) in the vicinity of a tile boundary is between Q and 2Q as is shown in FIG. 14, this high pass coefficient (H3) is inverse quantized to the position Q+(3/8)Q in the decoding stage (given that the reconstruction parameter is set to 3/8). In a case where the 5×3 wavelet transform is applied, this coefficient is corrected to 0, and is then restored to the position Q by the clipping process. In this case, if the number of quantization steps Q is small, the difference (3/8)Q between the coefficient value before correction and the clip value is small so that the correction of the coefficient may be omitted. However, if the compression rate of the code data is high and the number of quantization steps Q is large, the difference (3/8)Q between the coefficient value before correction and the clip value may be significantly large so that correction may have to be conducted in order to avoid conspicuous tile boundary distortion. It is noted that although the above descriptions are directed to a case in which the 5×3 wavelet transform is applied, similar effects may be obtained in a case where the 9×7 wavelet transform is applied.

In this regard, according to the present embodiment, the correction control unit 111 of the coefficient correction unit 110 is arranged to compare the number of quantization steps Q for a high pass coefficient (H3) in the vicinity of a tile boundary with a pre-designated threshold value TH, and determine whether the coefficient value before correction of the high pass coefficient (H3) corresponds to 0. In this way, the correction control unit 111 controls the correction process of high pass coefficients (H3) in the vicinity of a tile boundary such that if the coefficient value before correction corresponds to 0 and/or the number of quantization steps Q is less than or equal to the pre-designated threshold value TH, the high pass coefficient (H3) is excluded from the coefficients subject to correction, and if the coefficient value before correction does not corresponds to 0 and the number of quantization steps Q exceeds the pre-designated threshold value TH, the high pass coefficient (H3) is subject to correction. In other words, by adaptively controlling a correction process (i.e., whether to conduct the process) for a high pass coefficients (H3) based on its corresponding coefficient value before correction and number of quantization steps Q, a more efficient coefficient correction process may be realized while avoiding the degradation of preventive measures with respect to the generation of tile boundary distortion.

Figure 26:
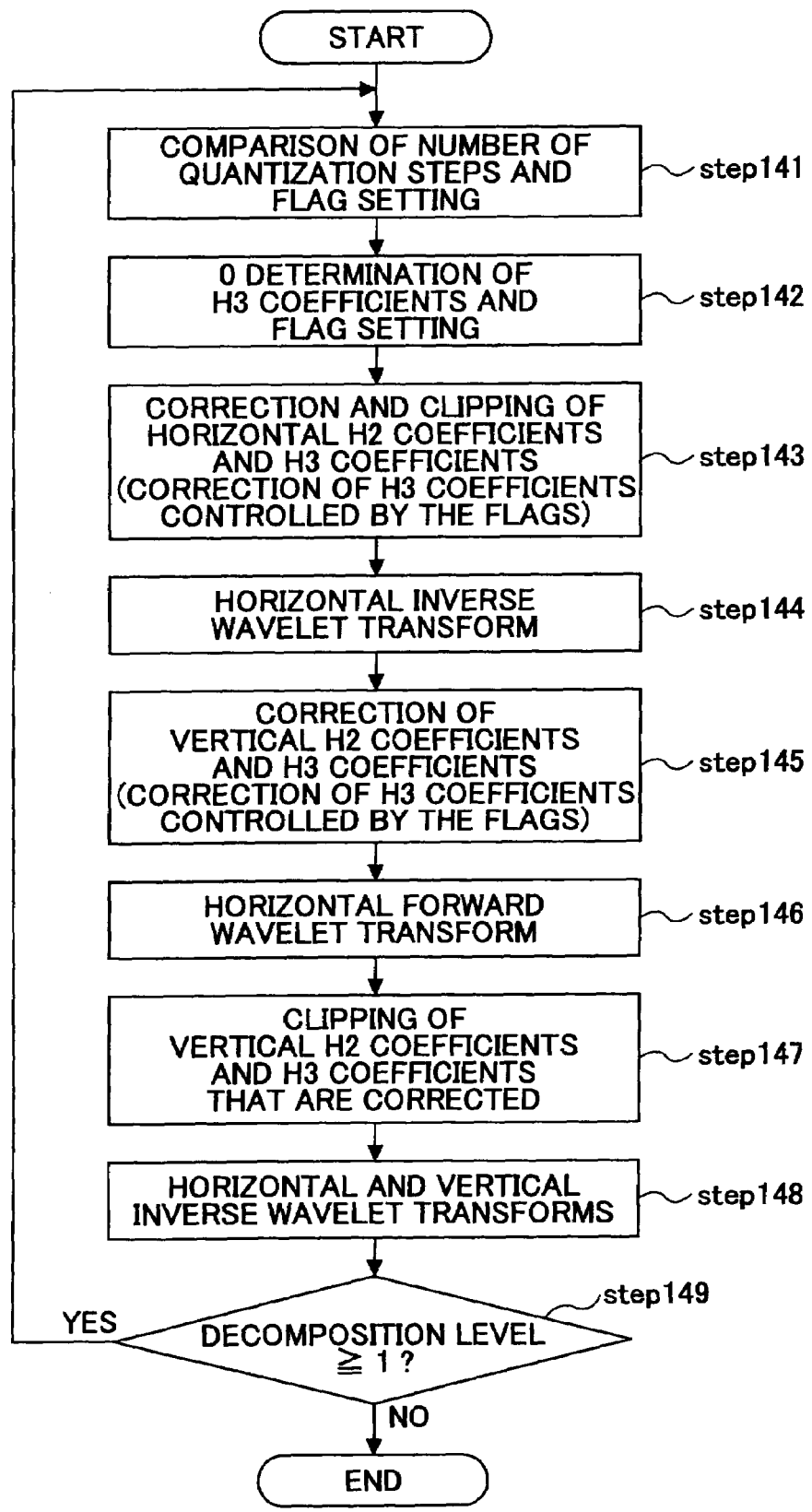
FIG. 26 is a flowchart for illustrating a process related to a coefficient correction according to a fourth embodiment of the present invention.

FIG. 26 is a flowchart illustrating process steps conducted by the two-dimensional wavelet transform/inverse transform unit 102 and the coefficient correction unit 110 according to the present embodiment. The process sequence of FIG. 26 is successively conducted on the decomposition levels starting from the uppermost decomposition level after an inverse quantization process is conducted by the quantization/inverse quantization unit 103.

First, in the correction control unit 111, the number of quantization steps Q for each of the sub bands HL, LH, and HH of a current decomposition level is compared with a pre-designated threshold value, and a flag for indicating the comparison result is set for each of the sub bands (step 141). In the example described below, of the flags set for high pass coefficients (H3) in the vicinity of a tile boundary, the flags of high pass coefficients (H3) for which the number of quantization steps Q is less than or equal to the pre-designated threshold value TH are set on.

Then, in the correction control unit 1111a determination is made as to whether high pass coefficients (H3) in the vicinity of horizontal and vertical tile boundaries correspond to 0, and flags are set on for high pass coefficients (H3) that are determined to correspond to 0 (step 142).

Then, in the coefficient correction unit 110, a correction process (including a clipping process) is conducted on high pass coefficients (H2) that are adjacent to a horizontal tile boundary and high pass coefficients (H3) in the vicinity of the tile boundary (step 143). In this case, the correction control unit 111 refers to the flags set for the high pass coefficients (H3), and excludes high pass coefficients (H3) with corresponding flags that are set on from the coefficients subject to correction.

Then, a horizontal inverse wavelet transform process is conducted by the two-dimensional wavelet transform/inverse transform unit 102 (step 144). After the horizontal inverse wavelet transform process, a correction process (not including a clipping process) is conducted by the coefficient correction unit 10 on high pass coefficients (H2) that are adjacent to a vertical boundary and high pass coefficients (H3) in the vicinity of the tile boundary (step 145). In this case, the correction control unit 111 controls the coefficient correction of the high pass coefficients (H3) in a manner similar to step 143 as is described above.

Then, a horizontal forward wavelet transform process is conducted by the two-dimensional wavelet transform/inverse transform unit 102 (step 146), and a clipping process is conducted on the corrected high pass coefficients (H2, H3) by the coefficient correction unit 110 (step 147).

Then, horizontal and vertical inverse wavelet transform processes are iteratively conducted by the two-dimensional wavelet transform/inverse transform unit 102 (step 148), and LL sub band coefficients of a decomposition level that is one level lower than the current decomposition level is generated. The processes of steps 141~148 are repeated for the coefficients of this lower decomposition level. It is noted that similar processes are iteratively conducted until reaching the decomposition level 1, after which the image data are reconstructed and the present process sequence is ended (step 149, NO).

It is noted that in a case where the 5×3 wavelet transform is applied to the code data, steps 141 and 142 are skipped when processing the decomposition level 1 although this is not indicated in FIG. 26. In this case, all the high pass coefficients (H3) are set on right before conducting step 143. In this way, in steps 143 and 145, all the high pass coefficients (H3) are excluded from the coefficients subject to correction.

In the following, an image processing apparatus according to one embodiment of the present invention is described. The image processing apparatus according to the present embodiment includes the correction mode designating unit 120 of FIG. 1. The coefficient correction unit 110 implements plural correction modes for preventing tile boundary distortion, and is arranged to execute a correction mode that is designated by the correction mode designating unit 120.

The correction mode designating unit 120 may be realized by hardware, firmware, software or combinations thereof. For example, in a case where the image processing apparatus 700 of the present embodiment is incorporated within a program controlling device such as a personal computer or a portable information terminal in the form of hardware, firmware, and/or one or more programs, the correction mode designating unit 120 may typically be embodied as a part of an application program or an operating system. In a practical example, a user may be able to designate a correction mode through interaction with the image processing apparatus via a screen of a monitor apparatus. Such an example is described below with reference to FIG. 27.

Figure 27:
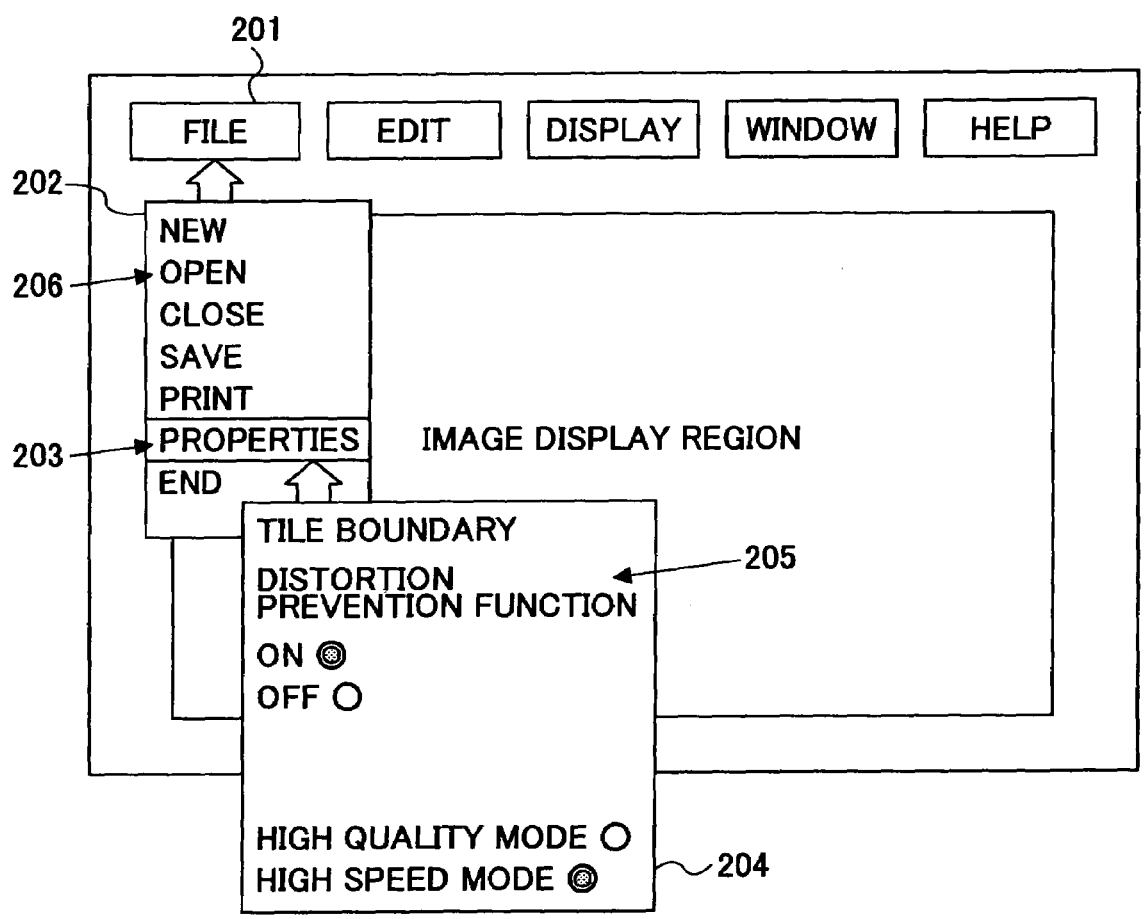
FIG. 27 is a diagram for illustrating an example of a method of designating a correction mode on a screen according to the fifth and eleventh embodiments of the present invention.

In the illustrated example of FIG. 27, a pointing device such as a mouse may be used to select the item "FILE" 201 corresponding to one of the items of a menu displayed on a screen. When the item "FILE" 201 is selected, its corresponding pull-down menu 202 is displayed. In turn, a JPEG 2000 compressed file may be opened by selecting the item "OPEN" 206 from the pull-down menu 202. Also, before opening the JPEG 2000 compressed file, the item "PROPERTIES" 203 may be selected to designate a manner (i.e, image quality) in which the contents of a file are to be displayed.

Specifically, when the item "PROPERTIES" 203 is selected, its corresponding menu 204 is displayed. The menu 204 includes the item "TILE BOUNDARY PREVENTION FUNCTION" 205 as one of its items. By selecting the button "OFF" under the item "TILE BOUNDARY PREVENTION FUNCTION" 205, a no-correction mode is designated in which coefficient correction for preventing tile boundary distortion is not conducted. In other words, when image display at the lowest image quality is desired, the button "OFF" may be selected, and the item "OPEN" 206 may be selected thereafter. In this case, a designated JPEG 2000 compressed file is decoded without conducting a coefficient correction process for preventing tile boundary distortion, and its corresponding image is displayed on the screen.

When image display with better image quality is desired in which tile boundary distortion may be made less conspicuous, the user may select an "ON" button under the item "TILE BOUNDARY PREVENTION FUNCTION" 205 as is shown in the present drawing. In response to such a selection, buttons "HIGH QUALITY MODE" and "HIGH SPEED MODE" may be activated within the menu 204 so that the user may be able to designate a preferred mode of the two modes. After designating the preferred correction mode, the item "OPEN" 206 of the pull-down menu 202 may be selected, and a JPEG 2000 compressed file may be designated. In turn, a coefficient correction process for preventing tile boundary distortion is conducted according to the designated correction mode upon decoding the designated JPEG 2000 image file.

According to one embodiment, when the "HIGH SPEED MODE" is selected, coefficient correction is only conducted on high pass coefficients (H2) that are adjacent to a tile boundary as is illustrated by FIG. 15.

On the other hand, when the "HIGH QUALITY MODE" is selected, a coefficient correction process is conducted for preventing tile boundary distortion with respect to high pass coefficients (H2) that are adjacent to a tile boundary and high pass coefficients (H3) in the vicinity of (but not adjacent to) the tile boundary. In one example, the high pass coefficients (H2) as well as the high pass coefficients (H3) may always be corrected (in such case, correction of the high pass coefficients (H3) is also conducted in steps 101 and 103 of FIG. 15).

According to another embodiment, when the "HIGH QUALITY MODE" is selected, a correction process for a high pass coefficient (H3) in the vicinity of (but not adjacent to) a tile boundary may be adaptively controlled according to the number of quantization steps for the coefficient, the coefficient value before correction, or both the number of quantization steps and the coefficient value before correction as is illustrated by FIG. 24, 25, or 26.

According to yet another embodiment, a coefficient correction process as is illustrated by FIG. 24, 25, or 26 may be conducted when the "HIGH SPEED MODE" is selected, and a coefficient correction process may be conducted on all the high pass coefficients (H2) and (H3) when the "HIGH QUALITY MODE" is selected.

According to another embodiment, an "INTERMEDIATE QUALITY MODE" may be provided as correction modes in addition to the "HIGH SPEED MODE" and the "HIGH QUALITY MODE". In this case, for example, a correction process may always be conducted on the high pass coefficients (H2) and (H3) when the "HIGH QUALITY MODE" is selected; a coefficient correction process as is illustrated by FIG. 24, 25, or 26 may be conducted when the "INTERMEDIATE QUALITY MODE" is selected; and a coefficient correction process as is illustrated by FIG. 15 may be conducted when the "HIGH SPEED MODE" is selected.

Also, it is noted that in the illustrated example of FIG. 27, the tile boundary distortion prevention function is designated by means of a pull-down menu. However, the present invention is not limited to such an example. According to another embodiment, the tile boundary distortion prevention function may be displayed as one of tabs corresponding to various types of parameters referred to upon opening a file such as the number of decomposition levels, the component, and/or the position (tile, precinct) to be decoded. In this case, the correction mode for a coefficient correction process for preventing tile boundary distortion may be designated by selecting the tab corresponding to the tile boundary distortion prevention function.

It is noted that in the preferred embodiments described above, a decoding process is conducted on all the decomposition levels of a code stream; however, the present invention is by no way limited to such an arrangement. According to other embodiments, only a portion of the decomposition levels may be decoded owing to factors such as the resolution of a monitor display screen. For example, when a code stream has five decomposition levels, the code stream may be decoded up to decomposition level 2. In one embodiment, a number of decomposition levels may be designated via the menu 204, for example. When the number of decomposition levels is designated, the decoding process is conducted starting with the uppermost decomposition level down to the designated decomposition level, and the coefficient correction process is conducted with respect to the coefficients of the decoded decomposition levels. In this case, in step 107 of FIG. 15, step 128 of FIG. 24, step 138 of FIG. 25, and step 149 of FIG. 26, a determination is made as to whether the decoding process has been completed down to the designated decomposition level.

According to another embodiment, the coefficient correction process for preventing tile boundary distortion may be conducted on a portion of the decoded decomposition levels. In such a case, a determination is made as to whether a current decomposition level corresponds to a decomposition level requiring coefficient correction within the process loop of the process flow illustrated by FIGS. 15, 24, 25, and 26, for example, and coefficient correction is conducted only on the decomposition levels requiring coefficient correction. As for the decomposition levels that do not require coefficient correction, a two-dimensional inverse wavelet transform process may simply be conducted.

According to another embodiment, in a case where a correction mode may be designated as in the fifth embodiment described above, the coefficient correction process for preventing tile boundary distortion may be conducted on all the decomposition levels to be decoded, or on a portion of the decomposition levels to be decoded according to the designated correction mode. It is noted that when a correction mode for conducting the coefficient correction on a portion of the decomposition levels is designated, the required processing time for the coefficient correction process may be reduced compared to a case in which the coefficient correction process is conducted on all the decomposition levels to be decoded.

In this embodiment, the coefficient correction unit 1110 performs a coefficient correction process substantially always on the high pass coefficient (H2) situated adjacent to the tile boundary since the high pass coefficient (H2) has a large effect on the generation of distortion in the tile boundary. On the other hand, the high pass coefficient (H3) has little effect on the generation of distortion in the tile boundary compared to the high pass coefficient (H2). Therefore, for the purpose of reducing the time required in performing the coefficient correction process for reducing tile boundary distortion, the coefficient correction unit 1110 adaptively excludes the high pass coefficient (H3) from the coefficients targeted for correction depending on the number of quantization steps and movement amount of the frames.

In a case where the 5×3 wavelet transform is applied, correction of the high pass coefficients (H3) merely involves unilaterally changing the coefficient values to 0. Thereby, the correction process itself may be conducted in a relatively short period of time. However, it is noted that a clipping process has to be conducted when a coefficient correction process is conducted. In other words, a coefficient correction process for a high pass coefficient (H3) includes a clipping process. Thus, upon taking the processing time for the clipping process into consideration, the processing time required for correcting a high pass coefficient (H3) does not differ greatly from the processing time required for correcting a high pass coefficient (H2). Therefore, the reduction of process time by excluding the high pass coefficient (H3) from the correction target contributes to the acceleration of the entire decoding process including the step of coefficient correction for reducing tile boundary distortion.

As described above, FIG. 12 is a diagram showing coefficient values of a high pass coefficient (H3) before correction and after correction, and a corresponding clip value of the high pass coefficient (H3) in a case where the number of quantization steps Q is small. It is noted that generally, when the compression rate is low, the number of quantization steps Q is small. In this regard, FIG. 12 may also be considered as a diagram illustrating an exemplary case in which the compression rate is low.

As is shown in the drawing, in the encoding stage, when the coefficient value before being quantized (original signal) of a high pass coefficient (H3) is in between 2Q and 3Q, a value obtained by inverse quantization of the coefficient value in the decoding stage is expressed as 2Q+(3/8)Q (coefficient value before correction). It is noted that the above equation applies to a case in which the reconstruction parameter defined in the JPEG 2000 standard is set to 3/8. In a case where the 5×3 wavelet transform is applied, if the coefficient is corrected, the corrected value is unilaterally set to 0. In a clipping process, the corrected value is restored to a clip value corresponding to one end of the quantization section [2Q~3Q] that is closer to the original coefficient value. It is noted that the above descriptions also apply to a case in which the 9×7 wavelet transform is applied, since a corrected value of a high pass coefficient (H3) is set to 0 or a value close to 0 in such a case.

In a case where the compression rate of code data is low, and the number of quantization steps Q is sufficiently small, the difference between the coefficient value before correction of a high pass coefficient (H3) and its corresponding clip value ((3/8)Q) may be sufficiently small. In other words, the difference may be small between a case in which correction of the high pass coefficients (H3) is conducted and a case in which such a correction is not conducted. Thus, the effects of not conducting correction on the high pass coefficients (H3) may be minimal.

Meanwhile, distortion in the tile boundaries are apparent in a case where the movement amount of the frames is small, while distortion in the tile boundaries are difficult to recognize in a case where the movement amount of the frames is large. Accordingly, in one embodiment of the present invention, the threshold th1, which is used for determining whether the number of quantization steps is small, is controlled to increase as the movement amount of the frames become larger. For example, the threshold th1 is determined in accordance with:

th1=k×speed (wherein "k" represents a constant, and "speed" represents the movement amount of frames). Then, in a case where the number of quantization steps of high pass coefficient (H3) is no greater than th1, the high pass coefficient (H3) is excluded from a correction target (i.e. not subject to correction). Therefore, the percentage of excluding the high pass coefficient (H3) normally becomes higher as the movement amount of the frames become higher.

It is to be noted that the movement amount of the frames "speed" may be determined in two levels of "high" and "low", or more than two levels of "high", "medium" and "low", for example. Accordingly, the threshold th1 may be switched in multiple levels depending on the results of the determination. These examples are also included in one embodiment of the present invention.

Figure 36:
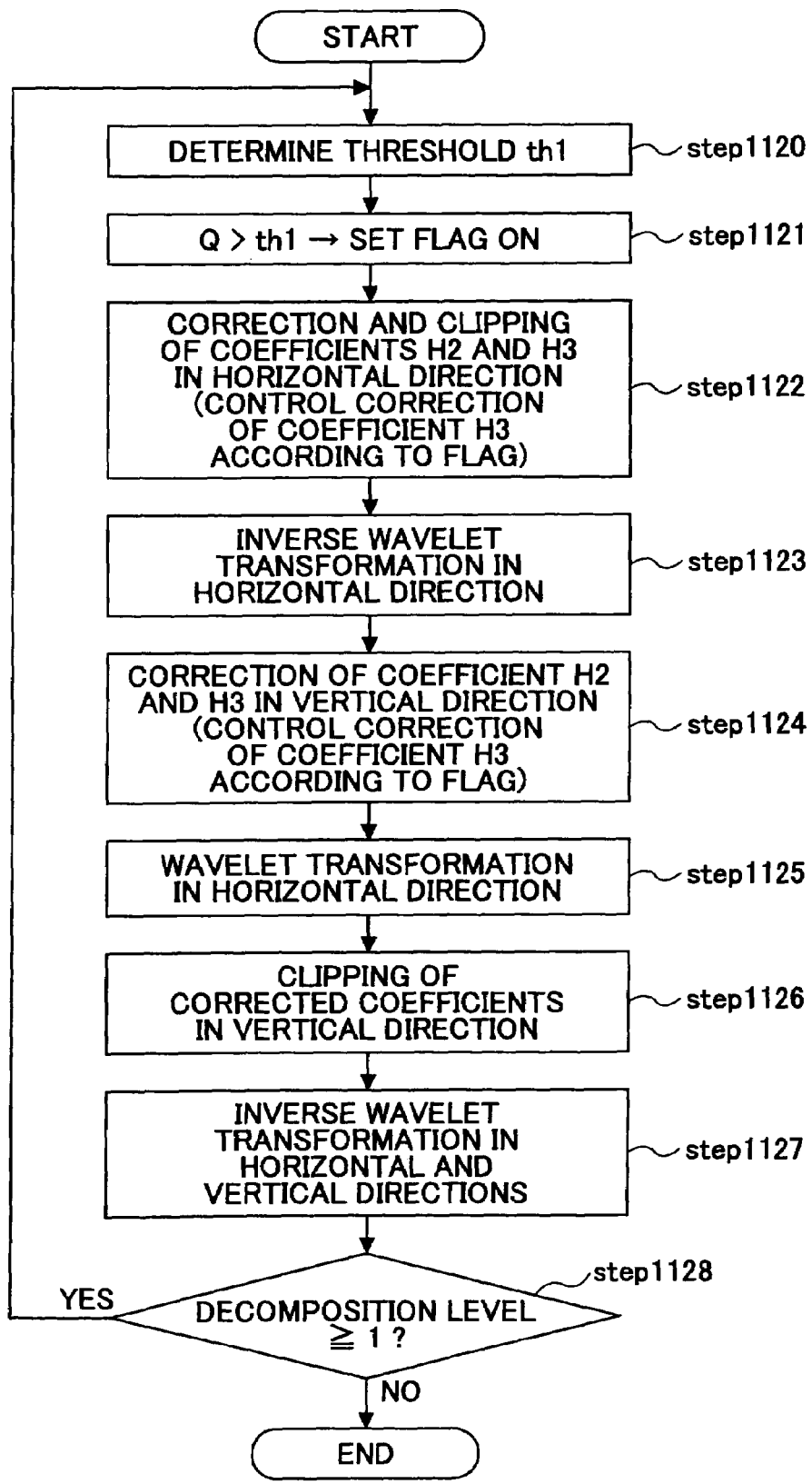
FIG. 36 is a flowchart for illustrating a process related to a coefficient correction according to a sixth embodiment of the present invention.

FIG. 36 shows a flowchart for explaining a process executed by the two-dimensional wavelet transformation unit 1102 and the coefficient correction unit 1110. This process is executed from the highest decomposition level (hierarchy) after the inverse quantization process is completed by the quantization/inverse quantization unit 1103.

First, in the correction control unit 1111, the threshold th1 is determined with respect to the coefficients of sub-bands HL, LH, and HH (high frequency band) in the current decomposition level in accordance with the movement amount of the frames estimated by the movement amount estimation unit 120 (step 1120). Next, in the correction control unit 1111, a flag corresponding to each sub-band is set according to the results in comparing between the number of quantization steps and the determined threshold th1 with respect to each sub-band HL, LH, and HH in the current decomposition level (Step 1121). In this example, the flag is set to "ON" only for a sub-band where the number of quantization steps is greater than the threshold th1.

In the coefficient correction unit 1110, a correction (clipping process included) is performed on the high pass coefficient (H2), being situated adjacent to the tile boundary in the horizontal direction, and the high pass coefficient (H3), being situated not adjacent to the tile boundary but in the vicinity of the tile boundary in the horizontal direction (Step 1122). In this step, the correction control unit 1111 refers to the flag set in step 1121. The correction control unit 1111 does not exclude coefficient H3 from correction when the flag corresponding to the coefficient H3 is set to an ON state, and performs correction on the coefficient H3. However, when the flag corresponding to the coefficient H3 is set to an OFF state, the coefficient H3 is excluded from correction and no correction is performed on the coefficient H3. It is to be noted that Formula (iii) is used in a case of the 5×3 transformation and Formula (v) is used in a case of the 9×7 transformation as the correction formula for the high pass coefficient (H2). Furthermore, Formula (iv) is used in a case of the 5×3 transformation, and Formula (vi) is used in a case of the 9×7 transformation as the correction formula for the high pass coefficient (H3).

Next, the two-dimensional wavelet transformation/inverse transformation unit 1102 executes inverse wavelet transformation in a horizontal direction (step 1123).

In the coefficient correction unit 1110, subsequent to performing inverse wavelet transformation on the coefficients, a correction (clipping process not included) is performed on the high pass coefficient (H2), being situated adjacent to the tile boundary in the vertical direction, and the high pass coefficient (H3), being situated not adjacent to the tile boundary but in the vicinity of the tile boundary in the vertical direction (Step 1124).

In this step, the correction control unit 1111 refers to the flag set in step 1121. The correction control unit 1111 does not exclude coefficient H3 from correction when the flag corresponding to the coefficient H3 is set to an ON state, and performs correction on the coefficient H3. However, when the flag corresponding to the coefficient H3 is set to an OFF state, the coefficient H3 is excluded from correction and no correction is performed on the coefficient H3.

In step 1124, the clipping process cannot be executed since the number of quantization steps for coefficients in-between are unknown. Therefore, the two-dimensional wavelet transformation/inverse transformation unit 1102 executes wavelet transformation (forward transformation) in the horizontal direction (step 1125). Then, in the coefficient correction unit 1110, a clipping process is performed on the coefficients H2 and H3 corrected in Step 1124 in the vertical direction (step 1126).

Next, the two-dimensional wavelet transformation/inverse transformation unit 1102 executes inverse wavelet transformation (inverse transformation) in the horizontal and vertical directions (step 1127), to thereby generate coefficients of sub-band LL of a decomposition which is one level lower. Then, the foregoing steps 1120-1127 are repeated on the coefficients of the lower decomposition level. The operation is completed after the foregoing steps are performed until decomposition level 1, thereby recovering the image data (No in Step 1128).

It is to be noted that the steps 120 and 121 are skipped for decomposition level 1 in a case where encoded data applied with 5×3 transformation is used, and that the flags for all sub-bands are set to an OFF state immediately before step 122 (not shown in FIG. 36). Therefore, all high pass coefficients (H3) are excluded from the correction target in steps 1122 and 124.

Reference is again made to FIGS. 16-30 for describing another coefficient correction process, using 2×2 tiled encoded data as an example, with respect to the coefficients of decomposition levels 1 and 2.

FIG. 16 is an arrangement of interleaved coefficients in decomposition level 2. First, high pass coefficients (H2) situated adjacent to the tile boundary in the horizontal direction (i.e. coefficients (2HL, 2HH) situated in row A in FIG. 17) and high pass coefficients (H3) situated in the vicinity of the tile boundary in the horizontal direction (i.e. coefficients (2HL, 2HH) situated in row B in FIG. 17) are corrected (including a clipping process). The high pass coefficients (H3) are excluded from the correction process when the number of quantization steps thereof exceeds the threshold th1.

Next, an inverse wavelet transformation process is performed on the wavelet coefficients of decomposition level 2 in the horizontal direction. As described above, FIG. 18 shows an arrangement of coefficients after the inverse transformation process in the horizontal direction.

Next, high pass coefficients (H2) situated adjacent to the tile boundary in the vertical direction (i.e. coefficients (2H) situated in line C in FIG. 19) and high pass coefficients (H3) situated in the vicinity of the tile boundary in the vertical direction (i.e. coefficients (2H) situated in line D in FIG. 19) are corrected (not including a clipping process). As described above, the high pass coefficients (H3) are adaptively excluded from the correction process.

Next, a wavelet transformation (forward transformation) process is executed in the horizontal direction, in which the corrected coefficients situated in lines C and D (see FIG. 19) are returned to the state shown in FIG. 16 (i.e. coefficients 2LH and 2HH) and are subject to a clipping process.

Next, the inverse wavelet transformation is executed in the horizontal direction and then in the vertical direction. Thereby, the coefficients of decomposition level 1 are obtained, as shown in FIG. 20.

Figure 22:
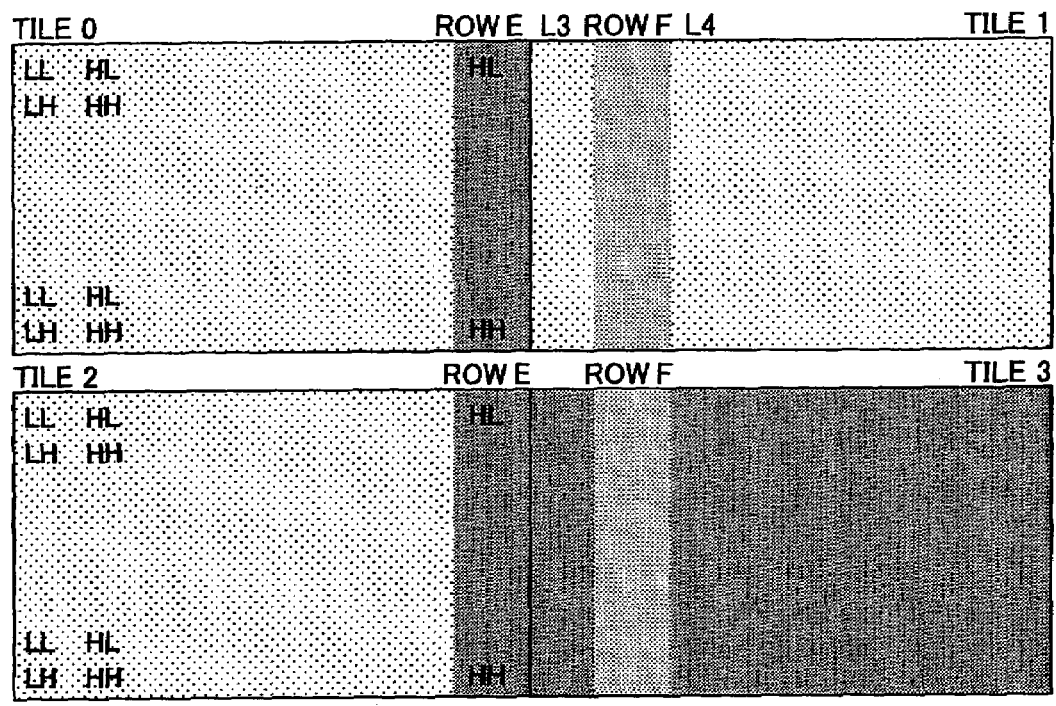
FIG. 22 is a diagram showing an arrangement of coefficients for coefficient correction in a horizontal direction in decomposition level 1.
Figure 23:
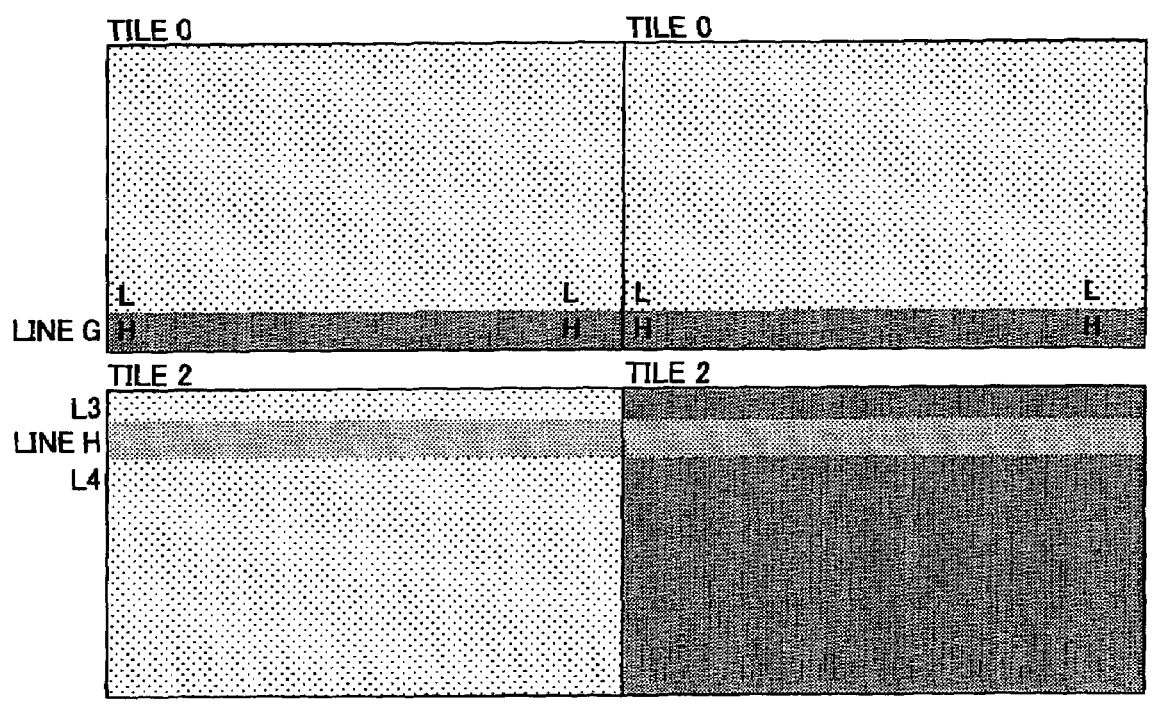
FIG. 23 is a diagram showing an arrangement of coefficients after performing inverse wavelet transformation in a horizontal direction on the coefficients corrected in FIG. 22.

Next, a correction process and a clipping process is performed on coefficients (HL, HH) situated in rows E and F shown in FIG. 22 with respect to the interleaved coefficients shown in FIG. 21. As described above, the coefficients situated in row F are adaptively excluded from correction. However, in a case of the 5×3 transformation, the coefficients of row F are substantially always excluded from correction.

Next, the inverse wavelet transformation is executed in the horizontal direction. Subsequent to the inverse wavelet transformation, the coefficients situated in lines G and H in FIG. 23 are corrected. However, the coefficients situated in line H are adaptively excluded from correction. Furthermore, in a case of the 5×3 transformation, the coefficients situated in line H are substantially always excluded from correction.

Next, a wavelet transformation (forward transformation) process is executed in the horizontal direction, in which the corrected coefficients situated in lines G and H (see FIG. 23) are returned to the state shown in FIG. 21 and are subject to a clipping process. Finally, inverse wavelet transformation is executed in the horizontal direction and then in the vertical direction, to thereby generate the original image data.

Similar to an above-described embodiments of the present invention, another embodiment of the present invention also performs a coefficient correction process substantially always on the high pass coefficient (H2) situated adjacent to the tile boundary, and adaptively excludes the high pass coefficient (H3) from the coefficients targeted for correction depending on the number of quantization steps and movement amount of the frames. However, this embodiment of the present invention described below uses another method for performing/not performing coefficient correction.

According to the seventh embodiment of the present invention, the high pass coefficients (H3) situated in the vicinity of the tile boundary are substantially always excluded from correction when the movement amount of the frames exceeds a predetermined threshold th2. In a case where the movement amount is no greater than the threshold th2, the number of quantization steps is compared with a preset threshold th1 which is set for each of the sub-bands HL, LH, and HH. The high pass coefficients (H3) are excluded from correction when the number of quantization steps is no greater than the threshold th1. That is, the high pass coefficients (H3) are corrected only when the number of quantization steps exceeds the threshold th1 and the movement amount of the frames is no greater than the threshold th2.

Figure 37:
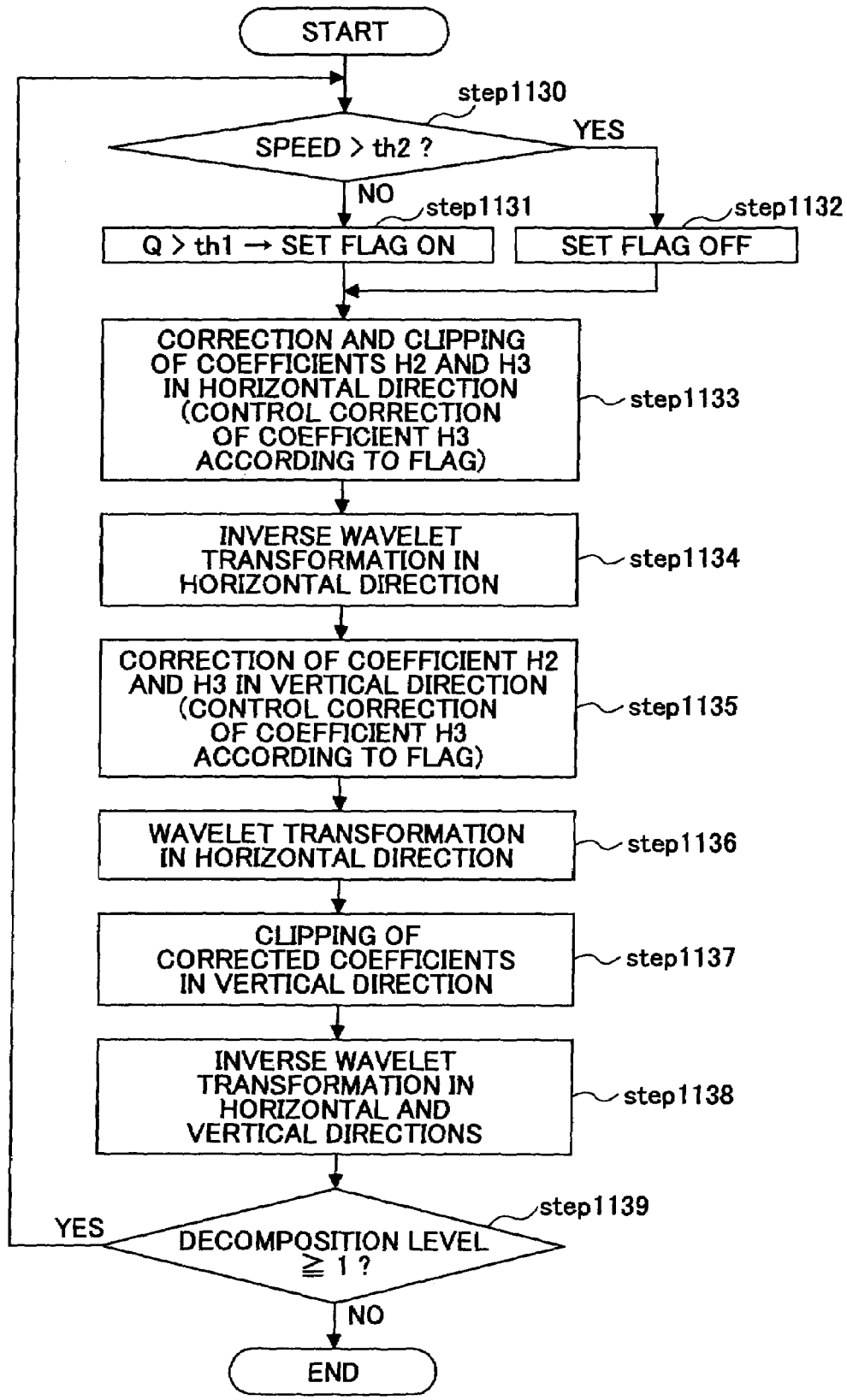
FIG. 37 is a flowchart for illustrating a process related to a coefficient correction according to a seventh embodiment of the present invention.

FIG. 37 shows a flowchart for explaining another process executed by the two-dimensional wavelet transformation unit 1102 and the coefficient correction unit 1110. This process is executed from the highest decomposition level (hierarchy) after the inverse quantization process is completed by the quantization/inverse quantization unit 1103.

First, in the correction control unit 1111, in a case where the movement amount of the frames estimated by the movement amount estimation unit 1120 is no greater than the threshold th2 (No in step 1130), flags corresponding to each sub-band are set according to the results in comparing between the predetermined threshold th1 corresponding to each sub-band HL, LH, and HH in the current decomposition level (high frequency band) and the number of quantization steps of the sub-bands HL, LH, and HH (Step 1131). In this example, a flag is set to "ON" only for a sub-band where the number of quantization steps is greater than the threshold th1. In a case where the movement amount of the frames exceeds the threshold th2 (Yes in step 1130), all of the flags are set to "OFF" (step 1132).

In the coefficient correction unit 1110, a correction (clipping process included) is performed on the high pass coefficient (H2), being situated adjacent to the tile boundary in the horizontal direction, and the high pass coefficient (H3), being situated not adjacent to the tile boundary but in the vicinity of the tile boundary in the horizontal direction (Step 1133). In this step, the correction control unit 1111 refers to the flag set in steps 1131 or 1132. The correction control unit 1111 does not exclude coefficient H3 from correction when the flag corresponding to the coefficient H3 is set to an ON state, and performs correction on the coefficient H3. However, when the flag corresponding to the coefficient H3 is set to an OFF state, the coefficient H3 is excluded from correction and no correction is performed on the coefficient H3.

Next, the two-dimensional wavelet transformation/inverse transformation unit 1102 executes inverse wavelet transformation in a horizontal direction (step 1134).

In the coefficient correction unit 1110, subsequent to performing inverse wavelet transformation on the coefficients, a correction (clipping process not included) is performed on the high pass coefficient (H2), being situated adjacent to the tile boundary in the vertical direction, and the high pass coefficient (H3), being situated not adjacent to the tile boundary but in the vicinity of the tile boundary in the vertical direction (Step 1135).

In this step, the correction control unit 1111 does not exclude coefficient H3 from correction when the flag corresponding to the coefficient H3 is set to an ON state, and performs correction on the coefficient H3. However, when the flag corresponding to the coefficient H3 is set to an OFF state, the coefficient H3 is excluded from correction and no correction is performed on the coefficient H3.

In step 1135, the clipping process cannot be executed since the number of quantization steps for coefficients in-between are unknown. Therefore, the two-dimensional wavelet transformation/inverse transformation unit 1102 executes wavelet transformation (forward transformation) in the horizontal direction (step 1136). Then, in the coefficient correction unit 1110, a clipping process is performed on the coefficients H2 and H3 corrected in Step 1135 in the vertical direction (step 1137).

Next, the two-dimensional wavelet transformation/inverse transformation unit 1102 executes inverse wavelet transformation (inverse transformation) in the horizontal and vertical directions (step 1138), to thereby generate coefficients of sub-band LL of a decomposition which is one level lower. Then, the foregoing steps 1130-1138 are repeated on the coefficients of the lower decomposition level. The operation is completed after the foregoing steps are performed until decomposition level 1, thereby recovering the image data (No in Step 1139).

It is to be noted that the steps 1130 and 1131 are skipped for decomposition level 1 in a case where encoded data applied with the 5×3 transformation is used, and that the flags for all sub-bands are set to an OFF state immediately before step 1133 (not shown in FIG. 37). Therefore, all high pass coefficients (H3) are excluded from the correction target in steps 1133 and 1135.

As is shown in FIG. 13, in the encoding stage, when a coefficient before being quantized (original signal) of a high pass coefficient (H3) is between 0 and Q (Q corresponding to the number of quantization steps), this coefficient is inverse-quantized to 0 in the decoding stage. In a case where the compression rate of code data is high and the number of quantization steps Q is large, a large portion of the coefficients are inverse-quantized to 0. In a case where the 5×3 wavelet transform is applied to the code data, if the inverse-quantized value (i.e. coefficient value before correction) of a high pass coefficient (H3) in the vicinity of a tile boundary corresponds to 0, the corresponding value after correction corresponds to 0, and the corresponding clip value corresponds to 0 as well. In other words, the processing result may be the same regardless of whether correction is conducted. This applies to a case in which the 9×7 wavelet transform is used on the code data as well, since a large portion of the coefficient values and the corrected values correspond to 0 or a value close to 0 and their corresponding clip values correspond to 0.

In a case where the coefficient value before correction of a high pass coefficient (H3) in the vicinity of the tile boundary corresponds to 0, the difference between the coefficient value before correction and its corresponding clip value corresponds to 0 or a value close to 0 so that correction may be unnecessary. In this regard, according to the present embodiment, in a case where the movement amount "speed" is no greater than a threshold th2, the correction control unit 1111 of the coefficient control unit 1110 is arranged to determine whether the coefficient value of a high pass coefficient (H3) in the vicinity of a tile boundary corresponds to 0. If the coefficient value corresponds to 0, the correction control unit 1111 excludes the coefficient from the coefficients subject to correction. In other words, by adaptively controlling the correction process (i.e., whether to conduct the process) for a high pass coefficient (H3) in the vicinity of a tile boundary according to its coefficient value, a more efficient coefficient correction process may be realized while avoiding the degradation of preventive measures with respect to the generation of tile boundary distortion. However, in a case where the movement amount "speed" of the frames exceeds the threshold th2, the high pass coefficients (H3) are all excluded from correction regardless of their value owing that the tile boundary distortion in this case is hardly recognizable.

Figure 38:
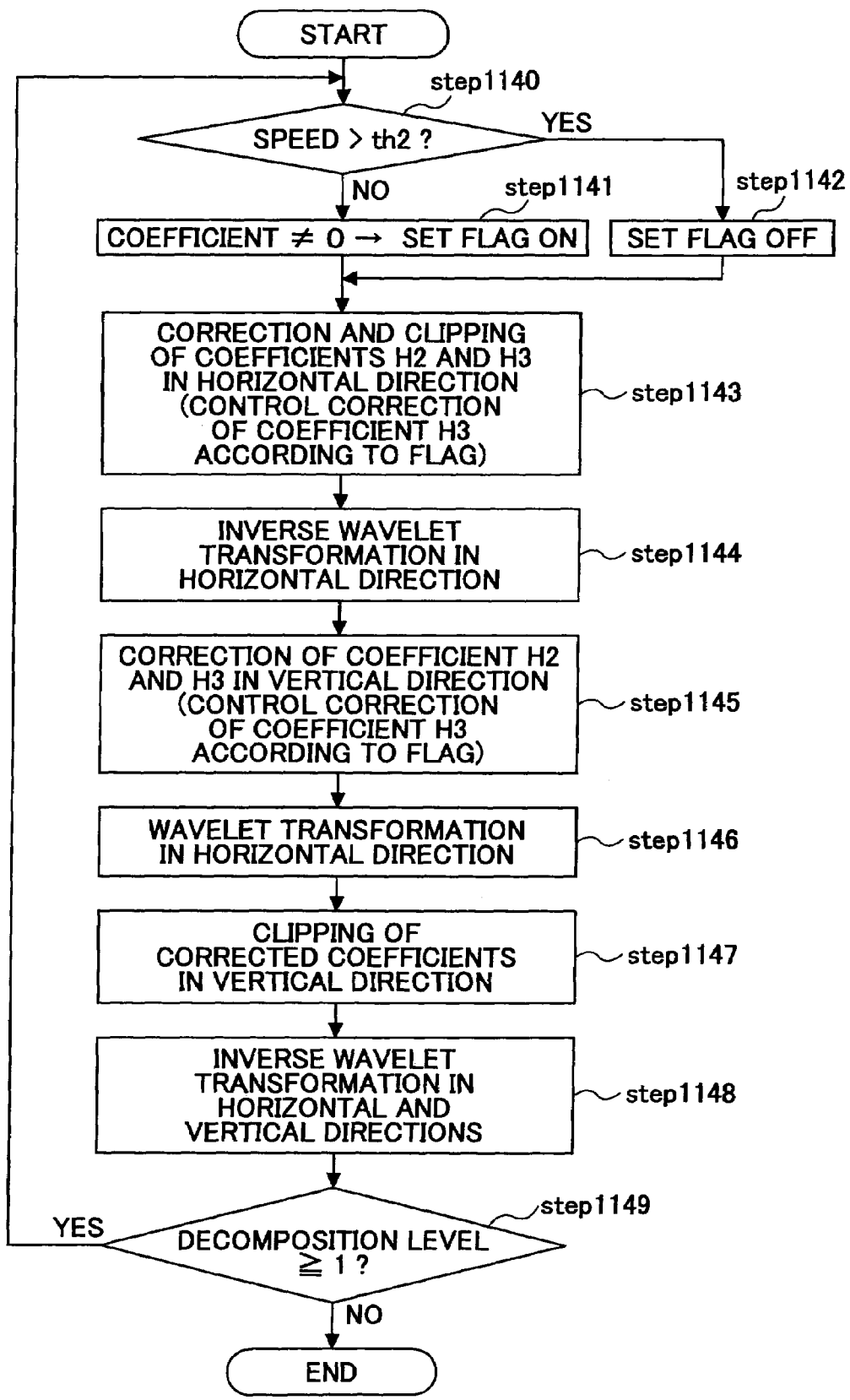
FIG. 38 is a flowchart for illustrating a process related to a coefficient correction according to a eighth embodiment of the present invention.

FIG. 38 is a flowchart illustrating process steps conducted by the two-dimensional wavelet transform/inverse transform unit 1102 and the coefficient correction unit 1110 according to the present embodiment. The process sequence of FIG. 38 is successively conducted on the decomposition levels starting from the uppermost decomposition level after an inverse quantization process is conducted by the quantization/inverse quantization unit 1103.

First, in the correction control unit 1111, in a case where the movement amount "speed" is no greater than the threshold th2 (No in step 1140), a determination is made as to whether high pass coefficients (H3) in the vicinity of horizontal and vertical tile boundaries correspond to 0, and a corresponding flag is set to each of the high pass coefficients (H3) (step 1141). In the example described below, a flag is set on for each of high pass coefficients with coefficient values (before correction) that do not correspond to 0. In a case where the movement amount "speed" exceeds the threshold (Yes in step 1140), all of the flags are set to an OFF state (step 1142).

In the coefficient correction unit 1110, the high pass coefficients situated adjacent to the tile boundary in the horizontal direction and the high pass coefficients (H3) situated in the vicinity of the tile boundary in the horizontal direction are corrected (including a clipping process) (step 1143). In this step, the correction control unit 1111 refers to the flags set in step 1141 or step 1142. The high pass coefficients (H3) are not excluded from correction when their corresponding flags are set to an ON state, but are excluded from correction when their corresponding flags are set to an OFF state.

Next, the two-dimensional wavelet transformation/inverse transformation unit 1102 executes inverse wavelet transformation in a horizontal direction (step 1144). Subsequent to the inverse transformation in the horizontal direction, the coefficient correction unit 1110 corrects the high pass coefficients (H2) situated adjacent to the tile boundary in the vertical direction and the high pass coefficients (H3) situated in the vicinity of the tile boundary in the vertical direction (step 1145). In this step, the correction control unit 1111 executes the same control executed in step 1143 in which the high pass coefficient (H3) is excluded/not excluded from correction.

Next, the two-dimensional wavelet transformation/inverse transformation unit 1102 executes wavelet transformation (forward transformation) in a horizontal direction (step 1146). The coefficient correction unit 1110 executes a clipping process with respect to the high pass coefficients (H2, H3) corrected in step 1145 (step 1147).

Next, the two-dimensional wavelet transformation/inverse transformation unit 1102 executes wavelet inverse transformation (inverse transformation) in the horizontal direction and then in the vertical direction (step 1-148) to thereby generate coefficients of sub-band LL of a decomposition which is one level lower. Then, the foregoing steps 1140-1148 are repeated on the coefficients of the lower decomposition level. The operation is completed after the foregoing steps are performed until decomposition level 1, thereby recovering the image data (No in Step 1149).

It is to be noted that the steps 1140-1142 are skipped for decomposition level 1 in a case where encoded data applied with 5×3 transformation is used, and that the flags for all sub-bands are set to an OFF state immediately before step 1143 (not shown in FIG. 38). Therefore, all high pass coefficients (H3) are excluded from the correction target in steps 1143 and 1145.

Also, according to a modified form of the present embodiment, and the coefficients before correction of step 1143 may be stored in the correction control unit 1111. In this case, the determination of whether the high pass coefficients (H3) correspond to 0 may be conducted in steps 1143 and 1145, in a case where the movement amount "speed" is no greater than the threshold th2, based on the coefficient values stored in the correction control unit 1111, and the correction process of a high pass coefficient (H3) may be controlled according to the determination results obtained therefrom.

As is described in relation to FIG. 12, in case where the number of quantization steps Q for a high pass coefficient (H3) in the vicinity of a tile boundary is small, a correction process for the corresponding coefficient may be omitted. Also, as is described in relation to FIG. 13, when a coefficient value before correction of a high pass coefficient (H3) corresponds to 0, correction for such a coefficient may be omitted.

However, if the value before correction of a high pass coefficient (H3) does not correspond to 0 and the number of quantization steps Q for this high pass coefficient (H3) is large, it is highly likely that a correction process has to be conducted for this high pass coefficient (H3). For example, in the encoding stage, when the value before correction (original signal) of a high pass coefficient (H3) in the vicinity of a tile boundary is between Q and 2Q as is shown in FIG. 14, this high pass coefficient (H3) is inverse quantized to the position Q+(3/8)Q in the decoding stage (given that the reconstruction parameter is set to 3/8). In a case where the 5×3 wavelet transform is applied, this coefficient is corrected to 0, and is then restored to the position Q by the clipping process. In this case, if the number of quantization steps Q is small, the difference (3/8)Q between the coefficient value before correction and the clip value is small so that the correction of the coefficient may be omitted. However, if the compression rate of the code data is high and the number of quantization steps Q is large, the difference (3/8)Q between the coefficient value before correction and the clip value may be significantly large so that correction may have to be conducted in order to avoid conspicuous tile boundary distortion. It is noted that although the above descriptions are directed to a case in which the 5×3 wavelet transform is applied, similar effects may be obtained in a case where the 9×7 wavelet transform is applied.

Accordingly, the coefficient correction unit 1110 of this embodiment of the present invention performs a coefficient correction process substantially always on the high pass coefficients (H2) situated adjacent to the tile boundary. On the other hand, with respect to the high pass coefficients (H3) situated not adjacent to the tile boundary but situated in the vicinity of the tile boundary, the coefficient correction unit 1110 adaptively excludes the high pass coefficients (H3) from correction depending on the number of quantization steps and movement amount of the frames.

More specifically, the high pass coefficients (H3) situated in the vicinity of the tile boundary is subject to correction only when the number of quantization steps is greater than a threshold th1 and the value of the coefficients prior to correction (value after inverse quantization) is not 0. On the other hand, the high pass coefficients (H3) are excluded from correction when the number of quantization steps is no greater than the threshold th1 and the value of the coefficients are not 0. Furthermore, given that the tile boundary distortion becomes more difficult to recognize as the movement amount "speed" of the frames increases, the value of the threshold th1 is set with a greater number as the movement amount "speed" increases. For example, as described in the sixth embodiment of the present invention, the threshold th1 is determined in accordance with:

th1=k×speed (wherein "k" represents a constant, and "speed" represents the movement amount of frames). It is to be noted that the movement amount of the frames "speed" may be determined in two levels or three or more levels, and the threshold th1 may be switched in multiple levels depending on the results of the determination.

Figure 39:
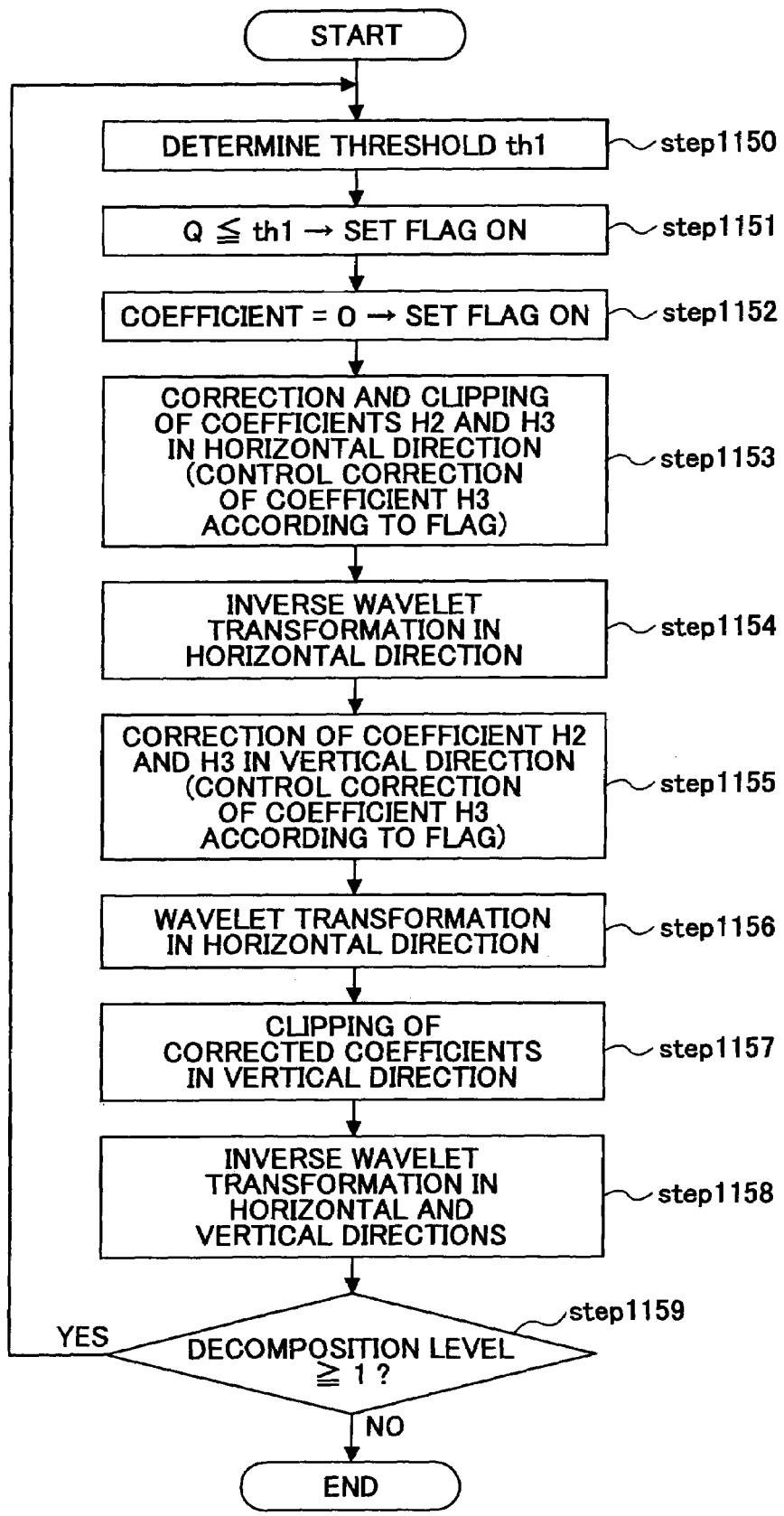
FIG. 39 is a flowchart for illustrating a process related to a coefficient correction according to a ninth embodiment of the present invention.

FIG. 39 shows a flowchart for explaining another process executed by the two-dimensional wavelet transformation unit 1102 and the coefficient correction unit 1110. This process is executed from the highest decomposition level (hierarchy) after the inverse quantization process is completed by the quantization/inverse quantization unit 1103.

First, in the correction control unit 1111, the threshold th1 is determined with respect to the coefficients of sub-bands HL, LH, and HH (high frequency band) in the current decomposition level in accordance with the movement amount of the frames estimated by the movement amount estimation unit 1120 (step 1150).

Next, in the correction control unit 1111, a flag corresponding to each sub-band is set according to the results in comparing between the number of quantization steps and the determined threshold th1 with respect to each sub-band HL, LH, and HH in the current decomposition level (Step 1151). In this example, the flag is set to "ON" only for a sub-band where the number of quantization steps is greater than the threshold th1.

Next, in the correction control unit 1111, it is determined whether the values of the high pass coefficients (H3) in the horizontal and vertical directions of the current decomposition level are 0 (0 determination). The flags, which correspond to coefficients having a value (value before correction) of 0, are set to an ON state (Step 1152). In this step, the flags which are switched on are the flags corresponding to high pass coefficients (H3) having a quantization step number that is no greater than the threshold th1 and the flags corresponding to high pass coefficients (H3) having a value that is 0. The flags of high pass coefficients (H3) are switched to an OFF state only when the number of quantization steps of the high pass coefficients (H3) exceeds the threshold th1 and the value of the high pass coefficients (H3) is not 0.

In the coefficient correction unit 1110, the high pass coefficients situated adjacent to the tile boundary in the horizontal direction and the high pass coefficients (H3) situated in the vicinity of the tile boundary in the horizontal direction are corrected (including a clipping process) (step 1153). In this step, the correction control unit 1111 refers to the flags of each high pass coefficient. The high pass coefficients (H3) are excluded from correction when their corresponding flags are set to an ON state.

Next, the two-dimensional wavelet transformation/inverse transformation unit 1102 executes inverse wavelet transformation in a horizontal direction (step 1154). Subsequent to the inverse transformation in the horizontal direction, the coefficient correction unit 1110 corrects (clipping process not included) the high pass coefficients (H2) situated adjacent to the tile boundary in the vertical direction and the high pass coefficients (H3) situated in the vicinity of the tile boundary in the vertical direction (step 1155). In this step, the correction control unit 1111 executes the same control executed in step 1153 in which the high pass coefficient (H3) is excluded/not excluded from correction.

Next, the two-dimensional wavelet transformation/inverse transformation unit 1102 executes wavelet transformation (forward transformation) in a horizontal direction (step 1156). The coefficient correction unit 1110 executes a clipping process with respect to the high pass coefficients (H2, H3) corrected in step 1155 (step 1157).

Next, the two-dimensional wavelet transformation/inverse transformation unit 1102 executes wavelet inverse transformation (inverse transformation) in the horizontal direction and then in the vertical direction (step 1158) to thereby generate coefficients of sub-band LL of a decomposition which is one level lower. Then, the foregoing steps 1150-1158 are repeated on the coefficients of the lower decomposition level. The operation is completed after the foregoing steps are performed until decomposition level 1, thereby recovering the image data (No in Step 1159).

It is to be noted that the steps 1150-1152 are skipped for decomposition level 1 in a case where encoded data applied with 5×3 wavelet transformation is used, and that the flags for all sub-bands are set to an OFF state immediately before step 1153 (not shown in FIG. 39). Therefore, all high pass coefficients (H3) are excluded from the correction target in steps 1153 and 1155.

Similar to the above-described embodiment of the present invention, an embodiment of the present invention also performs a coefficient correction process substantially always on the high pass coefficient (H2) situated adjacent to the tile boundary, and adaptively excludes the high pass coefficient (H3) from the coefficients targeted for correction depending on the coefficient value, the number of quantization steps and movement amount of the frames. However, one embodiment of the present invention described below uses another method for performing/not performing coefficient correction.

According to one embodiment of the present invention, the high pass coefficients (H3) situated in the vicinity of the tile boundary are substantially always excluded from correction when the movement amount of the frames is no less than a predetermined threshold th2. In a case where the movement amount is less than the threshold value th2, the high pass coefficients (H3) having values of 0 and also the high pass coefficients (H3) having quantization step numbers that are no greater than the threshold th1 are excluded from correction. The high pass coefficients (H3) situated in the vicinity of the tile boundary are subject to correction only on condition that their values are not 0, their number of quantization steps exceeds the threshold th1, and the movement amount of the frames is less than the threshold th2.

Figure 40:
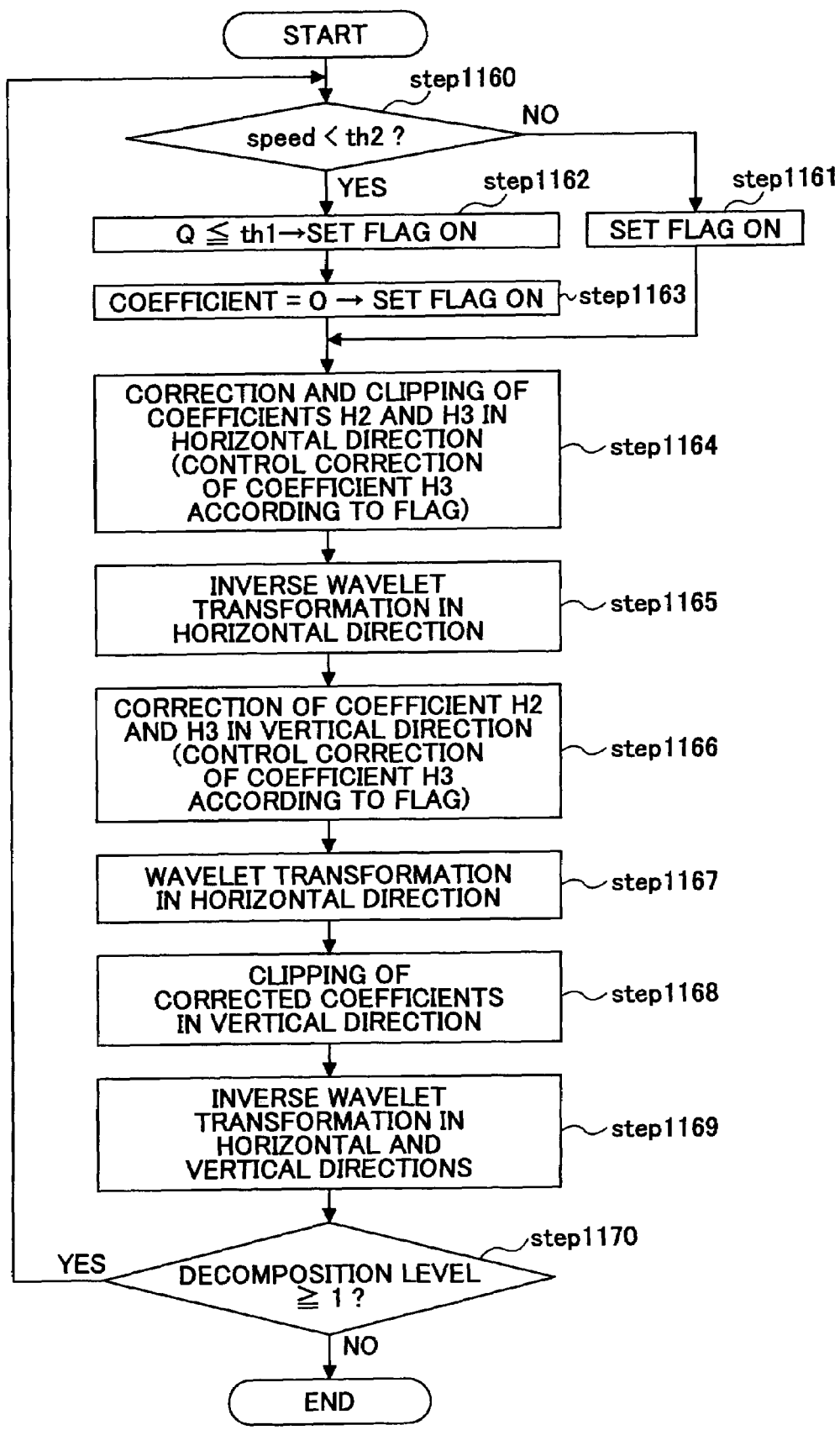
FIG. 40 is a flowchart for illustrating a process related to a coefficient correction according to a tenth embodiment of the present invention.

FIG. 40 shows a flowchart for explaining another process executed by the two-dimensional wavelet transformation unit 1102 and the coefficient correction unit 1110. This process is executed from the highest decomposition level (hierarchy)

after the inverse quantization process is completed by the quantization/inverse quantization unit 1103.

First, in the correction control unit 1111, all of the flags, which correspond to the high pass coefficients (H3) situated in the vicinity of the tile boundaries in the horizontal and vertical direction, are set to an ON state in a case where the movement amount "speed" is no less than the threshold th2 (No in step 1160) (step 1161). In such a case, steps 1162 and 1163 are skipped.

In a case where the movement amount "speed" is less than the threshold th2 (Yes in step 1160), in the correction control unit 1111, a flag, which corresponds to a high pass coefficient (H3) of a sub-band having a quantization step number that is no greater than the threshold th1, is set to an ON state in accordance with the results in comparing between the number of quantization steps and the predetermined threshold th1 with respect to each sub-band HL, LH, and HH in the current decomposition level (Step 1162). Next, in the correction control unit 1111, it is determined whether the values of the high pass coefficients (H3) in the horizontal and vertical directions of the current decomposition level are 0 (0 determination) (1163). The flags, which correspond to coefficients having a value (value before correction) of 0, are set to an ON state (Step 1163). According to the steps 1162 and 1163, the flags which are switched to an ON state are the flags corresponding to high pass coefficients (H3) having a quantization step number that is no greater than the threshold th1 and the flags corresponding to high pass coefficients (H3) having a value that is 0.

After step 1161 or step 1163, the process proceeds to step 1164. In step 1164, the high pass coefficients situated adjacent to the tile boundary in the horizontal direction and the high pass coefficients (H3) situated in the vicinity of the tile boundary in the horizontal direction are corrected (including a clipping process). In this step, the correction control unit 1111 refers to the flags of each high pass coefficient. The high pass coefficients (H3) are excluded from correction when their corresponding flags are set to an ON state. That is, in case where the movement amount "speed" of the frames is no less than the threshold th2, all high pass coefficients (H3) which are situated in the vicinity of the tile boundary in the horizontal direction are excluded from correction. Furthermore, in a case where the movement amount "speed" of the frames is less than the threshold th2, the high pass coefficient (H3) having a value of 0 and a high pass coefficient (H3) having a quantization step number that is no greater than the threshold th1 are excluded from correction.

Next, the two-dimensional wavelet transformation/inverse transformation unit 1102 executes inverse wavelet transformation in a horizontal direction (step 1165). Subsequent to the inverse transformation in the horizontal direction, the coefficient correction unit 1110 corrects (clipping process not included) the high pass coefficients (H2) situated adjacent to the tile boundary in the vertical direction and the high pass coefficients (H3) situated in the vicinity of the tile boundary in the vertical direction (step 1166). In this step, the correction control unit 1111 executes the same control executed in step 1164 in which the high pass coefficient (H3) is excluded/not excluded from correction.

Next, the two-dimensional wavelet transformation/inverse transformation unit 1102 executes wavelet transformation (forward transformation) in a horizontal direction (step 1167). The coefficient correction unit 1110 executes a clipping process with respect to the high pass coefficients (H2, H3) corrected in step 1166 (step 1168).

Next, the two-dimensional wavelet transformation/inverse transformation unit 1102 executes wavelet inverse transformation (inverse transformation) in the horizontal direction and then in the vertical direction (step 1169) to thereby generate coefficients of sub-band LL of a decomposition which is one level lower. Then, the foregoing steps 1160-1169 are repeated on the coefficients of the lower decomposition level. The operation is completed after the foregoing steps are performed until decomposition level 1, thereby recovering the image data (No in Step 1170).

It is to be noted that the steps 1160-1163 are skipped for decomposition level 1 in a case where encoded data applied with 5×3 wavelet transformation is used, and that the flags for all sub-bands are set to an OFF state immediately before step 1164 (not shown in FIG. 40). Therefore, all high pass coefficients (H3) are excluded from the correction target in steps 1164 and 1166.

In the following, an image processing apparatus according to an embodiment of the present invention is described. The image processing apparatus according to the present embodiment includes the correction mode designating unit 1130 of FIG. 28. The coefficient correction unit 1110 implements plural correction modes for preventing tile boundary distortion, and is arranged to execute a correction mode that is designated by the correction mode designating unit 1130.

The correction mode designating unit 1130 may be realized by hardware, firmware, software or combinations thereof. For example, in a case where the image processing apparatus 800 of the present embodiment is incorporated within a program controlling device such as a personal computer or a portable information terminal in the form of hardware, firmware, and/or one or more programs, the correction mode designating unit 1130 may typically be embodied as a part of an application program or an operating system. In a practical example, a user may be able to designate a correction mode through interaction with the image processing apparatus via a screen of a monitor apparatus. Such an example is described below with reference to FIG. 27.

In the illustrated example of FIG. 27, a pointing device such as a mouse may be used to select the item "FILE" 201 corresponding to one of the items of a menu displayed on a screen. When the item "FILE" 201 is selected, its corresponding pull-down menu 202 is displayed. In turn, a motion-JPEG 2000 compressed file may be opened by selecting the item "OPEN" 206 from the pull-down menu 202. Also, before opening the JPEG 2000 compressed file, the item "PROPERTIES" 203 may be selected to designate a manner (i.e, image quality) in which the contents of a file are to be displayed.

Specifically, when the item "PROPERTIES" 203 is selected, its corresponding menu 204 is displayed. The menu 204 includes the item "TILE BOUNDARY PREVENTION FUNCTION" 205 as one of its items. By selecting the button "OFF" under the item "TILE BOUNDARY PREVENTION FUNCTION" 205, a no-correction mode is designated in which coefficient correction for preventing tile boundary distortion is not conducted. In other words, when image display at the lowest image quality is desired, the button "OFF" may be selected, and the item "OPEN" 206 may be selected thereafter. In this case, a designated compressed file is decoded without conducting a coefficient correction process for preventing tile boundary distortion, and its corresponding image is displayed on the screen.

When image display with better image quality is desired in which tile boundary distortion may be made less conspicuous, the user may select an "ON" button under the item "TILE BOUNDARY PREVENTION FUNCTION" 205 as is shown in the present drawing. In response to such a selection, buttons "HIGH QUALITY MODE" and "HIGH SPEED MODE" may be activated within the menu 204 so that the user may be able to designate a preferred mode of the two modes. After designating the preferred correction mode, the item "OPEN" 206 of the pull-down menu 202 may be selected, and a JPEG 2000 compressed file may be designated. In turn, a coefficient correction process for preventing tile boundary distortion is conducted according to the designated correction mode upon decoding the designated JPEG 2000 image file.

According to one embodiment, when the "HIGH SPEED MODE" is selected, coefficient correction is only conducted on high pass coefficients (H2) that are adjacent to a tile boundary. The flow of this correction mode is a correction flow where only the high pass coefficients (H2) situated adjacent to the tile boundary are corrected, as illustrated in step 1122 and 1124 without step 1120 and 1121 in FIG. 36.

On the other hand, when the "HIGH QUALITY MODE" is selected, a coefficient correction process is conducted for preventing tile boundary distortion with respect to high pass coefficients (H2) that are adjacent to a tile boundary and high pass coefficients (H3) in the vicinity of (but not adjacent to) the tile boundary. In one example, the high pass coefficients (H2) as well as the high pass coefficients (H3) may always be corrected (in such case, correction of the high pass coefficients (H3) is also conducted unconditionally in steps 1122 and 1124 without steps 1120 and 1121 of FIG. 36).

According to another embodiment, when the "HIGH QUALITY MODE" is selected, a correction process for a high pass coefficient (H3) in the vicinity of (but not adjacent to) a tile boundary may be adaptively controlled according to the number of quantization steps for the coefficient, the coefficient value before correction, or both the number of quantization steps and the coefficient value before correction as is illustrated by FIG. 36, 37, 38, 39 or 40.

According to yet another embodiment, a coefficient correction process as is illustrated by FIG. 36, 37, 38, 39 or 40 may be conducted when the "HIGH SPEED MODE" is selected, and a coefficient correction process may be conducted on all the high pass coefficients (H2) and (H3) when the "HIGH QUALITY MODE" is selected.

According to another embodiment, an "INTERMEDIATE QUALITY MODE" may be provided as correction modes in addition to the "HIGH SPEED MODE" and the "HIGH QUALITY MODE". In this case, for example, a correction process may always be conducted on the high pass coefficients (H2) and (H3) when the "HIGH QUALITY MODE" is selected; a coefficient correction process as is illustrated by FIG. 36, 37, 38, 39 or 40 may be conducted when the "INTERMEDIATE QUALITY MODE" is selected; and a coefficient correction process, which corrects only the high pass coefficients (H2) situated adjacent to the tile boundary, may be conducted when the "HIGH SPEED MODE" is selected.

Also, it is noted that in the illustrated example of FIG. 27, the tile boundary distortion prevention function is designated by means of a pull-down menu. However, the present invention is not limited to such an example. According to another embodiment, the tile boundary distortion prevention function may be displayed as one of tabs corresponding to various types of parameters referred to upon opening a file such as the number of decomposition levels, the component, and/or the position (tile, precinct) to be decoded. In this case, the correction mode for a coefficient correction process for preventing tile boundary distortion may be designated by selecting the tab corresponding to the tile boundary distortion prevention function.

It is noted that in the embodiments described above, a decoding process is conducted on all the decomposition levels of a code stream; however, the present invention is by no way limited to such an arrangement. According to other embodiments, only a portion of the decomposition levels may be decoded owing to factors such as the resolution of a monitor display screen. For example, when a code stream has five decomposition levels, the code stream may be decoded up to decomposition level 2. In one embodiment, a number of decomposition levels may be designated via the menu 204, for example. When the number of decomposition levels is designated, the decoding process is conducted starting with the uppermost decomposition level down to the designated decomposition level, and the coefficient correction process is conducted with respect to the coefficients of the decoded decomposition levels. In this case, in step 1128 of FIG. 36, step 1139 of FIG. 37, step 1149 of FIG. 38, step 1159 of FIG. 39 and step 1170 of FIG. 40, a determination is made as to whether the decoding process has been completed down to the designated decomposition level.

According to another embodiment, the coefficient correction process for preventing tile boundary distortion may be conducted on a portion of the decoded decomposition levels. In such a case, a determination is made as to whether a current decomposition level corresponds to a decomposition level requiring coefficient correction within the process loop of the process flow illustrated by FIGS. 36, 37, 38, 39 or FIG. 40, for example, and coefficient correction is conducted only on the decomposition levels requiring coefficient correction. As for the decomposition levels that do not require coefficient correction, a two-dimensional inverse wavelet transform process may simply be conducted.

According to another embodiment, in a case where a correction mode may be designated as in the eleventh embodiment described above, the coefficient correction process for preventing tile boundary distortion may be conducted on all the decomposition levels to be decoded, or on a portion of the decomposition levels to be decoded according to the designated correction mode. It is noted that when a correction mode for conducting the coefficient correction on a portion of the decomposition levels is designated, the required processing time for the coefficient correction process may be reduced compared to a case in which the coefficient correction process is conducted on all the decomposition levels to be decoded.

It is noted that an image processing apparatuses 700 and 800 according to one embodiment of the present invention are arranged to realize an image processing method according to the present invention as is illustrated in the above descriptions by way of example. Accordingly, descriptions of process steps and process flow of the image processing method realized by the image processing apparatuses of the present invention are omitted.

Also, it is noted that the present invention has been described in relation to a case of handling code data in the JPEG 2000 or motion-JPEG 2000 format. However, applications of the present invention is not limited to the JPEG 2000 format, and for example, the present invention may equally be applied to formats involving dividing an image into non-overlapping tiles (blocks), conducting a wavelet transform or some other type of frequency transform in tile units, and compensating for a missing pixel value or coefficient value of a tile boundary from the same tile using the mirroring method rather than compensating for the missing pixel value from an adjacent tile.

Accordingly, with the image processing apparatus, the image processing method, and the recording medium according to one embodiment of the present invention, distortion in the tile boundary can be reduced (controlled) by conducting coefficient correction on a frequency coefficient space during a decoding process for decoding data being encoded by conducting frequency transformation in each tile of an image divided into non-overlapping tiles (e.g. data encoded with JPEG 2000). Furthermore, with the image processing apparatus, the image processing method and the recording medium according to one embodiment of the present invention, the user may designate the speed for conducting a decoding process including, for example, a correction process for reducing tile boundary distortion.

Furthermore, with the image processing apparatus, the image processing method, and the recording medium according to another embodiment of the present invention, distortion in the tile boundary can be reduced (controlled) by a control for conducting coefficient correction with respect to an encoded frame data of a moving image having each frame encoded by conducting frequency transformation in each tile of an image (frame) divided into non-overlapping tiles (e.g. data of a moving image encoded with motion-JPEG 2000). In addition, with the image processing apparatus, the image processing method and the recording medium according to another embodiment of the present invention, time can be shortened for conducting coefficient correction on a frequency coefficient space for reducing tile boundary distortion.

A frequency coefficient space during a decoding process for decoding data being encoded by conducting frequency transformation in each tile of an image divided into non-overlapping tiles (e.g. data encoded with JPEG 2000).

Further, the present invention is not limited to these embodiments, but various variations and modifications may be made without departing from the scope of the present invention.

What is claimed is:

1. An image processing apparatus comprising:
   a coefficient correction unit to correct a first high frequency coefficient situated adjacent to a tile boundary of an encoded image data divided into non-overlapping tiles, and a second high frequency coefficient situated in the vicinity of but not adjacent to the tile boundary;
   wherein the first and second high frequency coefficients are corrected during a process of decoding the encoded image data;
   wherein the coefficient correction unit is operable to adaptively exclude the second high frequency coefficient from the correction according to the number of quantization steps of the second high frequency coefficient.

2. The image processing apparatus as claimed in claim 1, wherein the coefficient correction unit adaptively excludes the second high frequency coefficient from the correction when the number of the quantization steps of the second high frequency coefficient is no greater than a predetermined value.

3. An image processing method comprising:
   using a processor to perform:
   correcting a first high frequency coefficient situated adjacent to a tile boundary of an encoded image data divided into non-overlapping tiles, and a second high frequency coefficient situated in the vicinity of but not adjacent to the tile boundary;
   wherein the first and second high frequency coefficients are corrected during a process of decoding the encoded image data;
   wherein the second high frequency coefficient is adaptively excluded from correction, when correcting the first and second frequency coefficients, according to at least one of the number of quantization steps of the second high frequency coefficient and the value of the second high frequency coefficient.

4. A computer readable medium storing a program for causing a computer to execute an image processing method, the image processing method comprising:
   correcting a first high frequency coefficient situated adjacent to a tile boundary of an encoded image data divided into non-overlapping tiles, and a second high frequency coefficient situated in the vicinity of but not adjacent to the tile boundary;
   wherein the first and second high frequency coefficients are corrected during a process of decoding the encoded image data;
   wherein the second high frequency coefficient is adaptively excluded from correction, when correcting the first and second frequency coefficients, according to at least one of the number of quantization steps of the second high frequency coefficient and the value of the second high frequency coefficient.

* * * * *